United States Patent
Takimoto et al.

(10) Patent No.: US 8,449,955 B2
(45) Date of Patent: May 28, 2013

(54) ACRYLIC RESIN CONTAINING FILM, AND POLARIZING PLATE AND A LIQUID CRYSTAL DISPLAY DEVICE EMPLOYING THE SAME

(75) Inventors: Masataka Takimoto, Machida (JP); Nobuo Kubo, Hachioji (JP); Takashi Takebe, Tama (JP)

(73) Assignee: Konica Minolta Opto, Inc., Tokyo (JP)

( * ) Notice: Subject to any disclaimer, the term of this patent is extended or adjusted under 35 U.S.C. 154(b) by 414 days.

(21) Appl. No.: 12/809,110

(22) PCT Filed: Jul. 22, 2008

(86) PCT No.: PCT/JP2008/063112
§ 371 (c)(1),
(2), (4) Date: Jun. 18, 2010

(87) PCT Pub. No.: WO2009/081607
PCT Pub. Date: Jul. 2, 2009

(65) Prior Publication Data
US 2010/0270502 A1 Oct. 28, 2010

(30) Foreign Application Priority Data
Dec. 25, 2007 (JP) .................... 2007-332019

(51) Int. Cl.
*G02F 1/13363* (2006.01)
*G02B 5/30* (2006.01)
*C08L 1/10* (2006.01)
*C08L 1/12* (2006.01)
*G02F 1/1335* (2006.01)
*C08L 33/08* (2006.01)

(52) U.S. Cl.
CPC ...... *G02F 1/133528* (2013.01); *G02F 1/13363* (2013.01); *G02F 2202/40* (2013.01); *G02B 5/3033* (2013.01); *C08L 1/10* (2013.01); *C08L 1/12* (2013.01); *C08L 33/08* (2013.01)
USPC .............. 428/1.31; 428/1.1; 349/117; 524/37

(58) Field of Classification Search
CPC ............ G02F 1/133528; G02F 2202/40; G02B 5/3033; C08L 1/10; C08L 33/08
USPC .................. 428/1.1, 1.3; 252/299.01, 299.5; 349/117; 524/37
See application file for complete search history.

(56) References Cited

U.S. PATENT DOCUMENTS

| | | | |
|---|---|---|---|
| 8,202,937 B2 * | 6/2012 | Takebe et al. ............... | 525/54.21 |
| 2006/0202366 A1 | 9/2006 | Murakami et al. | |
| 2007/0247576 A1 | 10/2007 | Tamagawa et al. | |
| 2010/0181702 A1 * | 7/2010 | Takebe et al. ............... | 264/290.2 |
| 2011/0157524 A1 * | 6/2011 | Kawanishi et al. ............. | 349/96 |

FOREIGN PATENT DOCUMENTS

| | | |
|---|---|---|
| CN | 1834705 A | 9/2006 |
| JP | 05-119217 A | 5/1993 |
| JP | 05-306344 A | 11/1993 |
| JP | 2002-012728 A | 1/2002 |
| JP | 2005-146084 A | 6/2005 |
| JP | 2007-191706 A | 8/2007 |

OTHER PUBLICATIONS

U.S. Appl. No. 11/787,443, filed Apr. 16, 2007, Group Art Unit 1783, Confirmation No. 3142.
Office Action from the People's Republic of China dated Feb. 3, 2012 in application 200880122337.2.

* cited by examiner

*Primary Examiner* — Shean C Wu
(74) *Attorney, Agent, or Firm* — Holtz Holtz Goodman & Chick PC

(57) ABSTRACT

This invention provides an acrylic resin containing film, which is transparent and highly heat resistant and has significantly improved brittleness, and a polarizing plate using the acrylic resin containing film. Further yield in punching work and laminating work of the polarizing late is improved and a liquid crystal display device which can maintain good visibility in long term use is also provided by the polarizing plate. The acrylic resin containing film is composed mainly of an acrylic resin and is characterized in that the film contains the acrylic resin and the cellulose ester resin in a weight ratio of 51:49 to 95:5 and further contains a retardation control agent.

21 Claims, 1 Drawing Sheet

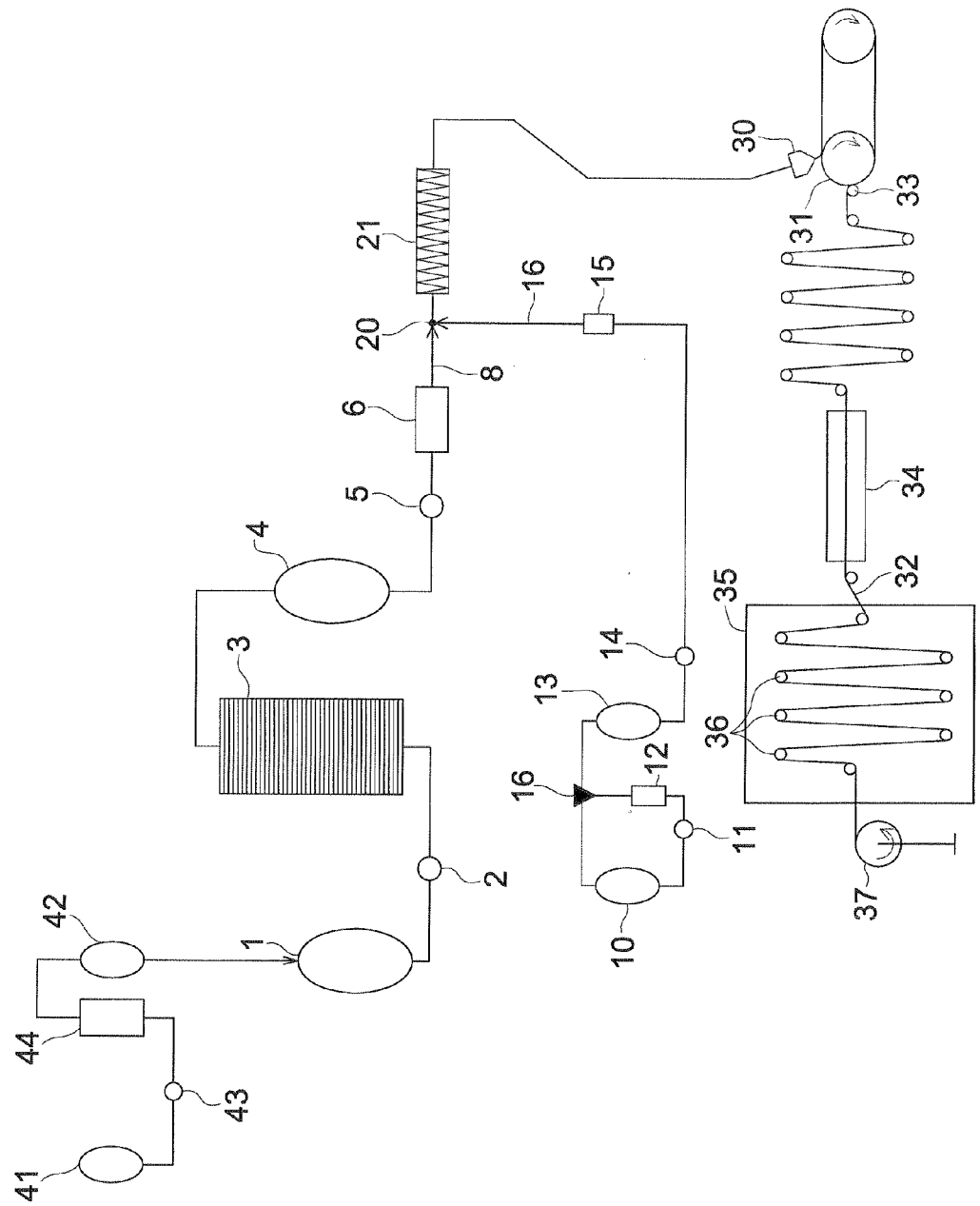

ACRYLIC RESIN CONTAINING FILM, AND POLARIZING PLATE AND A LIQUID CRYSTAL DISPLAY DEVICE EMPLOYING THE SAME

This application is the United States national phase application of International Application PCT/JP2008/063112 filed Jul. 22, 2008.

TECHNICAL FIELD

The present invention relates an acrylic resin containing film, which is transparent and highly heat resistant and has significantly improved brittleness, and a polarizing plate, and a liquid crystal display device employing the acrylic resin containing film.

BACKGROUND ART

Conventional acrylic resin film has employed polymethyl methacrylate (PMMA) suitably in view of excellent transparency, dimensional stability, low hygroscopicity and so on.

However PMMA resin film has a problem that it is poor in heat resistance and deforms when used for long term. This problem is significant as the physical property of the film as itself and also as the polarizing plate, and the liquid crystal display device employing the film. Namely, there are problems that view angle changes or hue change generates because the polarizing plate curls and therefore panel bents as a whole due to the deformation of the film or preferably designed retardation changes when used at a position between the polarizing plate and liquid crystal cells, during the use for long term of the polarizing plate On the other side, while the acrylic resin film is excellent in transparency and suitable for the optical film, it is not suitable for the retardation film since it has characteristics not to exhibit sufficient retardation in addition to its brittleness. Further there is a problem that certain retardation control agent is not miscible with an acrylic resin solely or cellulose ester resin solely when the retardation is adjusted by adding retardation control agents.

A method to introduce a alicyclic alkyl or a method to obtain a cyclic composition by infra-molecule cycle forming reaction is proposed to dissolve the various problems described above, for example, Patent Documents 1 to 3.

However there are problem in these method that brittleness of the film degraded significantly though heat resistance is improved and productivity is poor since it takes time in synthesize raw materials or there is restrain in film production method.

There is a method to add polycarbonate in view of heat resistance and mechanical strength, however this method is difficult to use for the optical film since solvent to be used is restrained and resins are hard to dissolve each other and easy to form white turbid. See, for example, Patent Document 4.

Patent Document 5 discloses a film having moisture resistance with low cost obtained by blending an acrylic resin with butyl modified acetyl cellulose, however, this film does not overcome sufficiently brittleness of the acrylic resin. Further, the demands for transparency, high heat resistance, brittleness and so on become moreover markedly, according to request for wider display, thinner parts, lower weight, etc.
Patent Document 1: JP-A 2002-012728
Patent Document 2: JP-A 2005-146084
Patent Document 3: JP-A 2007-191706
Patent Document 4: JP-A H05-306344
Patent Document 5: JP-A H05-119217

DISCLOSURE OF THE INVENTION

Problem to be Dissolved by this Invention

This invention was completed in view of the problems and circumstances described above, and the problems to be dissolved is to provide an acrylic resin containing film, which is transparent and highly heat resistant and has significantly improved brittleness, and a polarizing plate using the acrylic resin containing film, in addition thereto, to improve yield in punching process and laminating work of the polarizing late is improved by the polarizing plate, and to provide a liquid crystal display device which can maintain good visibility in long term use.

Technical Means to Dissolve the Problems

The problems in relation to this invention are dissolved by the following means.
1. An acrylic resin containing film composed mainly of an acrylic resin characterized by containing an acrylic resin and a cellulose ester resin in a weight ratio of 51:49 to 95:5 and a retardation control agent.
2. The acrylic resin containing film described in 1. above, characterized in that weight average molecular weight (Mw) of the acrylic resin is not less than 80,000 and total substitution degree of acyl group of the cellulose ester resin is 2.0 to 3.0, substitution degree of acyl group having 3 to 7 carbon atoms is 1.2 to 3.0, and weight average molecular weight (Mw) of the cellulose ester resin is not less than 75,000.
3. The acrylic resin containing film described in 2. above, characterized in that the weight average molecular weight (Mw) of acrylic resin is not less than 110,000.
4. The acrylic resin containing film described in any one of 1. to 3. above, characterized in that an in-plane retardation value Ro(590) defined by Formula (I) is within a range of 30 to 300 nm, and a retardation value in a thickness direction defined Rt(590) by Formula (II) is within a range of 50 to 300 nm, $$Ro(590)=(nx-ny) \times d(\text{nm}) \quad \text{Formula (I)}$$

$$Rt(590)=\{(nx+ny)/2-nz\} \times d(\text{nm}) \quad \text{Formula (II)}$$

in the Formulas, Ro(590) is an in-plane retardation value at a wavelength of 590 nm within the film, Rt(590) is the retardation value in the thickness direction at a wavelength of 590 nm within the film, d is a thickness of the acrylic resin containing film (nm), nx is a maximum refractive index within the film at a wavelength of 590 nm, which is called a refractive index in a retardation direction, ny is a refractive index in a direction orthogonal to the retardation direction at 590 nm, and nz is a refractive index in the thickness direction at a wavelength of 590 nm.
5. The acrylic resin containing film described in any one of 1. to 4. above, characterized in that wavelength dispersion (DSP) defined by Formula (III) is within a range of 0.82 to 0.95, $$DSP=Ro(480)/Ro(630) \quad \text{Formula (III)}$$

In the Formula, Ro(480) is in-plane retardation value at a wavelength of 480 nm, Ro(630) is in-plane retardation value at 630 nm.
6. The acrylic resin containing film described in any one of 1. to 5. above, characterized in that photoelastic coefficient is $-5 \times 10^{-12}$ to $5 \times 10^{-12}$ $Pa^{-1}$.

7. The acrylic resin containing film described in any one of 1. to 6. above, characterized by containing acrylic microparticles in an amount of 0.5 to 45 based on total amount of a resin of the acrylic resin containing film.
8. A polarizing plate characterized by using the acrylic resin containing film described in any one of 1. to 7. above at least at one side.
9. A liquid crystal display device characterized by using the polarizing plate described in above 8 at least at one side of a liquid crystal cell.

Advantage of the Invention an acrylic resin containing film, which is transparent and highly heat resistant and has significantly improved brittleness, and a polarizing plate using the acrylic resin containing film, can be provided. Further, the liquid crystal display device, improved in yield in punching work and laminating work by the polarizing late, the liquid crystal display device can maintain good visibility in long term use.

The advantage of this invention is explained in basic principle mechanism as follows.

The acrylic resin has weak negative birefringence and the cellulose resin has positive birefringence generally, and a film having almost no retardation and no birefringence can be obtained by suitably selecting their blend ratio. Herein the negative birefringence means that retardation occurs in a direction orthogonal to stretch direction. Otherwise, positive birefringence means that retardation occurs in the same direction as the stretch direction.

It becomes possible to control the retardation freely by incorporating a phase control agent in a film having no birefringence. In case of adding, for example, the retardation control agent having positive birefringence, an optical compensation film suitable for a liquid crystal panel employing a vertical alignment liquid crystal in the crystal cell can be produced.

Further, wavelength dispersion of the retardation can be controlled by blending cellulose resin, and optimum wavelength dispersion for retardation exhibited by a retardation control agent. Accordingly, hue change depending on observing direction is suppressed when the liquid crystal display device is produced.

It is possible to obtain small photoelasticity by blending the acrylic resin and the cellulose since the acrylic resin has negative photoelasticity, and the cellulose has positive photoelasticity. It is also possible to obtain small photoelasticity by controlling blending ratio in case that the retardation control agent is added described above.

It is possible to minimize image nonuniformity due to temperature and moisture variation, and stress nonuniformity during the lamination process when a liquid crystal display device employing the optical compensation film.

There is a case not to obtain miscibility when the retardation of the acrylic resin film is controlled by addition of a retardation control agent employing only acrylic resin or only cellulose resin. In this instance, miscibility of the retardation control agent can be improved by blending two resins and selection range of the retardation control agent can be broadened. Further, display of the retardation is improved since resin and retardation control agent becomes uniform in a film by virtue of improved miscibility.

Though there is a tendency that brittleness deteriorates by addition of low molecular weight component such as a retardation control agent, it is possible to minimize the deterioration of brittleness because of miscibility when blending the acrylic resin with cellulose resin.

Stability of the retardation control agent in the film is better than acrylic resin only or cellulose resin only, and bleeding out is hardly appears.

Moisture permeability of the blended resin of the acrylic resin with cellulose resin is not so much as TAC, and is more than cycloolefin polymer which does not permeate at all, and therefore, balance of durability of the polarizing plate against moisture and high temperature and drying ability during polarizing plate preparation is excellent.

BRIEF DESCRIPTION OF DRAWING

FIG. 1: Schematic chart showing dope preparation process, casting process and drying process in the liquid casting film forming method.

NOTES OF SYMBOLS

1: Dissolving tank
3, 6, 12, 15: Filter device
4, 13: Stock tank
5, 14: Liquid providing pump
8, 16: supplying pipe
10: UV absorber introducing tank
20: Junction pipe
21: Mixer
30: Die
31: Metal substrate
32: Web
33: Peeling position
34: Tenter apparatus
35: Roll dryer apparatus
41: Microparticles introducing tank
42: Stock tank
43: Pump
44: Filter

BEST EMBODIMENT TO PRACTICE THE INVENTION

The acrylic resin containing film according to this invention is an acrylic resin containing film containing acrylic resin as a main component, characterized by that it is composed of acrylic resin and cellulose ester resin at a ratio of 51:49 to 95:5 by weight, and contains a retardation control agent. The characteristics are technical characteristics common to claims 1 through 9.

The present invention, composing elements thereof, best type or embodiment to practice the present invention and so on are described in detail.

(Acrylic Resin Containing Film)

The acrylic resin containing film according to this invention is an acrylic resin containing film containing acrylic resin as a main component, characterized by that it is composed of acrylic resin and cellulose ester resin at a ratio of 51:49 to 95:5 by weight, and contains a retardation control agent.

It is preferable that weight average molecular weight (Mw) of the acrylic resin be 80,000 or more, total substitution degree of acyl group of the cellulose ester resin be 2.0 to 3.0, portion other than acyl group having 3 to 7 carbon atom be substituted by acetyl group, and weight average molecular weight Mw of the cellulose ester resin be 75,000 or more. The weight average molecular weight (Mw) acrylic resin is more preferably 110,000

It is also preferable that in-plane retardation value Ro(590) defined by Formula (I) be 30 to 300 nm, and retardation value in thickness direction Rt(590) defined by Formula (II) 50 to 300 nm.

Further it is preferable that wavelength dispersion (DSP) defined by Formula (III) described above be within a range of 0.82 to 0.95. It is also preferable that photoelastic coefficient be $-5 \times 10^{-12}$ to $5 \times 10^{-12}$ $Pa^{-1}$.

An embodiment is preferable which contains acrylic microparticles in an amount of 0.5 to 45% weight based on the total amount of a resin of the acrylic resin containing film.

The composing component, physical property and so on are described in detail hereafter in sequence.

<Acrylic Resin>

Acrylic resins employed in the present invention include methacrylic resins. These resins are not particularly limited, and preferred resins include those which are composed of methyl methacrylate units of 50 to 99% by weight and other monomer units of 1 to 50% by weight which are copolymerizable with the above.

Other copolymerizable monomers include α,β-unsaturated acids such as alkyl methacrylate, in which the number of carbon atoms of the alkyl group is 2 to 18, alkyl acrylate, in which the number of carbon atoms of the alkyl group is 1 to 18, acrylic acid, or methacrylic acid; unsaturated groups containing divalent carboxylic acids such as maleic acid, fumaric acid, or itaconic acid; aromatic vinyl compounds such as styrene or α-methylstyrene; and α,β-unsaturated nitriles such as acrylonitrile or methacrylonitrile; as well as maleic anhydride, maleimide, N-substituted maleimide, and glutaric anhydride. These may be employed individually or in combinations of at least two types.

Of these, in view of heat-decomposition resistance and fluidity of copolymers, preferred are methyl acrylate, ethyl acrylate, n-propyl acrylate, n-butyl acrylate, s-butyl acrylate, and 2-ethylhexyl acrylate, and methyl acrylate and n-butyl acrylate are particularly preferred to be employed.

Specifically, in view of mechanical strength as a film and fluidity during manufacturing a film, the weight average molecular weight of the acrylic resin, employed in the acrylic resin containing film of the present invention, is preferably 800 to 1,000,000.

The weight average molecular weight of acrylic resins of the present invention can be measured via gel permeation chromatography. Measurement conditions are as follows.

Solvent: methylene chloride
Columns: SHODEX K806, K805, and K803G (produced by Showa Denko K. K., three columns were employed via connections)
Column temperature: 25° C.
Sample concentration: 0.1% by weight
Detector: RI Model 504 (produced by GL Sciences Inc.)
Pump: L6000 (produced by Hitachi Ltd.)
Flow rate: 1.0 ml/minute
Calibration curve: A calibration curve prepared by employing 13 samples of standard polystyrene STK (produced by Tosoh Corp.) was employed. It is preferable to employ the 13 samples at nearly equal intervals.

The manufacturing methods of acrylic resin in the present invention are not particularly limited, and employed may be any of the conventional methods such as suspension polymerization, emulsion polymerization, bulk polymerization, or solution polymerization. As a polymerization initiator, employed may be common peroxide type and azo type ones. Further, redox type ones may be included. With regard to polymerization temperature, the suspension or emulsion polymerization may be carried out between 30 and 100° C., while the bulk or solution polymerization may be carried out between 80 and 160° C. In order to control the reduction viscosity of the resulting copolymer, polymerization may be carried out employing alkylmercaptan as a chain transfer agent.

Compatibility of brittleness with heat resistant performance can be obtained.

As the acrylic resins according to the present invention, also employed may be commercial ones. Examples thereof include DERPET 60N and 80N (both produced by Asahi Kasei Chemicals Co., Ltd.), DIANAL BR52, BR80, BR83, BR85, and BR88 (all manufactured by Mitsubishi Rayon Co., Ltd.), and KT75 (produced by Denki Kagaku Kogyo K. K.).

<Cellulose Ester Resin>

The cellulose resin of this invention may be substituted with any of an aliphatic acyl group or aromatic acyl group, and preferably is substituted with an acetyl group.

The aliphatic acyl group is one having a number of carbon atoms of 2 to 20, and practically, includes an acetyl, propionyl, butylyl, isobutyryl, valeryl, pivaloyl, hexanoyl, octanoyl, lauroyl and stearoyl group, in case that the cellulose ester resin of this invention is an ester of the aliphatic acyl group.

The aliphatic group further includes one having a substituent, and the substituent is one represented as the substituent of the benzene in case that the aromatic ring is benzene described above.

When above cellulose ester resin incorporates aromatic acyl groups as a substituent, the number of substituents X substituted onto an aromatic ring is 0 or 1 to 5, and preferably 1 to 3, and particularly preferably 1 or 2.

Further, when the number of substituents substituted onto an aromatic ring is at least 2, they may be the same or differ. Further, they may be combined to form condensed polycyclic compounds (for example, naphthalene, indene, indene, phenanthrene, quinoline, isoquinoline, chromene, chroman, phthalazine, acridine, indole, and indoline).

Cellulose ester resin, described above, has a structure having at least one a substituted or non-substituted aliphatic acyl group or a substituted or non-substituted aromatic acyl group is employed as a structure in the cellulose ester resins of the present invention. These may be a sole or mixture acid ester of the cellulose.

As for the substitution degree of cellulose ester resin according to the present invention, the total substitution degree (T) of the acyl group is 2.0 to 3.0, while the substitution degree (r) of the acyl group having 3 to 7 carbon atoms bis 1.2 to 3.0.

Further, the preferred structure is that the total substitution degree of those other than the acyl group having 3 to 7 carbon atoms.

Cellulose ester resin according to the present invention is preferably one type having an acyl group having 2 to 7 carbon atoms as a substituent, that is, one selected from cellulose acetate, cellulose propionate, cellulose butyrate, cellulose acetate propionate, cellulose acetate butyrate, cellulose acetate benzoate, and cellulose acetate benzoate.

Of these, particularly preferred cellulose ester resins include cellulose acetate, cellulose propionate, cellulose butyrate, cellulose acetate propionate and cellulose acetate butyrate.

More preferably is low aliphatic acid ester of cellulose acetate propionate and cellulose acetate butyrate as mix aliphatic acid, and it is preferable one having acyl group having 2 to 4 acyl group as a substituent.

A portion which is not substituted with the acyl group commonly exists as a hydroxyl group. It is possible to synthesize these via common methods known in the art.

The substitution degree of the acetyl group and other acyl groups refers to the value determined by the method specified in ASTM-D817-96.

Weight average molecular weight (Mw) of the cellulose ester resins according to the present invention is preferably 75,000 to 250,000, is more preferably 100,000 to 240,000.

<Acrylic Particles>

The acrylic resin containing film of the present invention may incorporate acrylic particles.

Acrylic particles according to the present invention is characterized in that they exist in a particle state (hereinafter also referred to as a non-miscible state) in an acrylic resin containing film composed of above described acrylic resin and cellulose ester.

A specified amount of a prepared acrylic resin containing film is sampled, and the above acrylic resin containing film is dissolved in solvents. After complete dissolution/dispersion, filtration is carried out employing a membrane filter produced by PTFE having a pore diameter which is less than the average particle diameter of acrylic particles. It is preferable that any insoluble compounds which are collected via the above filtration are at least 90% by weight of acrylic particles added to the acrylic resin containing film.

Acrylic particles employed in the present invention are not particularly limited, but it is preferable that each of acrylic particles is structured to have a layer configuration of at least two layers. Further, it is specifically preferable that each particle is an acrylic granular complex having the following multilayer structure.

The multilayer structure acrylic granular complex refers to a multilayer particle structure of acrylic polymer in which, toward the periphery from the center, an innermost hard layer polymer, a crosslinked soft layer polymer exhibiting rubber elasticity, and the outermost hard layer polymer are arranged.

As a preferred embodiment of the multilayer structure acrylic granular complex employed in the acrylic resin composition according to the present invention, listed is the one described below: an acrylic granular complex which incorporates a 3-layer structure composed of (a) an innermost hard layer polymer which is prepared by polymerizing a monomer mixture of 80 to 98.9% by weight of methyl methacrylate, 1 to 20% by weight of alkyl acrylate in which the number of carbon atoms of the alkyl group is 1 to 8, 0.01 to 5% by weight of polyfunctional crosslinking agents, and 0.01 to 0.3% by weight of polyfunctional grafting agents, (b) a crosslinked soft layer polymer which is prepared by polymerizing, in the presence of the above innermost hard layer polymer, a monomer mixture of 75 to 98.5% by weight of alkyl acrylate in which the number of carbon atoms of the alkyl group 4 to 8, 0.01 to 5% by weight of polyfunctional crosslinking argents, and 0.5 to 5% by weight of functional grafting agents, and (c) an outermost hard layer polymer which is prepared by polymerizing, in the presence of the polymer composed of the above innermost hard layer and crosslinked soft layer, a monomer mixture of 80 to 99% by weight of methyl methacrylate, 1 to 20% by weight of alkyl acrylate in which the number of carbon atoms of the alkyl group of 1 to 8, and the resulting 3-layer structure polymer is composed of 5 to 40% by weight of innermost hard layer polymer (a), 30 to 60% by weight of soft layer polymer (b), and 20 to 50% by weight of outermost hard layer polymer (c), and when being subjected to fraction via acetone, an insoluble portion exists and the methyl ethyl ketone swelling degree of the above insoluble portion is 1.5 to 4.0.

As disclosed in JP-B S60-17406 and H03-39095, not only by specifying the composition of each layer of the multilayer structure acrylic granular complex and the particle size, but also by setting the pulling elastic modulus of the multilayer structure acrylic granular complex and the methyl ethyl ketone swelling degree of the acetone-insoluble portion within the specified range, it is possible to realize a sufficient balance between the impact resistance and the stress resistance whitening properties.

It is preferable that innermost hard layer polymer (a), which constitutes the multilayer structure acrylic granular complex, is prepared by polymerizing a monomer mixture composed of 80 to 98.9% by weight of methyl methacrylate, 1-20% by weight of alkyl acrylate in which the number of carbon atoms of the alkyl group is 1 to 20, and 0.01 to 0.3% by weight of polyfunctional grafting agents.

Alkyl acrylates, in which the number of carbon atoms of the alkyl group is 1 to 8, include methyl acrylate, ethyl acrylate, n-propyl acrylate, n-butyl acrylate, s-butyl acrylate, and 2-ethylhexyl acrylate, and of these, preferably employed are methyl acrylate and n-butyl acrylate.

The ratio of alkyl acrylate units in innermost hard layer polymer (a) is commonly 1 to 20% by weight. When the aforesaid units are less than 1% by weight, the resulting polymer tends to thermally decompose, while when they exceeds 20% by weight, the glass transition temperature of innermost hard layer polymer (c) is lowered, whereby impact resistance providing effects of the 3-layer structure acrylic granular complex is degraded. Accordingly, neither case is preferred.

Polyfunctional grafting agents include polyfunctional monomers, having different polymerizable functional groups, such as allyl ester of acrylic acid, methacrylic acid, maleic acid and fumaric acid, and allyl methacrylate is preferably employed. Polyfunctional grafting agents are employed to chemically combine the innermost hard layer polymer and the soft layer polymer. The ratio when employed in the innermost hard layer polymerization is 0.01 to 0.3% by weight.

As crosslinked soft layer polymer (b) which constitutes an acrylic granular complex, preferred is one which is prepared by polymerizing, in the presence of above innermost hard layer polymer (a), a monomer mixture of 75 to 98.5% by weight of alkyl acrylate in which the number of carbon atoms of the alkyl group is 1 to 8, 0.01 to 5% by weight of polyfunctional crosslinking agents, and 0.5 to 5% by weight of polyfunctional grafting agents.

As an alkyl acrylate in which the number of carbon atoms of the alkyl group is 4 to 8, preferably employed are n-butyl acrylate and 2-ethylhexyl acrylate.

Further, together with these polymerizable monomers, it is possible to copolymerize other monofunctional monomers at 25% by weight or less which are copolymerizable.

Other monofunctional monomers which are copolymerizable include styrene and substituted styrene derivatives. With regard to the ratio of alkyl acrylates in which the number of carbon atoms of the alkyl group is 4 to 8 to styrene, as the former ratio increases, the glass transition temperature of polymer (b) is lowered, whereby softness is achievable.

On the other hand, in view of transparency of resin compositions, it is advantageous to make close the refractive index of soft layer polymer (b) at normal temperature to that of innermost hard layer polymer (a), outermost hard layer polymer (c), and thermally plastic hard acrylic resins. Upon considering the above, the ratio of both is chosen.

Styrene may not be copolymerized for a use with thin coverage, for example.

As a polyfunctional grafting agent, employed may be ones cited in the item of above innermost layer hard polymer (a).

Polyfunctional grafting agents employed herein are employed to chemically combine soft layer polymer (b) and outermost hard layer polymer (c), and in view of providing of targeted impact resistance effects, the ratio employed during the innermost hard layer polymerization is preferably 0.5 to 5% by weight.

As an employable polyfunctional crosslinking agent may be commonly known crosslinking agents such as divinyl compounds, diallyl compounds, or dimethacryl compounds. Of these, preferably employed are polyethylene glycol diacrylate (at a molecular weight of 200 to 600).

Polyfunctional crosslinking agents, employed herein, are employed to realize effects of impact resistance via formation of a crosslinking structure during polymerization of soft layer (b). However, when the above polyfunctional grafting agents are employed during polymerization of the soft layer, the crosslinking structure in soft layer (b) is formed to some extent. Accordingly, polyfunctional crosslinking agents are not essential components. In view of targeted effects to provide impact resistance, the ratio of polyfunctional crosslinking agents during soft layer polymerization is preferably 0.01 to 5% by weight.

As outermost hard layer polymer (c) which constitutes a multilayer structure acrylic granular complex, preferred is one which is prepared, in the presence of the above innermost hard layer polymer (a) and soft layer polymer (b), by polymerizing a monomer mixture composed of 80 to 99% by weight of methyl methacrylate and 1 to 20% by weight of alkyl acrylate in which the number of carbon atoms in the alkyl group is 1 to 8.

As alkyl acrylates, employed are those described above, and of these, preferably employed are methyl acrylate and ethyl acrylate. The ratio of alkyl acrylate units in uppermost hard layer (c) is preferably 1 to 20% by weight.

Further, to enhance miscibility with acrylic resin during polymerization of outermost hard layer (c), it is possible to employ mercaptan as a chain transfer agent to regulate the resulting molecular weight.

In particular, to improve the balance between elongation and impact resistance, it is preferable to result in a gradient so that the molecular weight gradually decreases from the interior to the exterior. A specific method is as follows. A monomer mixture to form the outermost hard layer is divided into at least two parts. By a technique in which chain transfer agents, which are added each time, are gradually increased, it is possible to decrease the molecular weight of polymers to form the outermost hard layer from the interior of the multilayer structure acrylic granular complex to the exterior.

It is possible to check the molecular weight during the above formation as follows. The monomer mixture employed each time is individually polymerized under the same conditions, and the molecular weight of the resulting polymer is determined.

The diameter of acrylic particles preferably employed in the present invention is not particularly limited. The above diameter is preferably 10 to 1,000 nm, is more preferably 20 to 500 nm, and is most preferably 50 to 400 nm.

In the acrylic granular complex, which is the multilayer structure polymer preferably employed in the present invention, the weight ratio of the core and the shell is not particularly limited. When the entire multilayer structure polymer is assigned at 100 parts by weight, the core layer occupies preferably 50-90 parts by weight, but occupies more preferably 60 to 80 parts by weight.

Examples of commercial products of the above multilayer structure acrylic granular complex include "METABLEN" produced by Mitsubishi Rayon Co., Ltd., "KANEACE" produced by Kaneka Corp., "PARALOID" produced by Kureha Chemical Industry Co., Ltd., "ACRYLOID" produced by Rohm and Has Co., "STAFILOID" produced by Ganz Chemical Industry Co., and "PARAPET SA" produced by Kuraray Co., Ltd. These products may be employed individually or in combinations of at least two.

Further, specific examples of acrylic particles, which are composed of graft copolymers, appropriately employed as acrylic particles preferably employed in the present invention, include graft polymers which are prepared by copolymerizing, in the presence of rubber polymers, a mixture of monomers composed of unsaturated carboxylic acid ester type monomers, unsaturated carboxylic acid type monomers, and aromatic vinyl type monomers, as well as if desired, other vinyl type monomers which are copolymerizable with the above.

Rubber polymers employed in acrylic particles, which are graft copolymers, are not particularly limited, and diene type rubber, acryl type rubber, and ethylene type rubber are employable. Specific examples thereof include polybutadiene, styrene-butadiene copolymers, styrene-butadiene block copolymers, acrylonitrile-butadiene copolymers, butyl acrylate-butadiene copolymers, polyisoprene, butadiene-methyl methacrylate copolymers, butyl acrylate-methyl methacrylate copolymers, butadiene-ethyl acrylate copolymers, ethylene-propylene copolymers, ethylene-propylenediene type copolymers, ethylene-isoprene copolymers, and ethylene-methyl acrylate copolymers. These rubber polymers may be employed individually or in combinations of at least two types.

Further, in view of preparation of a highly transparent film, it is preferable that the refractive index of the mixture of acrylic resin and cellulose ester resin is near that of acrylic particles. Specifically, any difference in the refractive index between acrylic particles and acrylic resin is preferably at most 0.05, is more preferably at most 0.02, but is most preferably at most 0.01.

In order to satisfy the above refractive index conditions, it is possible to decrease the difference in refractive index by employing a method in which each monomer unit composition ratio is regulated, and/or a method in which the composition ratio of employed rubber polymers or monomers is regulated, whereby it is possible to prepare an acrylic resin containing film which excels in transparency.

Difference in refractive index, as described herein, refers to the following. The acrylic resin containing film of the present invention is sufficiently dissolved in acrylic resin dissolvable solvents under optimal conditions to prepare a milky-white solution. The resulting solution is separated into a solvent soluble portion and a solvent insoluble portion via an operation such as centrifugal separation. Subsequently, each of the soluble portion (acrylic resin) and the insoluble portion (acrylic particles) is purified. Thereafter, each refractive index is determined (at 23° C. and 550 nm wavelength), whereby the difference is obtained.

Methods to blend acrylic resin with acrylic particles in the present invention are not particularly limited. A method is preferably employed in which after blending acrylic resin with other optional components, the resulting blend is homogeneously melt-kneaded via a uniaxial or biaxial extruder while adding acrylic particles at 200 to 350° C.

Further, it is possible to employ a method in which a solution, into which acrylic particles have been dispersed, is mixed with a solution (being a dope solution) which is prepared by dissolving acrylic resin and cellulose ester resin in solvents, and a method in which a solution which is prepared by dissolving acrylic particles and other optional additives in solvents is added in-line.

It is possible to employ, as the acrylic particles according to the present invention, commercial products. Examples thereof may include METABLEN W-341 (C2) (produced by Mitsubishi Rayon Co., Ltd.) and CHEMISNOW MR-2G (C3) and MS-300X (C4) (produced by Soken Chemical & Engineering Co., Ltd.).

It is preferable that the acrylic particles are incorporated in the acrylic resin containing film of this invention in an amount of 0.5 to 45 5 by weight type on the total amount of resins composing the film.

(Retardation Control Agent)

Retardation control agents are additives mainly to control the retardation in this application. Compounds disclosed in JP-A 2002-296421 and various ester type plasticizers can be employed. Preferable ester type compounds are detailed below.

Preferable compounds are those having a structure in which aromatic rings are arranged within a plane when they are added and withdrawn as additives among those described below in this invention. Therefore compound having aromatic rings as a block in a main chain or a side chain is preferable.

<Polyesterpolyol of Glycol and Dibasic Acid>

Polyesterpolyol to be used in the invention is preferably those obtained by dehydration polycondensation reaction of a glycol having an average carbon number of from 2 to 3.5 and a dibasic acid having an average carbon number of from 4 to 4.5, or by addition and dehydration polycondensation reaction of said glycol and a dibasic acid anhydrite having an average carbon number of from 4 to 4.5

Examples of the glycol include ethylene glycol, diethylene glycol, 1,2-propylene glycol, 1,3-propylene glycol, 2-methyl-1,3-propanediol, 1,4-butylene glycol, neopentyl glycol, 3-methyl-1,5-pentanediol and 1,6-hexanediol, which may be used singly or in combination of two or more kinds thereof. For example, ethylene glycol or a mixture of ethylene glycol and diethylene glycol are particularly preferably used.

As to the above glycol, it is preferable that the average number of carbon atom is within the range of from 2 to 3.5, in view of production efficiency polyester polyol and miscibility with cellulose and transparency.

When a mixture of ethylene glycol and diethylene glycol is used as the glycol, the mole ratio of ethylene glycol/diethylene glycol is preferably from 25 to 100/75 to 0. Thus an improving agent for cellulose ester superior in the miscibility with the cellulose ester can be obtained. The ratio is more preferably 25 to 40/75 to 60 and 60 to 95/40 to 5. By applying such the ratio, the polyester polyol having crystallinity and melting point near those of usually used one can be obtained and the production efficiency of itself can be improved.

<Dibasic Acid>

As the dibasic acid constituting the polyester polyether used in this invention, for example, succinic acid, glutaric acid, adipic acid and sebacic acid can be cited, they may be used singly or in combination of two or more kinds thereof, and succinic acid and a mixture of succinic acid and terephthalic acid are particularly preferred.

As to the above dibasic acid, it is preferable that the average number of carbon atom of the dibasic acid is within the range of from 4 to 5.5, in view of production efficiency polyester polyol and miscibility with cellulose and transparency.

When a mixture of succinic acid and phthalic acid is used as the dibasic acid, the mole ratio of succinic acid/phthalic acid is preferably from 25 to 100/75 to 0. Thus an improving agent for cellulose ester superior in the miscibility with the cellulose ester can be obtained. The ratio is more preferably 25 to 40/75 to 60 and 60 to 95/40 to 5. By applying such the ratio, polyester having crystallinity and melting point near those of usually used one can be obtained and the production efficiency of itself can be improved.

The combination of the glycol and the dibasic acid constituting the foregoing polyester to be used in the invention includes a combination other than the above and a combination is preferable, in which the sum of the average carbon atom number of the glycol and that of the dibasic acid is from 6 to 7.5.

The number average molecular weight of the polyester obtained by the glycol and the dibasic acid may be within the range of from 1,000 to 200,000, the polyester is basically one having a hydroxyl group at the terminal thereof and a number average molecular weight of from 1,5000 to 5,000, particularly from 1,200 to 4,000, is preferably used. A retardation control agent (modifier for polyester) superior in the miscibility with the cellulose ester can be obtained by using the polyester polyol having the number average molecular weight within such the range via solid phase reaction.

It is preferable for obtaining the effect of the invention that the film contains the above polyester polyol having the number average molecular weight of not less than 1,000 in a ratio of from 2 to 30% and more preferably from 10 to 20% by weight in view of the effect of this invention such as display of retardation, compatibility and reducing moisture permeability. Practically, the content of the polymer in the film is decided within the range in which the phase separation is not caused in the dope, web or after film formation, depending on the kind and the weight average molecular weight of the polymer in accordance with properties such as the dimensional stability, the reserving ability and the transparence.

The content of the carboxyl group terminal of the polyester polyol to be used in the invention is preferably not more than 1/20 and more preferably not more than 1/40 in mole number of the hydroxyl group terminal standing on the viewpoint of the physical properties.

A known esterification catalyst such as an organic salt or a chelate of metal such as titanium, zinc, lead and zirconium or antimony oxide can be used on the occasion of preparation of the above polyester polyol. As such the esterification catalyst, for example, tetraisopropyl titanate and tetrapropyl titanate are preferably used, and the using amount is preferably from 0.0005 to 0.02 parts by weight to 100 parts by weight of the sum of glycol (a) and dibasic acid (b).

The polycondensation of the polyester polyol is carried out by a usual method. It is easily synthesized by, for example, a direct reaction of the dibasic acid with the glycol, a thermal melt condensation method by a esterification reaction or an ester interchanging reaction of the above dibasic acid or an alkyl ester thereof such as a methyl ester with the glycol, or a dehydrohalogenation reaction of an acid chloride of the dibasic acid with the glycol. The direct reaction is preferably applied for preparing the polyester polyol having a relatively small weight average molecular weight. The polyester polyol having high frequency of molecular weight on the lower molecular weight side shows considerably high miscibility with the cellulose ester and cellulose ester film having low moisture permeability and high transparency can be obtained after formation of the film. The method for controlling the molecular weight is not specifically limited and usual methods can be applied. For example, the molecular weight can be controlled by adding amount of a mono-valent acid or a mono-valent alcohol in a method for blocking the molecular terminal by the mono-valent acid or the mono-valent alcohol in accordance with the polymerization condition. In such the case, the control by the mono-valent acid is preferable for the stability of the polymer. As example of such the acid, acetic acid, propionic acid, butyric acid, pivalic acid and benzoic acid can be cited. One of such the acids is selected, which is difficultly distilled out to the reaction system during the polymerization reaction and easily distilled out at the time for removing the mono-valent acid after stopping the polymerization reaction. These acids may be used in mixture. In the case of the direct reaction, the number average molecular weight can be controlled by deciding the time for stopping the reaction according to the amount of water distilled out in the course of reaction. The control of the number average molecular weight can be also carried out by biasing the mole number of the glycol or the dibasic acid or by controlling the reaction temperature.

(Ester of Aromatic Dicarboxylic Acid and Alkylene Glycol)

Aromatic terminal ester type plasticizers represented by following Formula (1) may be used as a retardation control agent relating to this invention.

$$B\text{-}(G\text{-}A)_n\text{-}G\text{-}B \qquad \text{Formula (1)}$$

wherein B represents a benzene monocarboxylic acid residue; G represents an alkylene glycol residue having 2 to 12 carbon atoms, an aryl glycol residue having 6 to 12 carbon atoms, or an oxyalkylene glycol residue having 4 to 12 carbon atoms; A represents an alkylene dicarboxylic acid residue having 4 to 12 carbon atoms or an aryldicarboxylic acid residue having 6 to 12 carbon atoms; and n represents an integer of at least 1.

In Formula (1), constitution is performed employing the benzene monocarboxylic acid residue represented by B, the alkylene glycol residue, the oxyalkylene glycol residue, or the aryl glycol residue represented by G, and the alkylene dicarboxylic acid residue or the aryl dicarboxylic acid reside represented by A, and preparation is performed employing the same reactions as for common polyester type plasticizers.

Examples of a benzene monocarboxylic acid component of the aromatic terminal ester plasticizer of the present invention include: benzoic acid, p-tert-butyl benzoic acid, o-toluic acid, toluic acid, p-toluic acid, dimethyl benzoic acid, ethyl benzoic acid, n-propyl benzoic acid, aminobenzoic acid and acetoxy benzoic acid, which may be used alone or in combination of two or more acids.

Examples of an alkylene glycol component having 2 to 12 carbon atoms of the aromatic terminal ester plasticizer include: ethylene glycol, 1,2-propylene glycol, 1,3-propylene glycol, 1,2-butanediol, 1,3-butanediol, 2-methyl-1,3-propanediol, 1,4-butanediol, 1,5-pentanediol, 2,2-dimethyl-1,3-propanediol(neopentylglycol), 2,2-diethyl-1,3-propanediol (3,3-dimethylol pentane), 2-n-butyl-2-ethyl-1,3-propanediol (3,3-dimethylol heptane), 3-methyl-1,5-pentanediol-1,6-hexanediol, 2,2,4-trimethyl-1,3-pentanediol, 2-ethyl-1,3-hexanediol, 2-methyl-1,8-octanediol, 1,9-nonanediol, 1,10-decanediol, 1,12-octadecanediol, which may be used alone or in combination of two or more glycols.

Examples of an oxyalkylene glycol component having 4-12 carbon atoms of the aromatic terminal ester include: diethylene glycol, triethylene glycol, tetraethylene glycol, dipropylene glycol and tripropylene glycol, which may be used alone or in combination of two or more glycols.

Examples of an aryl glycol component having 6 to 12 carbon atoms of the aromatic terminal ester include: hydroquinone, resorcin, bisphenol A, bisphenol F and bisphenol, which may be used alone or in combination of two or more glycols.

Examples of an alkylene dicarboxylic acid component having 4 to 12 carbon atoms of the aromatic terminal ester include: succinic acid, maleic acid, the fumaric acid, glutaric acid, adipic acid, azelaic acid, sebacic acid and dodecane dicarboxylic acid, which may be used alone or in combination of two or more acids. Examples of an aryl dicarboxylic acid component having 6 to 12 carbon atoms include: phthalic acid, terephthalic acid, 1,5-naphthalene dicarboxylic acid and 1,4-naphthalene dicarboxylic acid, which may be used alone or in combination of two or more acids.

The number average molecular weight of the aromatic terminal ester plasticizer used in the present invention is preferably 300-2,000, and more preferably 500 to 1,500. The acid value of the aromatic terminal ester plasticizer used in the present invention is preferably not more than 0.5 mgKOH/g and hydroxyl value is preferably not more than 25 mgKOH/g, and more preferably the acid value not more than 0.3 mgKOH/g, and the hydroxyl value of not more than 15 mgKOH/g.

(Acid Value and Hydroxyl Value of Aromatic Terminal Ester)

"Acid value" means the milligrams of potassium hydroxide required to neutralize the acid (carboxyl group existing in a specimen) included in 1 g of sample. Alternatively, "hydroxyl value" means the milligrams of potassium hydroxide required to neutralize the acetic acid bonded to the hydroxyl groups after acetylation of 1 g of sample. The acid value and the hydroxyl value are measured type on JIS K0070.

Examples of a synthetic method of an aromatic terminal ester plasticizer are shown below:

<Sample No. 1 (Aromatic Terminal Ester Sample)>

In a container, 820 weight parts (5 moles) of phthalic acid, 608 weight parts (8 moles) of 1,2-propylene glycol, 610 weight parts (5 moles) of benzoic acid and 0.30 weight part of tetra-isopropyl titanate (as a catalyst) were loaded at a time, and, while stirring under a nitrogen atmosphere, the mixture was heated at 130 to 250° C. until the acid value decreased to 2 or less. The excess monovalent alcohol was refluxed using a reflux condenser and produced water was continuously removed. Then, the container was evacuated to $6.65 \times 10^3$ Pa and, finally, to $4 \times 10^2$ Pa at 200 to 230° C., while the distillate was removed. The product was filtered to obtain an aromatic terminal ester having the following features:

| | |
|---|---|
| Viscosity (25° C.): | 19,815 mPa·s |
| Acid value: | 0.4 |

<Sample No. 2 (Aromatic Terminal Ester Sample)>

An aromatic terminal ester having the following features was prepared in the same manner as Sample No. 1 except that 500 weight parts (3.5 moles) of adipic acid, 305 weight parts (2.5 moles) of benzoic acid, 583 weight parts (5.5 moles) of diethylene glycol and 0.45 weight part of tetra-isopropyl titanate (as a catalyst) were used.

| | |
|---|---|
| Viscosity (25° C.): | 90 mPa·s |
| Acid value: | 0.05 |

<Sample No. 3 (Aromatic Terminal Ester Sample)>

An aromatic terminal ester having the following features was prepared in the same manner as Sample No. 1 except that 737 weight parts (5.5 moles) of isophthalic acid, 305 weight parts (2.5 moles) of benzoic acid, 737 weight parts (5.5 moles) of dipropylene glycol and 0.40 weight part of tetra-isopropyl titanate as a catalyst were used.

| Viscosity (25° C.): | 33,400 mPa · s |
|---|---|
| Acid value: | 0.2 |

Specific examples of an aromatic terminal ester plasticizer of the present invention will be shown below, however, the present invention is not limited thereto.

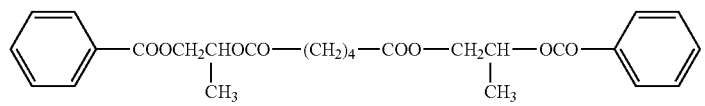

(1)

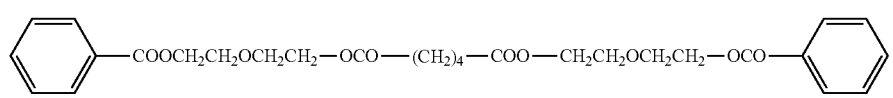

(2)

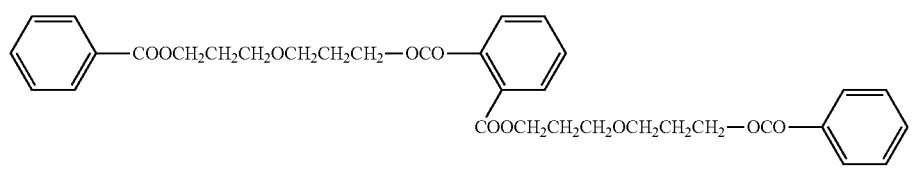

(3)

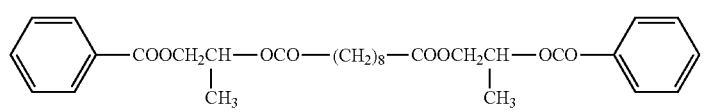

(4)

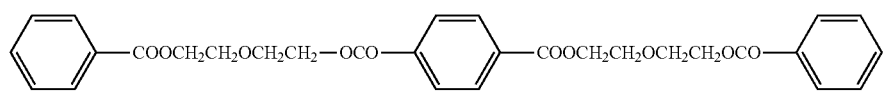

(5)

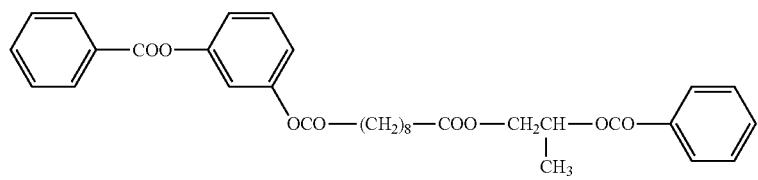

(6)

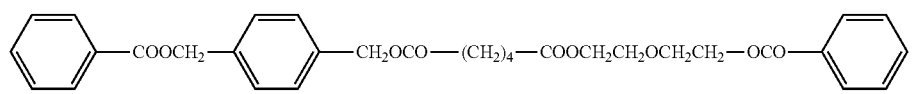

(7)

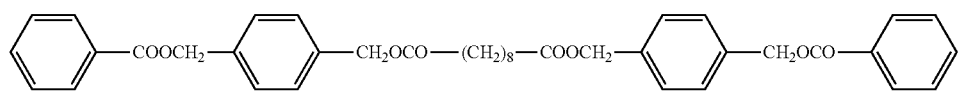

(8)

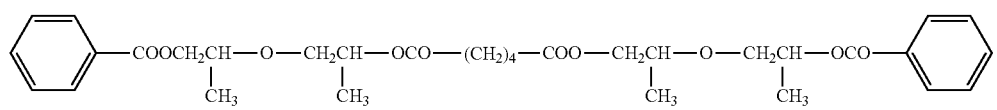

(9)

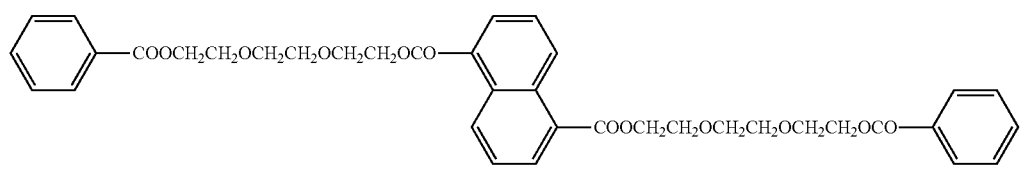

(10)

The content of the aromatic terminal ester plasticizer of the present invention is preferably 1 to 20% by weight and more preferably 3 to 11% by weight type on the weight of the cellulose ester film.

(Polyhydric Alcohol Ester>

A polyhydric alcohol ester type plasticizer can be used as the retardation control agent in the present invention.

A polyhydric alcohol ester is composed of a fatty acid polyhydric alcohol of not less than divalent and a monocarboxylic acid, and is preferably provided with an aromatic ring or a cycloalkyl ring in a molecule.

Polyhydric alcohol preferably utilized in this invention is represented by following formula (1).

R1-(OH)n      Formula (1)

wherein, R1 is an n-valent organic group, n is a positive integer of not less than 2 and OH is an alcoholic or phenolic hydroxyl group.

Examples of preferable polyhydric alcohol include such as the following, however, this invention is not limited thereto. Listed are such as adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Preferably are triethylene glycol, tetraethylene glycol, dipropylene glycol, tripropylene glycol, sorbitol, trimethylolpropane and xylitol.

Monocarboxylic acid utilized in polyhydric alcohol ester is not specifically limited and such as conventionally known fatty acid monocarboxylic acid, alicyclic monocarboxylic acid and aromatic monocarboxylic acid can be utilized. It is preferable to utilize alicyclic monocarboxylic acid or aromatic monocarboxylic acid with respect to improvement of moisture permeability and reservation property. Examples of preferable monocarboxylic acid include the followings; however, this invention is not limited thereto.

As fatty acid monocarboxylic acid, fatty acid having a straight chain or a branched chain of carbon number of 1 to 32 can be preferably utilized. The carbon number is more preferably 1 to 20 and specifically preferably 1 to 10. It is preferable to incorporate acetic acid because of increasing miscibility with cellulose ester, and it is also preferable to utilize acetic acid and other monocarboxylic acid by mixing.

Preferable monocarboxylic acid includes saturated fatty acid such as acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenic acid, oleic acid, sorbic acid, linoleic acid, linolenic acid and arachidonic acid. Examples of preferable alicyclic monocarboxylic acid include cyclopentane carboxylic acid, cyclohexane carboxylic acid and cyclooctane carboxylic acid or derivatives thereof. Examples of preferable aromatic monocarboxylic acid include those in which an alkyl group is introduced into a benzene ring of such as benzoic acid and toluic acid, aromatic carboxylic acid having at least two benzene rings such as biphenyl carboxylic acid, naphthalene carboxylic acid and tetralin carboxylic acid, or derivatives thereof. Benzoic acid is specifically preferable.

A molecular weight of polyhydric alcohol ester is not specifically limited, however, is preferably in a range of 300 to 1,500 and more preferably in a range of 350 to 750. The molecular weight is preferably the larger because of being hard to evaporate, while the smaller is preferable with respect to moisture permeability and miscibility with cellulose ester. Carboxylic acid utilized in polyhydric alcohol may be either one type or a mixture of two or more types. Further, OH groups in polyhydric alcohol may be all esterified or may partly remain as an OH group. In the following, specific examples of polyhydric alcohol will be exemplified.

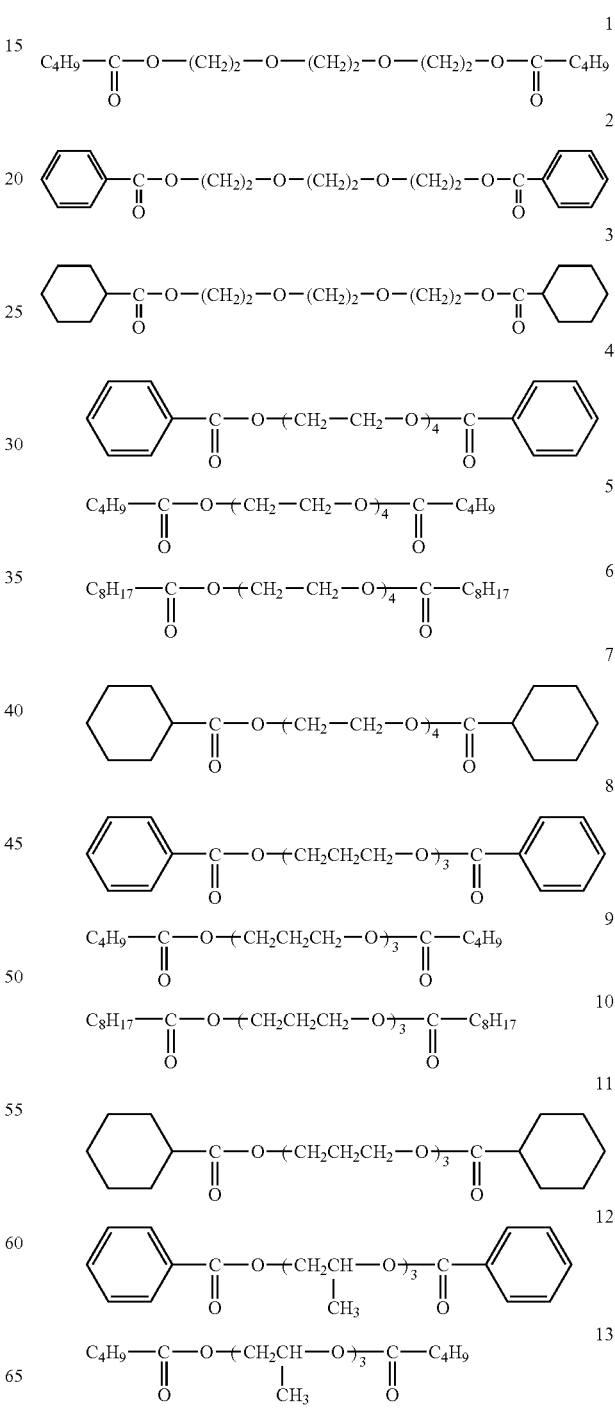

-continued
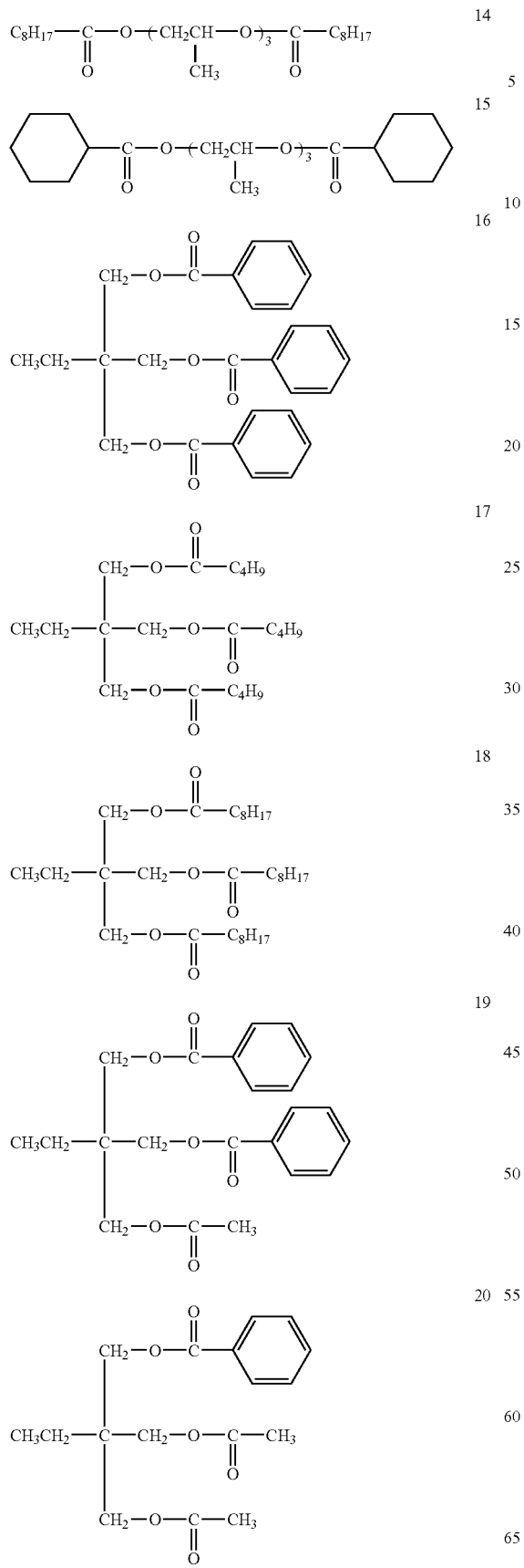
-continued
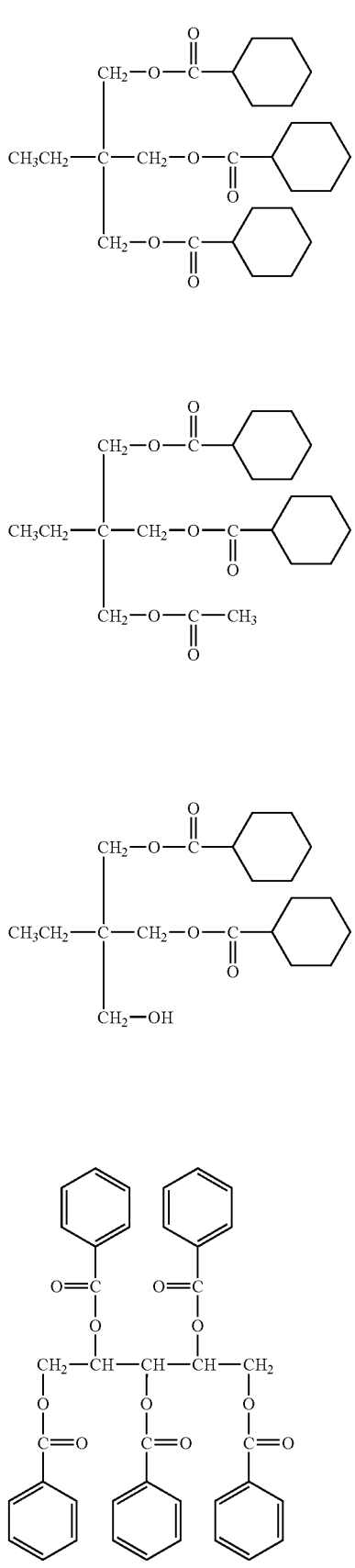

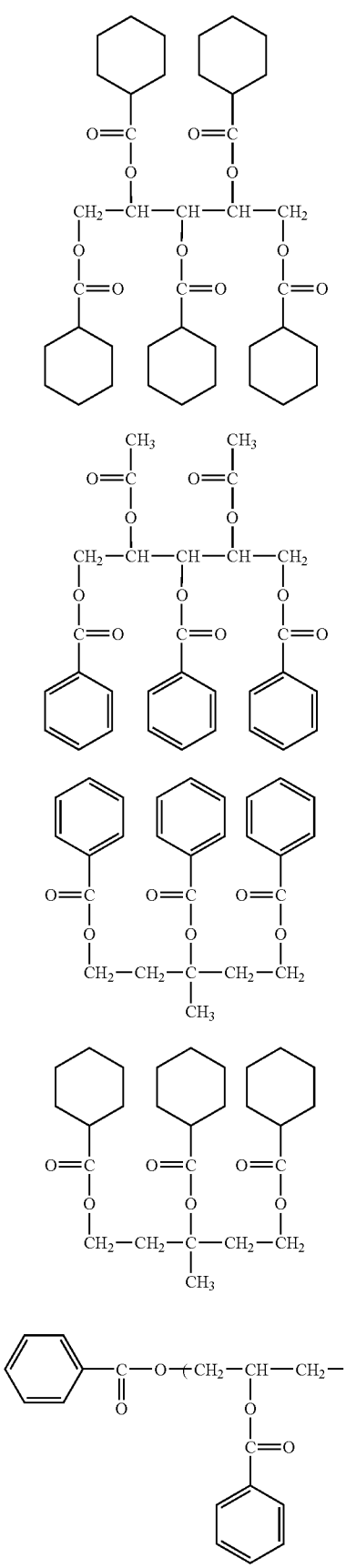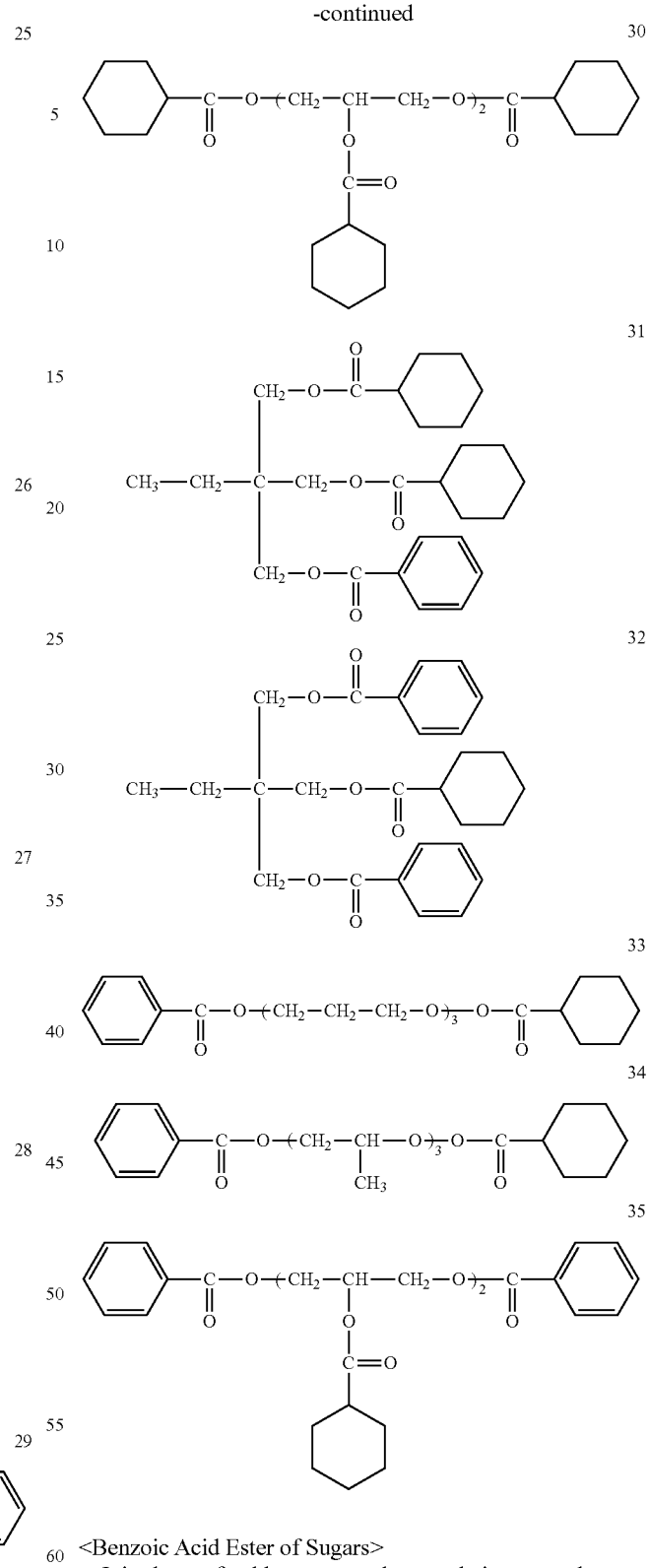

<Benzoic Acid Ester of Sugars>

It is also preferable to use, as the retardation control agent, a (meth)acryl type polymer as well as an esterified compound in which all or a part of OH groups in Compound (A) having one furanose structure or pyranose structure are esterified, or an esterified compound in which all or a part of OH groups in Compound (B) bonding 2 to 12 of at least one type of furanose structures or pyranose structures are esterified. The esterified compound of (A) and the esterified compound of (B) are called a sugar ester compound in this invention.

Further, the above mentioned esterified compound is preferably benzoate of monosaccharide (α-glucose, β-fructose) or benzoate of polysaccharide prepared by dehydration condensation of arbitrary two or more of —OR$_{12}$, —OR$_{15}$, —OR$_{22}$ and —OR in monosaccharide represented by the aforesaid Formula (2), in which m+n=2 to 12.

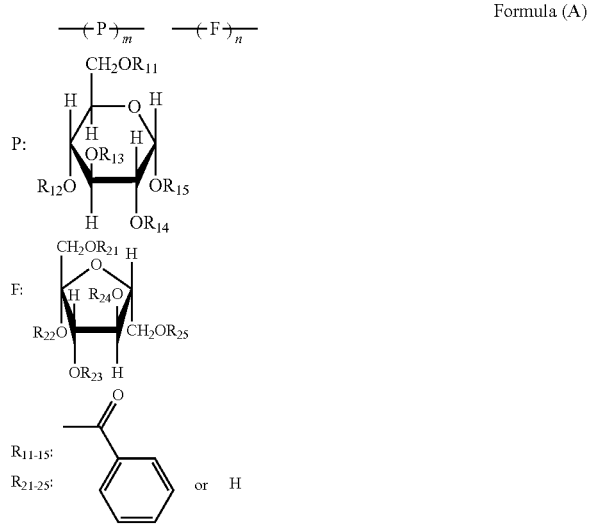

Formula (A)

The benzoyl group may be further have a substituent which includes such as an alkyl group, an alkenyl group, an alkoxy group and a phenyl group, and the alkyl, alkenyl and phenyl group may further have a substituent.

Preferable examples of the Compound (A) and Compound (B) include the following; however, this invention is not limited thereto.

Examples of the Compound (A) are listed as glucose, galactose, mannose, fructose, xylose and arabinose.

Examples of the Compound (B) are listed as lactose, sucrose, nistose, 1F-fructosyl nistose, stachyose, maltitol, lactitol, lactulose, cellobiose, maltose, cellotriose, maltotriose, raffinose or kestose. In addition to these, listed are such as gentiobiose, gentiotriose, gentiotetraose, xylotriose and galactosylsucurose. Among these the Compound (A) and Compound (B), compounds having the both of a furanose structure and a pyranose structure. Such as sucrose, kestose, nistose, 1F-fructosyl nistose and stachyose are preferable, and sucrose is more preferable. The compound bonding 2 or 3 of at least one type of furanose structure and pyranose structure in Compound (B) is also a preferable embodiment.

Monocarboxylic acid utilized for esterification of a part of or all of OH groups in the Compound (A) and Compound (B) according to this invention is not specifically limited, and conventional compound such as aliphatic monocarboxylic acid, alicyclic monocarboxylic acid and aromatic monocarboxylic acid can be utilized. Carboxylic acid utilized may be one type or a mixture of not less than two types.

Preferable aliphatic monocarboxylic acid includes saturated fatty acid such as acetic acid, propionic acid, butyric acid, isobutyric acid, valeric acid, caproic acid, enanthic aid, caprylic acid, pelargonic acid, capric acid, 2-ethyl-hexane carboxylic acid, undecylic acid, lauric acid, tridecylic acid, myristic acid, pentadecylic acid, palmitic acid, heptadecylic acid, stearic acid, nonadecanoic acid, arachic acid, behenic acid, ligunoceric acid, cerotic acid, heptacosanoic acid, montanic acid, melissic acid and lacceric acid; and unsaturated fatty acid such as undecylenic acid, oleic acid, sorbic acid, linoleic acid, linolenic acid, arachidonic acid and octenoic acid.

Examples of preferable alicyclic monocarboxylic acid include cyclopentanecarboxylic acid, cyclohexanecarboxylic acid, cyclooctanecarboxylic acid or derivatives thereof.

Examples of aromatic monocarboxylic acid include aromatic monocarboxylic acid in which an alkyl group or an alkoxy group is introduced to a benzene ring of such as benzoic acid and toluic acid; aromatic monocarboxylic acid having at least two benzene rings such as cinnamic acid, benzilic acid, biphenyl carboxylic acid, naphthalene carboxylic acid, tetralin carboxylic acid or derivatives thereof, and more practically, include xylylic acid, hemellitic acid, mesitylenic acid, prehnitylic acid, α-isodurylic acid, durylic acid, mesitonic acid, α-isodurylic acid, cuminic acid, α-toluic acid, hydmatropic acid, atropic acid, hydrocinnamic acid, salicylic acid, o-anisic acid, m-anisic acid, p-anisic acid, creosote acid, o-homosalicylic acid, m-homosalicylic acid, p-homosalicylic acid, o-pyrocatechuic acid, β-resorcylic acid, vanillic acid, isovanillic acid, veratric acid, o-veratric acid, gallic acid, asarylic acid, mandelic acid, homoanisic acid, homovanillic acid, homoveratric acid, o-homoveratric acid, phthalonic acid and p-coumaric acid; specifically preferable is benzoic acid.

Among the esterified compounds of Compound (A) and Compound (B) is preferably an acetylated compound in which acetyl group is introduced by esterification.

A manufacturing method of the acetylated compound is described in, for example, JP-A H08-245678.

In addition to the esterified compounds of Compound (A) and Compound (B), an ester compound of oligosaccharide can be applied as a compound bonding 3 to 12 of at least one type of a pyranose structure or a furanose structure according to this invention.

Oligosaccharide is manufactured by acting an enzyme such as amylase on such as starch and saccharose, and oligosaccharide applicable in this invention includes such as maltooligosaccharide, isomaltooligosaccharide, furactooligosaccharide, galactooligosaccharide and xylooligosaccharide.

Oligosaccharide can be acetylated by the similar method to those of Compound (A) and Compound (B).

An example of manufacturing method of the esterified compound is described.

Acetic anhydride (200 ml) was dripped to a solution of glucose (29.8 g, 166 mmol) in 100 ml of pyridine, and reaction was conducted for 24 hours. Solution was condensed by evaporation, and poured into iced water. After standing for one hour, solid was separated from water by a glass filter. Solid on the glass filter was dissolved with chloroform, and was separated by cold water until neutralization. Organic phase was separated and dried with anhydrous sodium sulfate. After removing anhydrous sodium sulfate by filtration, chloroform was removed by evaporator, and glucose pentaacetate (58.8 g, 150 mmol, yield of 90.9%) was thus obtained. Monocarboxylic acid described above can be used instead of the above mentioned acetic anhydride.

In the following, specific examples of an esterified compound according to this invention will be listed; however, this invention is not limited thereto.

Compound 1
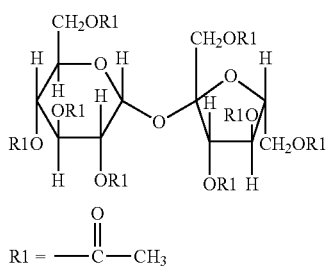
Compound 2
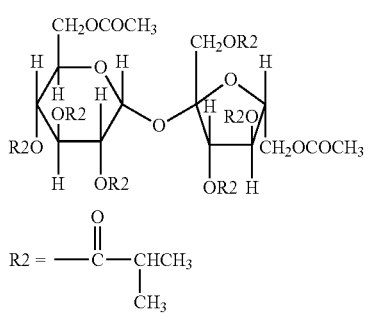
Compound 3
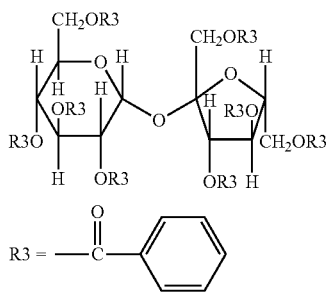
Compound 4
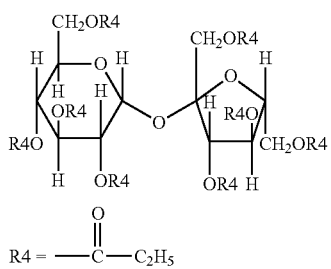
Compound 5
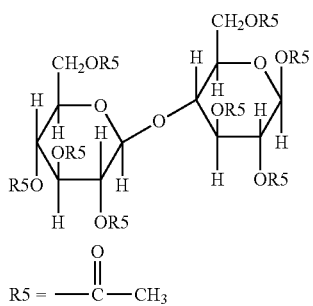
Compound 6
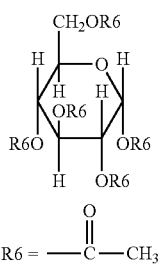
Compound 7
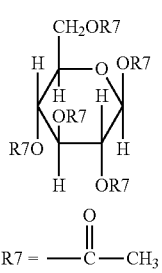
Compound 8
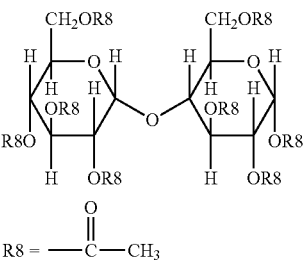
Compound 9
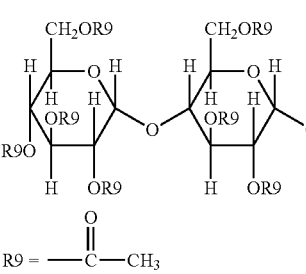
Compound 10
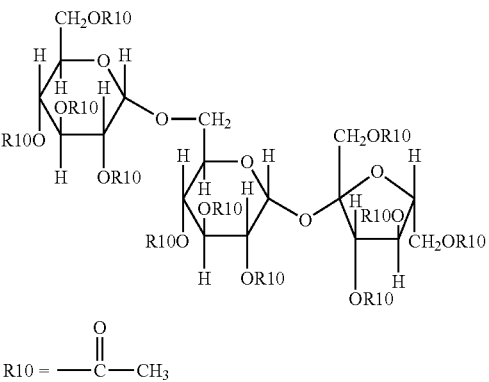

Compound 11
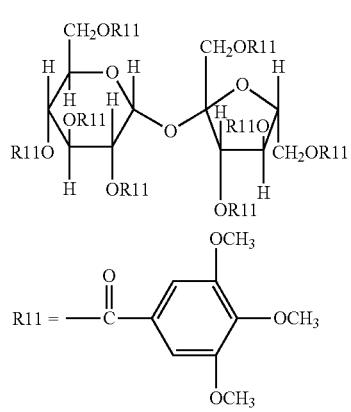
Compound 12
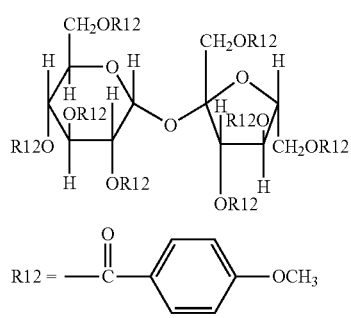
Compound 13
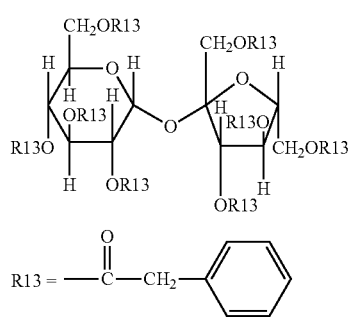
Compound 14
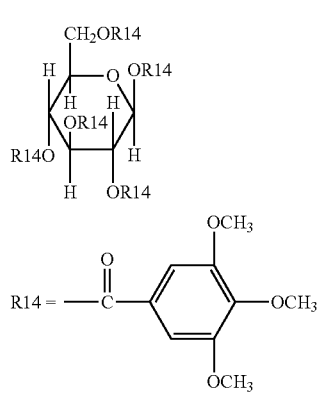
Compound 15
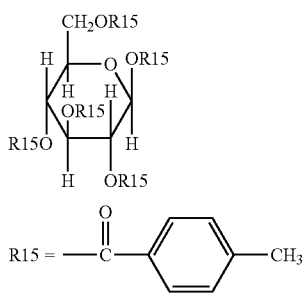
Compound 16
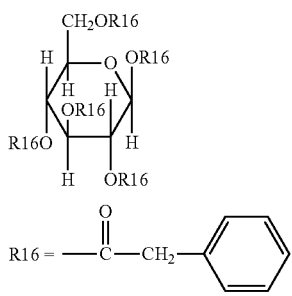
Compound 17
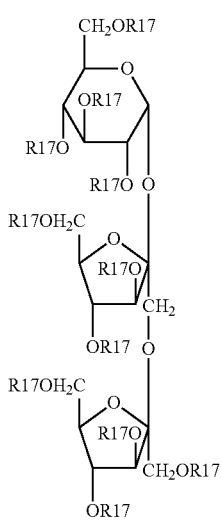
Compound 18
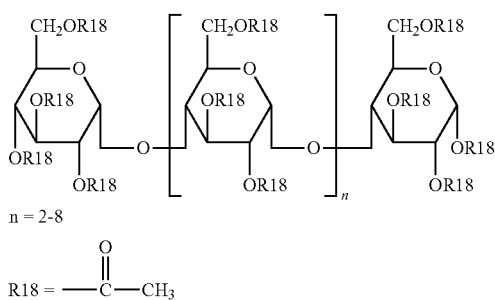
n = 2-8

Compound 19

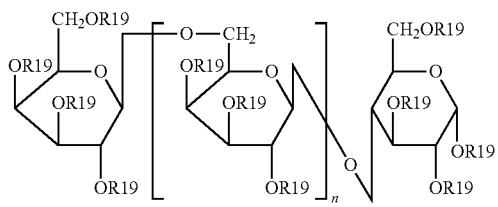

n = 1-8

$$R19 = -\overset{O}{\underset{\|}{C}}-CH_3$$

Compound 20

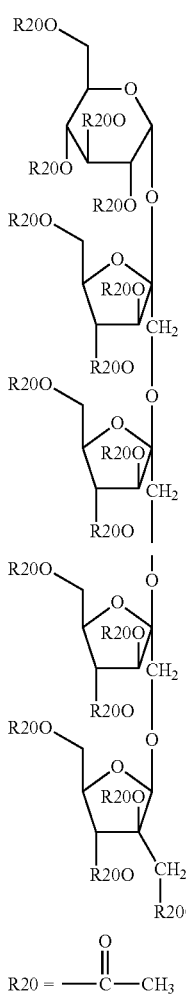

$$R20 = -\overset{O}{\underset{\|}{C}}-CH_3$$

Compound 21

n = 1-8

$$R21 = -\overset{O}{\underset{\|}{C}}-CH_3$$

Compound 22

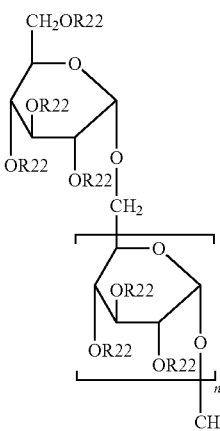

n = 1-8

$$R22 = -\overset{O}{\underset{\|}{C}}-CH_3$$

Optical compensation film of this invention preferably contains 1 to 30 weight % of esterified compound in which all or a part of OH groups in Compound (A) having one furanose structure or pyranose structure are esterified, or an esterified compound in which all or a part of OH groups in Compound (B) bonding 2 to 12 of at least one type of furanose structures or pyranose structures are esterified, and specifically preferably contains 5 to 30 weight %, for the purpose of inhibiting variation of retardation to stabilize display quality. It is preferable that an excellent effect of this invention is exhibited as well as no bleed out is generated in the case of this range.

The other plasticizer may be used in combination with (meth)acryl type polymer and the esterified compound in which all or a part of OH groups in Compound (A) having one furanose structure or pyranose structure or Compound (B) bonding 2 to 12 of at least one type of furanose structures or pyranose structures.

<Other Retardation Control Agent>

The retardation control agent employed in this invention preferably includes those containing bisphenol A in a molecule. Compounds such that ethylene oxide, propylene oxide and so on are adducted to both ends of bisphenol A can be employed.

Examples include NWEPOL BP series such as BP-2P, BP-3P, BP-23P and BP-5P, and BPE series such as BPE-20 (F), BPE-20NK, BPE-20T, BPE-40, BPE-60, BPE-100 and BPE-180 (all manufactured by Sanyo Chemical Ind., Ltd.), ADEKAPOLYETHER BPX series such as BPX-11, BPX-33 and BPX-55 (manufactured by Adeka Corp.).

Employable examples further include diallyl bisphenol A, and dimethacryl bisphenol A; tetrabromo bisphenol A which is obtained by substituting bisphenol A with bromine atom; oligomer or polymer obtained by polymerizing tetrabromo bisphenol A; and bisphenol A bis(diphenyl phosphate) which is obtained by substituting bisphenol A with diphenyl phosphate.

Employable other examples include polycarbonate obtained by polymerizing bisphenol A, polyallylate obtained by polymerizing bisphenol A with a dibasic acid such as terephthalic acid, and epoxy oligomer or polymer obtained by polymerizing with a monomer containing an epoxy group.

MODIPER CL130D or L440-G which is obtained by graft polymerization of styrene or styrene acryl to bisphenol A can be also employed.

The acrylic resin containing film according to this invention may be incorporated with two or more kinds of retardation control agents. Elution of the retardation control agents can be reduced by optimizing the combination in this instance. The reason is not clarified well, but is considered that the elution is reduced by that an amount of adding each kind of retardation control agent can be reduced, and by the interaction between two kinds of the retardation control agents or between the retardation control agent and organic component in the acrylic resin.

<Other Additives>

In the acrylic resin containing film of the present invention, in order to enhance fluidity and flexibility of the composition, it is possible to simultaneously employ plasticizers. Plasticizers may be phthalic acid type, aliphatic acid ester type, trimellitic acid ester type, phosphoric acid ester type, polyester type, or epoxy type.

Usable examples of the phosphoric acid ester type plasticizer include triphenyl phosphate, tricresyl phosphate, cresyldiphenyl phosphate, octyl diphenylphosphate, diphenylbiphenyl phosphate, trioctylphosphate and tributylphosphate, and the phthalic acid type includes diethylphthalate, dimethoxyethylphthalate, dimethylphthalate, dioctyphthalate and di-2-ethylhexylphthalate.

Of these, polyester type and phthalic acid type plasticizers are preferably employed. The polyester type plasticizers excel in non-mobility and extraction resistance, compared to phthalic acid ester type plasticizers such as dioctyl phthalate, but are slightly inferior in plasticizing effects and miscibility.

Consequently, by selecting or simultaneously employing these plasticizers depending on intended use, they may be applied to a wide range of usages.

Polyester type plasticizers are reactants of uni- to tetravalent carboxylic acid with uni- to hexa-hydric alcohol, and those, which are prepared by allowing divalent carboxylic acid to react with glycol, are mainly employed. Representative divalent carboxylic acids include glutaric acid, itaconic acid, adipic acid, phthalic acid, azelaic acid, and sebacic acid.

Particularly, the use of adipic acid, phthalic acid and so on enables preparation of those excellent in plasticizing characteristics. Glycols include ethylene, propylene, 1,3-butyrene, 1,4-butyrene, 1,6-hexamethylene, neopentylene, diethylene, triethylene and dipropylene. These divalent carboxylic acids and glycols may be employed individually or in combination.

The above ester type plasticizers may be any of the ester, oligoester or polyester type. The molecular weight is preferably in the range of 100 to 10,000, and is more preferably in the range of 600 to 3,000, at which range plasticizing effects are more enhanced.

Further, viscosity of plasticizers correlates with their molecular structure and weight. In the case of adipic acid type plasticizers, the viscosity is preferably in the range of 200 to 5,000 mP·s (at 25° C.) from the relation with plasticization efficiency. Further, several polyester type plasticizers may be simultaneously employed.

It is preferable that 0.5 to 30 parts by weight of plasticizers are added to 100 parts by weight of a composition containing acrylic resin. It is not preferable that in practice, the added amount of the plasticizers exceeds 30 parts by weight, since the surface becomes sticky.

It is preferable that the composition containing acrylic resin of the present invention incorporates UV absorbers. Employed UV absorbers include those which are benzotriazole type, 2-hydroxybenzophenone type, and salicylic acid phenyl ester type. For example, cited may be triazoles such as 2-(5-methyl-2-hydroxyphenyl)benzotriazole, 2-[2-hydroxy-3,5-bis($\alpha,\alpha$-dimethylbenzyl)phenyl]-2H-benzotriazole, and 2-(3,5-di-t-butyl-2-hydroxyphenyl)benzotriazole, as well as benzophenones such as 2-hydroxy-4-methoxybenzophenone, 2-hydroxy-4-octoxybenzophenone, or 2,2'-dihydroxy-4-methoxybenzophenone.

Of UV absorbers, those having a molecular weight of at least 400 exhibit a high boiling point and are neither easily volatized nor scattered during molding at high temperature. Consequently, it is possible to effectively improve weather resistance via their addition of a relatively small amount.

Further, it is preferable in view of maintaining the incorporated amount of the persistency of the UV absorber for long time and excellent in persistency of the effect improving weather resistance, because of low mobility from thin coated layer to the substrate layer and hard bleed out to the surface of the multilayer plate.

UV absorbers having a molecular weight of at least 400 include benzotriazole type ones such as 2-[2-hydroxy-3,5-bis($\alpha,\alpha$-dimethylbenzyl)phenyl]-2-benzotriazole, and 2,2-methylenebis[4-(1,1,3,3-tetrabutyl)-6-(2H-benzotriazole-2-yl) phenol; hindered amine type ones such as bis(2,2,6,6-tetramethyl-4-piperidyl)sebacate and bis(1,2,2,6,6-pentamethyl-4-piperidyl)sebacate; further hybrid type ones having hindered phenol and hindered amine structures in the molecule such as 2-(3,5-di-t-butyl-4-hydroxybenzyl)-2-n-butylmalonic acid bis(1,2,2,6,6-pentamethyl-4-piperidyl) or 1-[2-[3-(3,5-di-t-butyl-4-hydroxyphenyl)propionyloxy] ethyl-4-[3-(3,5-di-t-butyl-4-hydroxyphenyl)propionyloxy]-2,2,6,6-tetramethylpyperidine. These may be employed individually or in combinations of at least two types. Of these, particularly preferred are 2-[2-hydroxy-3,5-bis($\alpha,\alpha$-dimethylbenzyl)phenyl]-2-benzotriazole and 2,2-methylenebis[4-(1,1,3,3-tetrabutyl)-6-(2H-benzotriazole-2-yl)phenol.

Further, in order to minimize thermal decomposition and thermal staining during molding, it is possible to add various antioxidants to the acrylic resin containing film of the present invention. Still further, by the addition of antistatic agents, it is possible to provide the acrylic resin containing film with antistatic capability.

In the acrylic resin containing film of the present invention, fire resistant acrylic resin compositions blended with phosphor type fire retardants may be employed.

As phosphor type fire retardants employed here, listed may be mixtures incorporating at least one selected from red phosphorous, triaryl phosphoric acid esters, diaryl phosphoric acid esters, monoaryl phosphoric acid esters, aryl phosphoric acid compounds, aryl phosphine oxide compounds, condensed aryl phosphoric acid esters, halogenated alkyl phosphoric acid esters, halogen-containing condensed phosphoric acid esters, halogen-containing condensed phosphoric acid esters, and halogen containing phosphorous acid esters.

Specific examples thereof include triphenyl phosphate, 9,10-dihydro-9-oxa-10-phosphaphenantholene-10-oxide, phenylphosphonic acid, tris($\beta$-chloroethyl)phosphate, tris (dichloropropyl)phosphate, and tris(tribromoneopentyl) phosphate.

<Acrylic Resin Containing Film Production>

Examples of the production method of an acrylic resin containing film will now be described, however the present invention is not limited thereto.

As an acrylic resin containing film production method, employed may be an inflation method, a T-die method, a calendering method, a cutting method, a casting method, an emulsion method, or a hot press method. Solution film production employing a casting method is preferable in view of coloration retardation, reduction of foreign matter defects, and decrease in optical defects of the die line.

(Organic Solvents)

When the acrylic resin containing film of the present invention is produced via the solution casting method, as useful organic solvents to form a dope, any solvent may be employed without limitation as long as it simultaneously dissolves acrylic resin, cellulose ester resin, and other additives.

Examples thereof may include, chlorine type organic solvents, such as methylene chloride, and non-chlorine type organic solvents such as methyl acetate, ethyl acetate, amyl acetate, acetone, tetrahydrofuran, 1,3-dioxolane, 1,4-dioxane, cyclohexanone, ethyl formate, 2,2,2-trifluoroethanol, 2,2,3,3-hexafluoro-1-propanol, 1,3-difluoro-2-propanol, 1,1,1,3,3-hexafluoro-2-methyl-2-propanol, 1,1,1,3,3,3-hexafluoro-2-propanol, 2,2,3,3,3-pentafluoro-1-propanol and nitroethane. Methylene chloride, methyl acetate, ethyl acetate and acetone are preferably employable.

It is preferable that other than the above organic solvents, incorporated in the dope, are aliphatic alcohols having a straight or branched chain having 1 to 4 carbon atoms in an amount of 1 to 40% by weight. As the alcohol ratio in the dope increases, the resulting web is gelled, whereby peeling from a metal support become easier. Further, as the ratio of alcohol is low, it enhances dissolution of acrylic resin and cellulose ester resin in non-chlorine type organic solvents.

Specifically, a dope composition is preferred which is prepared by dissolving, in solvents incorporating methylene chloride and aliphatic alcohols having a straight or branched chain having 1 to 4 carbon atoms, three of acrylic resin (A), cellulose ester resin, and acrylic particles in an total amount of 15 to 45% by weight.

As aliphatic alcohols having a straight or branched chain having 1 to 4 carbon atoms, listed may be methanol ethanol, n-propanol, iso-propanol, n-butanol, sec-butanol, and tert-butanol. Ethanol is preferable among these in view of stability of the dope, relatively low boiling point and good drying performance.

The preferable film production method of the acrylic resin containing film of the present invention will now be described.

1) Dissolution Process

A dissolution process prepares a dope in such a manner that acrylic resin and cellulose ester resin, and in some cases, acrylic particles and other additives are dissolved, while stirring in organic solvents mainly composed of good solvents for above acrylic resin and cellulose ester resin employing a dissolution tank, or prepares a dope which is a major dissolution liquid by blending, in some cases, acrylic particles and other additive solutions with above acrylic resin and cellulose ester resin solution.

It is possible to dissolve acrylic resin and cellulose ester resin via various dissolution methods such as: a method in which dissolution is carried out at normal pressure, a method in which dissolution is carried out at the temperature of at most the boiling point of the major solvent, a method employing any of the cooling dissolution methods described in JP-A Nos. H09-95544, H09-95557, and H09-95538, a method, described in JP-A No. H11-21379, in which dissolution is carried out under high pressure. Of these, preferred is the method in which dissolution is carried out at the temperature of at least the boiling point of the major solvent under pressure application.

The total concentration of acrylic resin and cellulose ester resin in a dope is preferably in the range of 15 to 45% by weight. Additives are added to the dope during or after dissolution. After dissolution or dispersion, the resulting mixture is filtered via a filter and defoamed, followed by transfer to the next process via a solution conveying pump.

It is preferable that filtration is carried out employing a filter at a particle catching diameter of 0.5 to 5 μm and a water freeness time of 10 to 25 sec/100 ml.

In the above method, aggregates remained during particle dispersion and formed during the addition of the major dope, are only removable by employing a filter at a particle catching diameter of 0.5 to 5 μm and a water freeness time of 10 to 25 sec/100 ml. In the major dope, since particle concentration is sufficiently low compared to that of the added solution, no abrupt increase in filtering pressure due to mutual adhesion of aggregates during filtration occurs.

FIG. 1 is a schematic view of one example of a dope preparation process, a casting process, and a drying process of the solution casting film producing method which is preferred in the present invention.

If necessary, large aggregates are removed via filtering device 44 from the acrylic particle preparation tank, followed by transfer to stock tank 42. Thereafter, a liquid to which acrylic particle was added is added to major dope dissolving tank 1 from stock tank 42.

Thereafter, the major dope liquid is filtered via major filtering device 3, followed by the inline addition of UV absorbing agent adding solution 16.

In many cases, the major dope occasionally incorporates return scrap in an amount of about 10 to about 50% by weight. Occasionally, the return scrap includes acrylic particles. In such a case, it is preferable to control the added amount of the acrylic particle added liquid matching to that of the added amount of the return scrap.

The content of acrylic particles in the acrylic particle-containing addition solution is preferably 0.5 to 10% by weight, is more preferably 1 to 10% by weight, but is most preferably 1 to 5% by weight.

The above addition range is preferred since the added solution is easily handled due to its low viscosity, and is easily added to the major dope.

"Return scrap", as described herein, refer to ones which are produced by finely pulverizing acrylic resin containing films. Available ones include trimmed portions of film of both edges formed during production of acrylic resin containing film and mill rolls which are not within the specifications, for example, due to the presence of abrasion defects.

Further, it is possible to preferably employ pellets which are prepared by kneading acrylic resins and cellulose ester resins, and possibly acrylic particles, followed by pellet formation.

2) Casting Process

A casting process is one in which dope is transferred to pressurized die 30 via a solution sending pump (for example, a pressurized type quantitative gear pump) and is cast from the pressurized die slit onto the casting position on continuously moving looped metal belt 31 such as a stainless steel belt, or a rotating metal drum.

A pressurized die is preferred in which the slit shape of the discharge portion of the die can be regulated to easily make the film thickness uniform. Pressurized dies include a coat hanger die and a T die, and any of these are preferably employed. The surface of metal supports is finished to be specular. In order to increase the film production rate, a multilayer may be realized in such a manner that at least two pressurized dies are provided on the metal support and the dope is divided into several portions. Alternately, it is also preferable to prepare a laminated structure film via a co-casting method in which a plurality of divided dope portions is simultaneously cast.

3) Solvent Evaporating Process

A solvent evaporating process is one in which a web (namely, a dope is cast onto a casting support and the resulting dope film is called a web) is heated on the casting support, whereby solvents evaporate.

Solvents are evaporated via a method in which air is blown from the web side and/or a method in which heat is transmitted via a liquid from the reverse side, and a method in which heat is transmitted via radiant heat from both the front and reverse surfaces. Of these, the reverse surface liquid heat transmission method is preferred since higher drying efficiency is realized. Further, preferably employed are combinations of these methods. It is preferable that the web, on the support after casting, is dried on the support under an ambience of 40 to 100° C. In order to maintain the ambience of 40 to 100° C., it is preferable that airflow at the above temperature impinges the upper surface of the web, or heating is carried out via means such as infrared rays.

In view of surface quality, hygroscopicity, and peeling properties, the above web is peeled from the web within 30 to 120 seconds.

4) Peeling Process

A peeling process is one in which a web, from which solvents have been evaporated on the metal support, is peeled in a predetermined peeling position. The peeled web is conveyed to the following process.

Temperature in the peeling position on the metal support is preferably 10 to 40° C., but is more preferably 11 to 30° C.

The residual solvent amount while peeled in the web on the metal support is preferably in the range of 50 to 120% by weight in view of drying conditions and the length of the metal support. When peeled in the presence of a relatively large amount of residual solvents, the web is excessively soft, whereby flatness is deteriorated to tend to form wrinkles and longitudinal streaks caused by peeling tension. Consequently, the amount of residual solvents in the peeling position is determined via compatibility between an economical speed and quality.

The residual solvent amount in a web is defined by the following formula.

Residual solvent amount (%)=(weight of a web prior to a heat treatment−weight of the web after the heat treatment)×100

Heat treatment during determination of the residual solvent amount refers to one carried out at 115° C. for one hour.

Peeling tension during peeling of film from the metal support is usually 196 to 245 N/m. However, when wrinkles tend to result, it is preferable that peeling is carried out under a tension of at most 190 N/m. Further, during peeling, the lowest peeling tension is preferably at most 166.6 N, is more preferably at most 137.2 N/m, but is most preferably at most 100 N/m.

In the present invention, temperature in the peeling position on the above metal support is preferably regulated to −50 to 40° C., more preferably to 10 to 40° C., but most preferably to 15 to 30° C.

5) Drying and Stretching Processes

After peeling, the web is dried employing dryer 35 in which the web is alternately passed through a plurality of rollers installed in the web dryer and/or tenter stretching apparatus 34 which conveys a web while clipping both edges of the web.

In common drying means, heated air is blown onto both sides of the web. Means are also available in which heating is carried out via application of microwaves instead of air flow. Excessively rapid drying tends to deteriorate flatness of the finished film. High temperature drying is preferably carried out when the residual solvents reaches 8% by weight. Throughout the entire process, drying is carried out between about 40 to about 250° C., but is preferably carried out specifically between 40 to 160° C.

When a tenter stretching apparatus is employed, it is preferable to employ an apparatus which enables independent control of the film holding length (the distance from the holding initiation to the holding termination) at the right and the left. Further, during the tentering process, to improve flatness, it is preferable to intentionally provide zones which differ in temperature.

Further, it is also preferable to provide a neutral zone between temperature different zones so that adjacent zones result in no interference.

Stretching operation may be carried out in dividing into multiple stages. It is preferable to carry out biaxial stretching in the casting direction as well as in the lateral direction. Further, when biaxial stretching is carried out, simultaneous biaxial stretching may be employed, or it may be stepped stretching.

In the above case, the term "stepped" refers, for example, to a process in which it is possible to carry out sequential stretching which differs in stretching direction or in which it is possible to divide stepped stretching in the same direction and to add stretching in another direction in any of the steps. Namely, it is possible to employ, for example, the following stretching steps.

Stretching in the casting direction-stretching in the lateral direction-stretching in the casting direction-stretching in the casting direction Stretching in the lateral direction-stretching in the lateral direction-stretching in the casting direction-stretching in the casting direction Further, simultaneous biaxial stretching includes a case in which stretching is carried out in one direction and tension in another direction is relaxed to allow contraction. Stretching ratio of simultaneous biaxial stretching is preferably in the range of a factor of 1.01 to 1.5 in the lateral and longitudinal directions.

When tentering is carried out, the residual solvent amount in a web is preferably 20 to 100% by weight at the initiation of tentering. It is preferable that until the residual solvents in the web reaches at most 10% by weight, drying is carried out while tentering. The above residual solvents in the web is more preferably at most 5% by weight.

Drying temperature during tentering is preferably 30 to 160° C., is more preferably 50 to 150° C., but is most preferably 70 to 140° C.

During the tentering process, in view of enhancement of film uniformity, it is preferable that temperature distribution in the lateral direction under any ambience is small. The temperature distribution in the lateral direction during the tentering process is preferably ±5° C., is more preferably ±2° C., but is most preferably ±1° C.

6) Winding Process

A winding process is one in which, after the residual solvent amount in the web reaches at most 2% by weight, as an acrylic resin containing film, the resulting web is wound by winder 37. By realizing the residual solvent amount to be 0.4% by weight, it is possible to prepare a film which exhibits excellent dimensional stability.

Usually employed methods may be employed as a winding method, and include a constant torque method, a constant tension method, a tapered tension method, and an internal stress constant program tension control method. Any of these may be appropriately selected and employed.

The acrylic resin containing film of the present invention is preferably a long-roll film. In practice, its length is about 100 to about 5,000 m, and it is provided in a roll shape. Further, the film width is preferably 1.3 to 4 m, but is more preferably 1.4 to 2 m.

Thickness of the acrylic resin containing film of the present invention is not particularly limited. When it is employed as the polarizing plate protective film, described below, the thickness is preferably 20 to 200 μm, is more preferably 25 to 100 μm, but is most preferably 30 to 80 μm.

(Physical Properties Etc. of Acrylic Resin Containing Film)

Features of the physical properties etc. of acrylic resin containing film are described.

<Retardation>

The acrylic resin containing film according to this invention is preferably adjusted to have in-plane retardation value Ro(590) defined by Formula (I) within the range of 30 to 300 nm and retardation value in thickness direction Rt(590) defined by Formula (II) within a range of 50 to 300 nm.

$$Ro(590)=(nx-ny)\times d(\text{nm}) \quad \text{Formula (I)}$$

$$Rt(590)=\{(nx+ny)/2-nz\}\times d(\text{nm}) \quad \text{Formula (II)}$$

In the above formulae, Ro(590) represents in-plane retardation value in the film at wavelength of 590 nm, and Rt(590) represents retardation value in thickness direction at wavelength of 590 nm in a film. Symbol d represents thickness of the optical film (nm); nx represents maximum refractive index in a film at wavelength of 590 nm, and is also called refractive index in retardation axis direction; ny represents refractive index of the film in direction of right angle to retardation axis at wavelength of 590 nm film; and nz represents refractive index of the film in thickness direction at wavelength of 590 nm.

In-plane retardation value Ro(590) is preferably within a range of 60 to 250 nm.

Retardation value in thickness direction Rt(590) is preferably within a range of 60 to 250 nm.

<Wavelength Dispersion (DSP)>

It is preferable that the acrylic resin containing film according to this invention is adjusted to have wavelength dispersion (DSP) defined by Formula (III) of 0.82 to 0.95.

$$DSP=Ro(480)/Ro(630) \quad \text{Formula (III)}$$

In the Formula, Ro(480) represents in-plane retardation value at wavelength of 480 nm, and Ro(630) in-plane retardation value at wavelength of 630 nm.

It is possible to adjust the retardation and wavelength dispersion (DSP) within the above described values by optimizing components of the acrylic resin containing film and conducting stretching in accordance with the components.

The optimization of the components of the acrylic resin containing film is conducted by adjusting the resin contents of acrylic resin and cellulose ester resin within the range of 51:49 to 95:5 by weight, and selecting the a retardation control agent used in combination and adjusting its amount to add.

Further, the retardation and wavelength dispersion (DSP) can adjusted to desired values by adjusting and controlling the temperature of stretching, stretching velocity, stretching order, residual solvent content during stretching, and so on.

By adjusting the retardation and DSP value within the range described above, varying of color of the liquid crystal display device employing the acrylic resin containing film can be reduced, viewing angle is broadened and front contrast can be improved.

Varying of color is a variation of degree of the color of the image of the liquid crystal display device when the image is observed during turned around 360° at tilt angle of 60° with reference normal direction. Front contrast is a ratio of the brightness of white display and black display of the liquid crystal display device observed in the normal line direction.

> Front contrast=(luminance on the white display mode measured from the normal line direction of the display device)/(luminance on the black display mode measured from the normal line direction of the display device)

Viewing angle is an angle to maintain a predetermined contrast when changing the viewing direction from the normal line of the liquid crystal display device.

<Photoelastic Coefficient>

It is preferable that the acrylic resin containing film according to this invention is adjusted to have a photoelastic coefficient of $5\times10^{-12}$ to $5\times10^{-12}$/Pa.

The photoelastic coefficient is conducted by adjusting the resin contents of acrylic resin and cellulose ester resin within the range of 51:49 to 95:5 by weight, selecting the retardation control agent used in combination and adjusting its amount to add, and optimizing the components of the acrylic resin containing film.

By adjusting the photoelastic coefficient within the above described range, retardation is difficult to appear and nonuniformity in image is reduced, even though retardation film is subjected to stress when the panel temperature rises due to long term use of the liquid crystal display device or ambience becomes high temperature and high humidity (Others)

The acrylic resin containing film according to this invention is controlled to have tension softening point of the preferably 105 to 145° C., and more preferable to control it between 110 and 130° C., so as to minimize haze, and considering the use in high temperature device such as a projector or at environment such as display devices installed in a car.

The specific method to determine the temperature which exhibits the tension softening point of acrylic resin containing films is as follows. For example, by employing a TENSILON tester (RTC-1225A, produced by Orientec Co., Ltd.), the tested acrylic resin containing film is cut into 120 mm (longitudinal)×10 mm (wide). The resulting film is tensioned at 10 N while elevating the temperature at a rate of 30° C. per minute. At the time to reach 9 N, temperature is determined thrice and the tension softening point is obtained by averaging the resulting values.

Further, in view of heat resistance, glass transition temperature (Tg) of acrylic resin containing films is preferably at least 110° C., is more preferably at least 120° C., but is most preferably at least 150° C.

"Glass transition temperature", as described herein, refers to the midpoint glass transition temperature Tmg) determined in accordance with JIS K 7121 (1987) in which measurements are carried out at a temperature elevating rate of 20° C./minute employing a differential scanning colorimeter (DSC-Type 7, produced by Perkin Elmer Co.).

Further, the number of defects at a diameter of at least 5 μm on the surface of the acrylic resin containing film of the present invention is preferably 0.5/10-cm-square, and is more preferably 0.1/10-cm-square.

"Diameter of the defect", as described herein, refers to the diameter when the defect is circular. When the defect is not circular, the area of the defect is determined via the following method while observed via a microscope, and the resulting maximum diameter (being a diameter of the inscribed circle) is taken.

The area of the defect, when it is an air bubble or foreign matter, is the size of the shadow when the defect is observed via a differential interference microscope. When the defect is a surface state change such as transfer of roller flaws or abrasion, the size is determined via observation employing the deferential interference microscope.

In the case of observation via reflected light, when the area of a defect is not clear, aluminum or platinum is vapor-deposited onto the surface, followed by further observation.

In order to manufacture high quality films with the least frequency of the above defects under desired productivity, it is effective that a polymer solution is precisely filtered prior to casting, the degree of cleanness around a caster is enhanced, and drying conditions after extrusion are set stepwise so that drying is efficiently carried out while minimizing foam formation.

When the number of defects is at least 1 in 10 cm-square, productivity is occasionally degraded in such a manner that in the course of treatment during a post-process, when tension is applied to the film, the film breaks at the position of defects. Further, when the diameter of defects is at least 5 μm, they may be visually detected via observation of polarizing plates, and when employed as an optical material, bright spots are occasionally formed.

Further, even in the case in which nothing is detected via visual observation, when a hard coat layer is formed on the aforesaid film, defects (non-coated spots) are occasionally formed in such a manner that it is impossible to achieve uniform formation of coating materials. Defects, as described herein, refer to voids (being foam defects) in the film, generated by abrupt evaporation of solvents during the drying process of solution film production, and foreign matter (foreign matter defects) in the film due to foreign matter in a primary film making solution or mixed foreign matter during film production.

Further, rupture elongation of the acrylic resin containing film of the present invention in at least one direction is preferably at least 10%, but is more preferably 20%, which is determined type on JIS K7127 1999.

The upper limit of rupture elongation is not particularly limited, and the practical limit is approximately 250%. In order to increase the rupture elongation factor, it is effective to retard the formation of defects in film due to foreign matter and foaming.

Thickness of the acrylic resin containing film of the present invention is preferably at least 20 μm, but is more preferably at least 30 μm.

The upper limit of the thickness is also not particularly limited. When a film is prepared via a solution film producing method, in view of coatability, foaming, and solvent drying, the upper limit is approximately 250 μm. Film thickness may appropriately be selected type on use.

Total light transmittance of the acrylic resin containing film of the present invention is preferably at least 90%, but is more preferably at least 93%. Further, the practical upper limit is approximately 99%. In order to achieve excellent transparency, represented by the above total light transmittance, it is effective that additives and copolymerizing components which absorb visible light are not allowed to be incorporated, and diffusion and absorption of light in the interior of the film is decreased by removing foreign matter in polymers via precise filtration.

Further, it is effective that roughness of the film surface is decreased by decreasing the surface roughness of film contacting portions (such as cooling rollers, calendering rollers, drums, belts, coating devices of a solution film production, or conveying rollers) during film production and diffusion and reflection of light on the film surface are decreased by reducing the refractive index of acrylic resins.

The acrylic resin containing film according to this invention is featured by having a haze value (turbidity), which is one of the indices representing transparency, being 1.0% or less, and 0.5% or less is preferable in view of brightness and contrast when it is installed in a liquid crystal display device.

It is effective to remove foreign materials in the polymer by high precision filtration, and to reduce light diffusion within a film to attain such haze value.

It is also effective to reduce difference of refractive indices between acrylic type resin and acrylic particles when acrylic particles are employed.

It is further effective to restrain the particle diameter and adding amount of the acrylic particles or to reduce surface roughness of film contacting portion during film manufacturing, since surface roughness affects haze value as the surface haze.

Total light transparency and haze value of the acrylic resin containing film as above described are measured in accordance with JIS-K7361-1-1997 and JIS-K7136-2000.

When the acrylic resin containing film of the present invention satisfies the above physical properties, it may preferably be preferably employed as an optical acrylic resin containing film. A film excellent in processability and heat resistance is obtained by satisfying the following physical properties.

The above physical properties are realized by employing an acrylic resin containing film characterized in that acrylic resin and cellulose ester resin are incorporated at a weight ratio of 95:5 to 30:70, average molecular weight Mw of above acrylic resin is at least 80,000, total substitution degree (T) of the acyl group of above cellulose ester resin is 2.00 to 3.00, the substitution degree of the acyl group having 3 to 7 carbon atoms is 1.2 to 3.0, and weight average molecular weight (Mw) is 75,000.

The acrylic resin containing film according to this invention contains acrylic resin and cellulose ester resin in a ratio of 95:5 to 30:70 by weight, and preferably the acrylic resin being 50% by weight or more.

The acrylic resin containing film according to this invention may be composed by containing other resin than acrylic resin and cellulose ester resin.

Total amount of the acrylic resin and cellulose ester resin is 55 to 100% by weight, preferably 60 to 99% by weight of the acrylic resin containing film.

(Polarizing Plate)

It is possible to prepare the polarizing plate employing a general method. It is preferable that an adhesive layer is provided on the reverse side of the acrylic resin containing film of the present invention and the resulting acrylic resin containing film is adhered to at least one of the sides of a polarizer which is produced by immersion into an iodine solution, and then stretched.

On the other side, employed may be the acrylic resin containing film of the present invention or another polarizing plate protective film. For example, preferably employed are commercial cellulose ester films (such as KONICA MINOLTA TAC KC8UX, KC4UX, KC5UX, KC8UY, KC4UY, KC12UR, KC8UCR-3, KC8UCR-4. KC8UCR-5, KV8UY-HA, and KV8UX-RHA, all produced by Konica Minolta Opto, Inc.).

A polarizer, which is a major constitutional component of the polarizing plate, is an element which transmits light in a polarized wave plane in a specific direction. The representative polarizing film, which is presently known, is a polyvinyl alcohol type polarizing film, which includes one dyed with iodine and the other which is dyed with dichroic dyes.

The employed polarizer is prepared as follows. A film is prepared employing an aqueous polyvinyl alcohol solution. The resulting film is uniaxially stretched, followed by dying, or after dying, it is uniaxially stretched, followed by an endurance enhancing treatment, by preferably employing boron compounds.

It is preferable to employ adhesive agents used in the above adhesive layer so that at least one portion of the adhesive layer exhibits a storage elastic modulus in the range of $1.0 \times 10^4$ to $1.0 \times 10^9$ Pa at 25° C. Curing type adhesive agents are appropriately employed, which form high molecular weight compounds, or crosslinking structures via various chemical reactions after coating the above adhesives, followed by adhesion.

Specific examples thereof include such as urethane type adhesive agents, epoxy type adhesive agents, aqueous polymer-isocyanate type adhesive agents, curing type adhesive agents such as a thermally cured type acrylic adhesive agent, moisture cured urethane adhesive agents, anaerobic adhesive agents such as polyether methacrylate types, ester type methacrylate types, or oxidation type polyether methacrylates, cyanoacrylate type "instant" adhesive agents, and acrylate and peroxide type dual liquid type "instant" adhesive agents.

The above adhesive agents may be either of a single liquid type, or of a type such that prior to use, at least two liquids are blended.

Further, the above adhesive agents may be of a solvent type in which organic solvents are employed as a medium, of an aqueous type such as an emulsion type, a colloid dispersion type, or an aqueous solution type in which media are composed of water as a major component, or may be of a non-solvent type. Concentration of the above adhesive agent solution may be appropriately determined depending on the film thickness after adhesion, the coating method, and the coating conditions, and is commonly 0.1 to 50% by weight.

(Liquid Crystal Display Device)

By incorporating a polarizing plate, adhered together with the acrylic resin containing film of the present invention, in a liquid crystal display device, it is possible to produce a liquid crystal display device which excels in various kinds of visibility. The above polarizing plate is preferably employed specifically in large liquid crystal display devices, as well as outdoor liquid crystal display devices such as digital signage. The polarizing plate according to the present invention is adhered to liquid crystal cells via the above adhesive layer.

The polarizing plate according to the present invention is preferably employed in a reflection type, transparent type, or semi-transparent type LCD, or in various driving system LCDs such as a TN type, an STN type, an OCB type, an HAN type, a VA type (a PVA type and an MVA type), and an IPS type (including an FFS system). Specifically in a large screen display device, particularly a screen of at least 30 type, especially of 30 to 54 type, no white spots occur at the periphery of the screen and its effect is maintained over an extended duration.

Further, effects are realized in which color nonuniformity, glare, and wavy mottling are minimized, and eyes do not tire even when viewing over an extended duration.

EXAMPLES

Example 1

Preparation of Acrylic Microparticles (C)

Into a reactor vessel of an inner volume of 60 liters, fitted with a reflux cooling device, put were 38.2 liters of ion-exchanged water and 111.6 g of sodium dioctyl sulfosuccinate. While stirring the resulting mixture at a number of rotations of 250 rpm, the temperature was raised to 75° C. under an ambience of nitrogen, whereby a state was formed in which oxygen effects were eliminated. Subsequently, 0.36 g of APS was added and after stirring for 5 minutes, a monomer mixture composed of 1,657 g of MMA, 21.6 g of BA, and 1.68 g of ALMA was totally added. After detecting the heat generation peak, the resulting mixture was maintained for an additional 20 minutes, whereby polymerization of the innermost hard layer was completed.

Subsequently, 3.48 g of APS were put in, and after stirring for 5 minutes, a monomer mixture composed of 8105 g of BA, 31.9 g of PEGDA (200), and 264.0 g of ALMA was continuously added over 120 minutes. After the addition, the resulting mixture was maintained for an additional 120 minutes, whereby polymerization of the soft layer was completed.

Thereafter, 1.32 g of APS was added and after stirring for 5 minutes, a monomer mixture composed of 2,106 g of MMA and 201.6 g of BA was continuously added over 20 minutes. After the addition, the resulting mixture was maintained for an additional 20 minutes, whereby polymerization of Outermost Hard Layer 1 was completed.

Subsequently, 1.32 g of APS were put in, and after 5 minutes, a monomer mixture composed of 3,148 g of MMA, 201.6 g of BA, and 10.1 g of n-OM was continuously added over 20 minutes. After the addition the resulting mixture was maintained for an additional 20 minutes, and subsequently, heated to 95° C. and maintained for 60 minutes, whereby polymerization of Outermost Hard Layer 2 was completed.

A small amount of the polymer latex prepared as above was taken and particle diameter was measured by a cataphoresis light scattering photometer ELS-8000, manufactured by Otsuka Electronics Co., Ltd. to find 0.10 μm. The remaining polymer latex prepared as above was put in a 3% by weight warm sodium sulfate aqueous solution to result in salting-out and aggregation. Subsequently, after repeated dehydration and washing, drying was carried out whereby three-layer structured Acrylic Microparticles (C) were prepared.

Above abbreviations refer to the following materials.
MMA: methyl methacrylate
BA: n-butyl acrylate
ALMA: allyl methacrylate
PEGDA: polyethylene glycol diacrylate (a molecular weight of 200)
n-OM: n-octylmercaptan
APS: ammonium persulfate (Preparation of Acrylic Resin Containing Film)
(Preparation Dope)

Dope composed of the following components was prepared.

| | |
|---|---|
| DELPET 80N (Copolymer of acrylic resin of MMA and MA (methylacrylate), manufactured by Asahi Kasei Chemical Corporation) | 70 parts by weight |
| Cellulose ester (cellulose acetate propionate at a total substitution degree of an acyl group of | 30 parts by weight |

-continued

| | |
|---|---|
| 2.75, a substitution degree of an acetyl group of 0.19, a substitution degree of a propionyl group of 2.56, and Mw of 100,000 | |
| Acrylic Microparticles (C1), prepared as above | 5 parts by weight |
| Additive (D1) | 10 parts by weight |
| Methylene chloride | 300 parts by weight |
| Ethanol | 40 parts by weight |

(Film Forming of Acrylic Resin Containing Film)

The dope liquid, prepared as above, was uniformly cast onto a 2 m wide stainless steel band support at 22° C., employing a belt casting apparatus. Solvents were evaporated on the stainless steel band support so that the residual solvent amount reached 100%, and the resulting film was peeled from the stainless steel band via a peeling tension of 162 N/m.

The peeled acrylic resin web was heated at 35° C. to evaporate solvents and was slit to a 1.6 m width. Thereafter, while being stretched by a factor of 1.3 in the lateral direction via a tenter, drying was carried out carried out at a drying temperature of 135° C. When stretching was initiated via the tenter, the amount of residual solvents was 10%.

After tenter stretching, relaxation was allowed out for 5 minutes at 130° C. Thereafter, drying was completed via conveyance into 120° C. and 130° C. drying zones employing numerous rollers, and slitting was carried out for a 1.5 m width. Subsequently, a knurling treatment of a width of 10 mm and a height of 5 μm was applied to both edges, followed by winding onto a core of an internal diameter of 6 inches under an initial tension of 220 N/m and a final tension of 110 N/m, whereby Acrylic Resin Containing Film 27 was prepared.

The stretching magnitude in the MD direction, calculated based on the rotation rate of the stainless steel band support and the driving rate of the tenter, was at a factor of 1.1.

The residual solvent amount, film thickness and roll length of Acrylic Resin Containing Film 27, described in Tables 1 and 2, were 0.1%, 60 μm, and 4,000 m, respectively.

Acrylic Resin Containing Films 0 through 26, and 28 through 34 were prepared in the same way as Acrylic Resin Containing Film 27, except that the content ratio of acrylic resin (A), cellulose ester resin (B), and the Acrylic Microparticles (C1), the substitution degree of acyl groups of cellulose ester resin (B), and the amount of additive (D1) were modified as described in Tables 1 and 2.

Acrylic Resin Containing Films 100 through 134 were prepared in the same way as Acrylic Resin Containing Films 0 through 34 except that additive (D1) was replaced by additive (D2) as described in Tables 3 and 4.

Acrylic Resin Containing Films 200 through 234 were prepared in the same way as Acrylic Resin Containing Films 0 through 34 except that additive (D1) was replaced by additive (D3) as described in Tables 5 and 6.

Acrylic Resin Containing Films 300 through 334 were prepared in the same way as Acrylic Resin Containing Films 0 through 34 except that additive (D1) was replaced by additive (D4) as described in Tables 7 and 8.

Acrylic Resin Containing Films 400 through 434 were prepared in the same way as Acrylic Resin Containing Films 0 through 34 except that additive (D1) was replaced by additive (D5) as described in Tables 9 and 10.

Acrylic Resin Containing Films 500 through 534 were prepared in the same way as Acrylic Resin Containing Films 0 through 34 except that acrylic resin (A) was replaced by BR85 having MW of 280,000, acrylic resin copolymer of MMA and MA (methylacrylate), manufactured by Mitsubishi Rayon Co., Ltd., as described in Tables 11 and 12.

Acrylic Resin Containing Films 600 through 634 were prepared in the same way as Acrylic Resin Containing Films 0 through 34 except that acrylic resin (A) was replaced by ACRYPET VH4 having MW of 140,000, acrylic resin copolymer of MMA and MA (methylacrylate), manufactured by Mitsubishi Rayon Co., Ltd., as described in Tables 13 and 14.

TABLE 1

| Film (*2) | Cellulose ester resin (B) | | | | | Acrylic Microparticles (C) | State (*3) | Content Ratio (***) | Additive | Additive Amount | |
|---|---|---|---|---|---|---|---|---|---|---|---|
| No. | ac | p | b | T | Mw | Kind | Miscibility | (*1) | (D) | (*4) | Remarks |
| 0 | | | | | | | | 100/0/0 | D1 | 10 | Comparative |
| 1 | 0.19 | 2.56 | 0.00 | 2.75 | 200,000 | | | 97/3/0 | D1 | 10 | Comparative |
| 2 | 0.19 | 2.56 | 0.00 | 2.75 | 200,000 | | | 92/8/0 | D1 | 10 | Invention |
| 3 | 0.19 | 2.56 | 0.00 | 2.75 | 200,000 | | | 80/20/0 | D1 | 10 | Invention |
| 4 | 0.19 | 2.56 | 0.00 | 2.75 | 200,000 | | | 70/30/0 | D1 | 10 | Invention |
| 5 | 0.19 | 2.56 | 0.00 | 2.75 | 200,000 | | | 60/40/0 | D1 | 10 | Invention |
| 6 | 0.19 | 2.56 | 0.00 | 2.75 | 200,000 | | | 50/45/0 | D1 | 10 | Invention |
| 7 | 0.19 | 2.56 | 0.00 | 2.75 | 200,000 | | | 50/50/0 | D1 | 10 | Comparative |
| 8 | 2.00 | 0.50 | 0.00 | 2.50 | 220,000 | | | 70/30/0 | D1 | 10 | Invention |
| 9 | 1.05 | 1.00 | 0.00 | 2.05 | 180,000 | | | 70/30/0 | D1 | 10 | Invention |
| 10 | 0.30 | 1.50 | 0.00 | 1.80 | 130,000 | | | 70/30/0 | D1 | 10 | Invention |
| 11 | 1.00 | 1.50 | 0.00 | 2.50 | 120,000 | | | 70/30/0 | D1 | 10 | Invention |
| 12 | 1.00 | 0.00 | 1.50 | 2.50 | 150,000 | | | 70/30/0 | D1 | 10 | Invention |
| 13 | 1.50 | 0.00 | 0.70 | 2.20 | 145,000 | | | 70/30/0 | D1 | 10 | Invention |
| 14 | 0.30 | 0.00 | 2.30 | 2.60 | 160,000 | | | 70/30/0 | D1 | 10 | Invention |
| 15 | 0.50 | 1.20 | 1.20 | 2.90 | 180,000 | | | 70/30/0 | D1 | 10 | Invention |
| 16 | 0.19 | 2.56 | 0.00 | 2.75 | 50,000 | | | 70/30/0 | D1 | 10 | Invention |
| 17 | 0.19 | 2.56 | 0.00 | 2.75 | 70,000 | | | 70/30/0 | D1 | 10 | Invention |

(*1): Acrylic resin (A)/Cellulose ester resin (B)/Acrylic Microparticles (C)

ac: Acetyl substitution degree, p: Propionyl substitution degree, b: Butyryl substitution degree, T: Total substitution degree, (*2): Acrylic Resin Containing Films (*3): State of resin and microparticles (*4): Parts by weight

TABLE 2

| Film (*2) No. | Cellulose ester resin (B) | | | | | Acrylic Microparticles (C) Kind | State (*3) Miscibility | Content Ratio (*1) | Additive (D) | Additive Amount (*4) | Remarks |
|---|---|---|---|---|---|---|---|---|---|---|---|
| | ac | p | b | T | Mw | | | | | | |
| 18 | 0.19 | 2.56 | 0.00 | 2.75 | 250,000 | | | 70/30/0 | D1 | 10 | Invention |
| 19 | 0.19 | 2.56 | 0.00 | 2.75 | 270,000 | | | 70/30/0 | D1 | 10 | Invention |
| 20 | 1.00 | 0.00 | 1.50 | 2.75 | 40,000 | | | 70/30/0 | D1 | 10 | Invention |
| 21 | 0.19 | 2.56 | 0.00 | 2.75 | 200,000 | C1 | No | 70/30/0.02 | D1 | 10 | Invention |
| 22 | 0.19 | 2.56 | 0.00 | 2.75 | 200,000 | C1 | No | 70/30/0.05 | D1 | 10 | Invention |
| 23 | 0.19 | 2.56 | 0.00 | 2.75 | 200,000 | C1 | No | 70/30/0.1 | D1 | 10 | Invention |
| 24 | 0.19 | 2.56 | 0.00 | 2.75 | 200,000 | C1 | No | 70/30/5 | D1 | 0 | Comparative |
| 25 | 0.19 | 2.56 | 0.00 | 2.75 | 200,000 | C1 | No | 70/30/5 | D1 | 2 | Invention |
| 26 | 0.19 | 2.56 | 0.00 | 2.75 | 200,000 | C1 | No | 70/30/5 | D1 | 5 | Invention |
| 27 | 0.19 | 2.56 | 0.00 | 2.75 | 200,000 | C1 | No | 70/30/5 | D1 | 10 | Invention |
| 28 | 0.19 | 2.56 | 0.00 | 2.75 | 200,000 | C1 | No | 70/30/5 | D1 | 12 | Invention |
| 29 | 0.19 | 2.56 | 0.00 | 2.75 | 200,000 | C1 | No | 70/30/5 | D1 | 15 | Invention |
| 30 | 0.19 | 2.56 | 0.00 | 2.75 | 200,000 | C1 | No | 70/30/5 | D1 | 20 | Invention |
| 31 | 0.19 | 2.56 | 0.00 | 2.75 | 200,000 | C1 | No | 70/30/5 | D1 | 30 | Invention |
| 32 | 0.19 | 2.56 | 0.00 | 2.75 | 200,000 | C1 | No | 70/30/10 | D1 | 10 | Invention |
| 33 | 0.19 | 2.56 | 0.00 | 2.75 | 200,000 | C1 | No | 70/30/45 | D1 | 10 | Invention |
| 34 | 0.19 | 2.56 | 0.00 | 2.75 | 200,000 | C1 | No | 70/30/51 | D1 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 3

| Film (*2) No. | Cellulose ester resin (B) | | | | | Acrylic Microparticles (C) Kind | State (*3) Miscibility | Content Ratio (*1) | Additive (D) | Additive Amount (*4) | Remarks |
|---|---|---|---|---|---|---|---|---|---|---|---|
| | ac | p | b | T | Mw | | | | | | |
| 100 | | | | | | | | 100/0/0 | D2 | 10 | Comparative |
| 101 | 0.19 | 2.56 | 0.00 | 2.75 | 200,000 | | | 97/3/0 | D2 | 10 | Comparative |
| 102 | 0.19 | 2.56 | 0.00 | 2.75 | 200,000 | | | 92/8/0 | D2 | 10 | Invention |
| 103 | 0.19 | 2.56 | 0.00 | 2.75 | 200,000 | | | 80/20/0 | D2 | 10 | Invention |
| 104 | 0.19 | 2.56 | 0.00 | 2.75 | 200,000 | | | 70/30/0 | D2 | 10 | Invention |
| 105 | 0.19 | 2.56 | 0.00 | 2.75 | 200,000 | | | 60/40/0 | D2 | 10 | Invention |
| 106 | 0.19 | 2.56 | 0.00 | 2.75 | 200,000 | | | 55/45/0 | D2 | 10 | Invention |
| 107 | 0.19 | 2.56 | 0.00 | 2.75 | 200,000 | | | 50/50/0 | D2 | 10 | Comparative |
| 108 | 2.00 | 0.50 | 0.00 | 2.50 | 220,000 | | | 70/30/0 | D2 | 10 | Invention |
| 109 | 1.05 | 1.00 | 0.00 | 2.05 | 180,000 | | | 70/30/0 | D2 | 10 | Invention |
| 110 | 0.30 | 1.50 | 0.00 | 1.80 | 130,000 | | | 70/30/0 | D2 | 10 | Invention |
| 111 | 1.00 | 1.50 | 0.00 | 2.50 | 120,000 | | | 70/30/0 | D2 | 10 | Invention |
| 112 | 1.00 | 0.00 | 1.50 | 2.50 | 150,000 | | | 70/30/0 | D2 | 10 | Invention |
| 113 | 1.50 | 0.00 | 0.70 | 2.20 | 145,000 | | | 70/30/0 | D2 | 10 | Invention |
| 114 | 0.30 | 0.00 | 2.30 | 2.60 | 160,000 | | | 70/30/0 | D2 | 10 | Invention |
| 115 | 0.50 | 1.20 | 1.20 | 2.90 | 180,000 | | | 70/30/0 | D2 | 10 | Invention |
| 116 | 0.19 | 2.56 | 0.00 | 2.75 | 50,000 | | | 70/30/0 | D2 | 10 | Invention |
| 117 | 0.19 | 2.56 | 0.00 | 2.75 | 70,000 | | | 70/30/0 | D2 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 4

| Film (*2) No. | Cellulose ester resin (B) | | | | | Acrylic Microparticles (C) Kind | State (*3) Miscibility | Content Ratio (*1) | Additive (D) | Additive Amount (*4) | Remarks |
|---|---|---|---|---|---|---|---|---|---|---|---|
| | ac | p | b | T | Mw | | | | | | |
| 118 | 0.19 | 2.56 | 0.00 | 2.75 | 250,000 | | | 70/30/0 | D2 | 10 | Invention |
| 119 | 0.19 | 2.56 | 0.00 | 2.75 | 270,000 | | | 70/30/0 | D2 | 10 | Invention |
| 120 | 1.00 | 0.00 | 1.50 | 2.50 | 40,000 | | | 70/30/0 | D2 | 10 | Invention |
| 121 | 0.19 | 2.56 | 0.00 | 2.75 | 200,000 | C1 | No | 70/30/0.02 | D2 | 10 | Invention |
| 122 | 0.19 | 2.56 | 0.00 | 2.75 | 200,000 | C1 | No | 70/30/0.05 | D2 | 10 | Invention |
| 123 | 0.19 | 2.56 | 0.00 | 2.75 | 200,000 | C1 | No | 70/30/0.1 | D2 | 10 | Invention |
| 124 | 0.19 | 2.56 | 0.00 | 2.75 | 200,000 | C1 | No | 70/30/5 | D2 | 0 | Comparative |
| 125 | 0.19 | 2.56 | 0.00 | 2.75 | 200,000 | C1 | No | 70/30/5 | D2 | 2 | Invention |
| 126 | 0.19 | 2.56 | 0.00 | 2.75 | 200,000 | C1 | No | 70/30/5 | D2 | 5 | Invention |

TABLE 4-continued

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 127 | 0.19 | 2.56 | 0.00 | 2.75 | 200,000 | C1 | No | 70/30/5 | D2 | 10 | Invention |
| 128 | 0.19 | 2.56 | 0.00 | 2.75 | 200,000 | C1 | No | 70/30/5 | D2 | 12 | Invention |
| 129 | 0.19 | 2.56 | 0.00 | 2.75 | 200,000 | C1 | No | 70/30/5 | D2 | 15 | Invention |
| 130 | 0.19 | 2.56 | 0.00 | 2.75 | 200,000 | C1 | No | 70/30/5 | D2 | 20 | Invention |
| 131 | 0.19 | 2.56 | 0.00 | 2.75 | 200,000 | C1 | No | 70/30/5 | D2 | 30 | Invention |
| 132 | 0.19 | 2.56 | 0.00 | 2.75 | 200,000 | C1 | No | 70/30/10 | D2 | 10 | Invention |
| 133 | 0.19 | 2.56 | 0.00 | 2.75 | 200,000 | C1 | No | 70/30/45 | D2 | 10 | Invention |
| 134 | 0.19 | 2.56 | 0.00 | 2.75 | 200,000 | C1 | No | 70/30/51 | D2 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 5

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 200 | | | | | | | | 100/0/0 | D3 | 10 | Comparative |
| 201 | 0.19 | 2.56 | 0.00 | 2.75 | 200,000 | | | 97/3/0 | D3 | 10 | Comparative |
| 202 | 0.19 | 2.56 | 0.00 | 2.75 | 200,000 | | | 92/8/0 | D3 | 10 | Invention |
| 203 | 0.19 | 2.56 | 0.00 | 2.75 | 200,000 | | | 80/20/0 | D3 | 10 | Invention |
| 204 | 0.19 | 2.56 | 0.00 | 2.75 | 200,000 | | | 70/30/0 | D3 | 10 | Invention |
| 205 | 0.19 | 2.56 | 0.00 | 2.75 | 200,000 | | | 60/40/0 | D3 | 10 | Invention |
| 206 | 0.19 | 2.56 | 0.00 | 2.75 | 200,000 | | | 55/45/0 | D3 | 10 | Invention |
| 207 | 0.19 | 2.56 | 0.00 | 2.75 | 200,000 | | | 50/50/0 | D3 | 10 | Comparative |
| 208 | 2.00 | 0.50 | 0.00 | 2.50 | 220,000 | | | 70/30/0 | D3 | 10 | Invention |
| 209 | 1.05 | 1.00 | 0.00 | 2.05 | 180,000 | | | 70/30/0 | D3 | 10 | Invention |
| 210 | 0.30 | 1.50 | 0.00 | 1.80 | 130,000 | | | 70/30/0 | D3 | 10 | Invention |
| 211 | 1.00 | 1.50 | 0.00 | 2.50 | 120,000 | | | 70/30/0 | D3 | 10 | Invention |
| 212 | 1.00 | 0.00 | 1.50 | 2.50 | 150,000 | | | 70/30/0 | D3 | 10 | Invention |
| 213 | 1.50 | 0.00 | 0.70 | 2.20 | 145,000 | | | 70/30/0 | D3 | 10 | Invention |
| 214 | 0.30 | 0.00 | 2.30 | 2.60 | 160,000 | | | 70/30/0 | D3 | 10 | Invention |
| 215 | 0.50 | 1.20 | 1.20 | 2.90 | 180,000 | | | 70/30/0 | D3 | 10 | Invention |
| 216 | 0.19 | 2.56 | 0.00 | 2.75 | 50,000 | | | 70/30/0 | D3 | 10 | Invention |
| 217 | 0.19 | 2.56 | 0.00 | 2.75 | 70,000 | | | 70/30/0 | D3 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 6

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 218 | 0.19 | 2.56 | 0.00 | 2.75 | 250,000 | | | 70/30/0 | D3 | 10 | Invention |
| 219 | 0.19 | 2.56 | 0.00 | 2.75 | 270,000 | | | 70/30/0 | D3 | 10 | Invention |
| 220 | 1.00 | 0.00 | 1.50 | 2.50 | 40,000 | | | 70/30/0 | D3 | 10 | Invention |
| 221 | 0.19 | 2.56 | 0.00 | 2.75 | 200,000 | C1 | No | 70/30/0.02 | D3 | 10 | Invention |
| 222 | 0.19 | 2.56 | 0.00 | 2.75 | 200,000 | C1 | No | 70/30/0.05 | D3 | 10 | Invention |
| 223 | 0.19 | 2.56 | 0.00 | 2.75 | 200,000 | C1 | No | 70/30/0.1 | D3 | 10 | Invention |
| 224 | 0.19 | 2.56 | 0.00 | 2.75 | 200,000 | C1 | No | 70/30/5 | D3 | 0 | Comparative |
| 225 | 0.19 | 2.56 | 0.00 | 2.75 | 200,000 | C1 | No | 70/30/5 | D3 | 2 | Invention |
| 226 | 0.19 | 2.56 | 0.00 | 2.75 | 200,000 | C1 | No | 70/30/5 | D3 | 5 | Invention |
| 227 | 0.19 | 2.56 | 0.00 | 2.75 | 200,000 | C1 | No | 70/30/5 | D3 | 10 | Invention |
| 228 | 0.19 | 2.56 | 0.00 | 2.75 | 200,000 | C1 | No | 70/30/5 | D3 | 12 | Invention |
| 229 | 0.19 | 2.56 | 0.00 | 2.75 | 200,000 | C1 | No | 70/30/5 | D3 | 15 | Invention |
| 230 | 0.19 | 2.56 | 0.00 | 2.75 | 200,000 | C1 | No | 70/30/5 | D3 | 20 | Invention |
| 231 | 0.19 | 2.56 | 0.00 | 2.75 | 200,000 | C1 | No | 70/30/5 | D3 | 30 | Invention |
| 232 | 0.19 | 2.56 | 0.00 | 2.75 | 200,000 | C1 | No | 70/30/10 | D3 | 10 | Invention |

TABLE 6-continued

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 233 | 0.19 | 2.56 | 0.00 | 2.75 | 200,000 | C1 | No | 70/30/45 | D3 | 10 | Invention |
| 234 | 0.19 | 2.56 | 0.00 | 2.75 | 200,000 | C1 | No | 70/30/51 | D3 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 7

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 300 |  |  |  |  |  |  |  | 100/0/0 | D4 | 10 | Comparative |
| 301 | 0.19 | 2.56 | 0.00 | 2.75 | 200,000 |  |  | 97/3/0 | D4 | 10 | Comparative |
| 302 | 0.19 | 2.56 | 0.00 | 2.75 | 200,000 |  |  | 92/8/0 | D4 | 10 | Invention |
| 303 | 0.19 | 2.56 | 0.00 | 2.75 | 200,000 |  |  | 80/20/0 | D4 | 10 | Invention |
| 304 | 0.19 | 2.56 | 0.00 | 2.75 | 200,000 |  |  | 70/30/0 | D4 | 10 | Invention |
| 305 | 0.19 | 2.56 | 0.00 | 2.75 | 200,000 |  |  | 60/40/0 | D4 | 10 | Invention |
| 306 | 0.19 | 2.56 | 0.00 | 2.75 | 200,000 |  |  | 55/45/0 | D4 | 10 | Invention |
| 307 | 0.19 | 2.56 | 0.00 | 2.75 | 200,000 |  |  | 50/50/0 | D4 | 10 | Comparative |
| 308 | 2.00 | 0.50 | 0.00 | 2.50 | 220,000 |  |  | 70/30/0 | D4 | 10 | Invention |
| 309 | 1.05 | 1.00 | 0.00 | 2.05 | 180,000 |  |  | 70/30/0 | D4 | 10 | Invention |
| 310 | 0.30 | 1.50 | 0.00 | 1.80 | 130,000 |  |  | 70/30/0 | D4 | 10 | Invention |
| 311 | 1.00 | 1.50 | 0.00 | 2.50 | 120,000 |  |  | 70/30/0 | D4 | 10 | Invention |
| 312 | 1.00 | 0.00 | 1.50 | 2.50 | 150,000 |  |  | 70/30/0 | D4 | 10 | Invention |
| 313 | 1.50 | 0.00 | 0.70 | 2.20 | 145,000 |  |  | 70/30/0 | D4 | 10 | Invention |
| 314 | 0.30 | 0.00 | 2.30 | 2.60 | 160,000 |  |  | 70/30/0 | D4 | 10 | Invention |
| 315 | 0.50 | 1.20 | 1.20 | 2.90 | 180,000 |  |  | 70/30/0 | D4 | 10 | Invention |
| 316 | 0.19 | 2.56 | 0.00 | 2.75 | 50,000 |  |  | 70/30/0 | D4 | 10 | Invention |
| 317 | 0.19 | 2.56 | 0.00 | 2.75 | 70,000 |  |  | 70/30/0 | D4 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 8

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 318 | 0.19 | 2.56 | 0.00 | 2.75 | 250,000 |  |  | 70/30/0 | D4 | 10 | Invention |
| 319 | 0.19 | 2.56 | 0.00 | 2.75 | 270,000 |  |  | 70/30/0 | D4 | 10 | Invention |
| 320 | 1.00 | 0.00 | 1.50 | 2.50 | 40,000 |  |  | 70/30/0 | D4 | 10 | Invention |
| 321 | 0.19 | 2.56 | 0.00 | 2.75 | 200,000 | C1 | No | 70/30/0.02 | D4 | 10 | Invention |
| 322 | 0.19 | 2.56 | 0.00 | 2.75 | 200,000 | C1 | No | 70/30/0.05 | D4 | 10 | Invention |
| 323 | 0.19 | 2.56 | 0.00 | 2.75 | 200,000 | C1 | No | 70/30/0.1 | D4 | 10 | Invention |
| 324 | 0.19 | 2.56 | 0.00 | 2.75 | 200,000 | C1 | No | 70/30/5 | D4 | 0 | Comparative |
| 325 | 0.19 | 2.56 | 0.00 | 2.75 | 200,000 | C1 | No | 70/30/5 | D4 | 2 | Invention |
| 326 | 0.19 | 2.56 | 0.00 | 2.75 | 200,000 | C1 | No | 70/30/5 | D4 | 5 | Invention |
| 327 | 0.19 | 2.56 | 0.00 | 2.75 | 200,000 | C1 | No | 70/30/5 | D4 | 10 | Invention |
| 328 | 0.19 | 2.56 | 0.00 | 2.75 | 200,000 | C1 | No | 70/30/5 | D4 | 12 | Invention |
| 329 | 0.19 | 2.56 | 0.00 | 2.75 | 200,000 | C1 | No | 70/30/5 | D4 | 15 | Invention |
| 330 | 0.19 | 2.56 | 0.00 | 2.75 | 200,000 | C1 | No | 70/30/5 | D4 | 20 | Invention |
| 331 | 0.19 | 2.56 | 0.00 | 2.75 | 200,000 | C1 | No | 70/30/5 | D4 | 30 | Invention |
| 332 | 0.19 | 2.56 | 0.00 | 2.75 | 200,000 | C1 | No | 70/30/10 | D4 | 10 | Invention |
| 333 | 0.19 | 2.56 | 0.00 | 2.75 | 200,000 | C1 | No | 70/30/45 | D4 | 10 | Invention |
| 334 | 0.19 | 2.56 | 0.00 | 2.75 | 200,000 | C1 | No | 70/30/51 | D4 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 9

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 400 | | | | | | | | 100/0/0 | D5 | 10 | Comparative |
| 401 | 0.19 | 2.56 | 0.00 | 2.75 | 200,000 | | | 97/3/0 | D5 | 10 | Comparative |
| 402 | 0.19 | 2.56 | 0.00 | 2.75 | 200,000 | | | 92/8/0 | D5 | 10 | Invention |
| 403 | 0.19 | 2.56 | 0.00 | 2.75 | 200,000 | | | 80/20/0 | D5 | 10 | Invention |
| 404 | 0.19 | 2.56 | 0.00 | 2.75 | 200,000 | | | 70/30/0 | D5 | 10 | Invention |
| 405 | 0.19 | 2.56 | 0.00 | 2.75 | 200,000 | | | 60/40/0 | D5 | 10 | Invention |
| 406 | 0.19 | 2.56 | 0.00 | 2.75 | 200,000 | | | 55/45/0 | D5 | 10 | Invention |
| 407 | 0.19 | 2.56 | 0.00 | 2.75 | 200,000 | | | 50/50/0 | D5 | 10 | Comparative |
| 408 | 2.00 | 0.50 | 0.00 | 2.50 | 220,000 | | | 70/30/0 | D5 | 10 | Invention |
| 409 | 1.05 | 1.00 | 0.00 | 2.05 | 180,000 | | | 70/30/0 | D5 | 10 | Invention |
| 410 | 0.30 | 1.50 | 0.00 | 1.80 | 130,000 | | | 70/30/0 | D5 | 10 | Invention |
| 411 | 1.00 | 1.50 | 0.00 | 2.50 | 120,000 | | | 70/30/0 | D5 | 10 | Invention |
| 412 | 1.00 | 0.00 | 1.50 | 2.50 | 150,000 | | | 70/30/0 | D5 | 10 | Invention |
| 413 | 1.50 | 0.00 | 0.70 | 2.20 | 145,000 | | | 70/30/0 | D5 | 10 | Invention |
| 414 | 0.30 | 0.00 | 2.30 | 2.60 | 160,000 | | | 70/30/0 | D5 | 10 | Invention |
| 415 | 0.50 | 1.20 | 1.20 | 2.90 | 180,000 | | | 70/30/0 | D5 | 10 | Invention |
| 416 | 0.19 | 2.56 | 0.00 | 2.75 | 50,000 | | | 70/30/0 | D5 | 10 | Invention |
| 417 | 0.19 | 2.56 | 0.00 | 2.75 | 70,000 | | | 70/30/0 | D5 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 10

| Film (*2) No. | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|
| 418 | 0.19 | 2.56 | 0.00 | 2.75 | 250,000 | | | 70/30/0 | D5 | 10 | Invention |
| 419 | 0.19 | 2.56 | 0.00 | 2.75 | 270,000 | | | 70/30/0 | D5 | 10 | Invention |
| 420 | 1.00 | 0.00 | 1.50 | 2.50 | 40,000 | | | 70/30/0 | D5 | 10 | Invention |
| 421 | 0.19 | 2.56 | 0.00 | 2.75 | 200,000 | C1 | No | 70/30/0.02 | D5 | 10 | Invention |
| 422 | 0.19 | 2.56 | 0.00 | 2.75 | 200,000 | C1 | No | 70/30/0.05 | D5 | 10 | Invention |
| 423 | 0.19 | 2.56 | 0.00 | 2.75 | 200,000 | C1 | No | 70/30/0.1 | D5 | 10 | Invention |
| 424 | 0.19 | 2.56 | 0.00 | 2.75 | 200,000 | C1 | No | 70/30/5 | D5 | 0 | Comparative |
| 425 | 0.19 | 2.56 | 0.00 | 2.75 | 200,000 | C1 | No | 70/30/5 | D5 | 2 | Invention |
| 426 | 0.19 | 2.56 | 0.00 | 2.75 | 200,000 | C1 | No | 70/30/5 | D5 | 5 | Invention |
| 427 | 0.19 | 2.56 | 0.00 | 2.75 | 200,000 | C1 | No | 70/30/5 | D5 | 10 | Invention |
| 428 | 0.19 | 2.56 | 0.00 | 2.75 | 200,000 | C1 | No | 70/30/5 | D5 | 12 | Invention |
| 429 | 0.19 | 2.56 | 0.00 | 2.75 | 200,000 | C1 | No | 70/30/5 | D5 | 15 | Invention |
| 430 | 0.19 | 2.56 | 0.00 | 2.75 | 200,000 | C1 | No | 70/30/5 | D5 | 20 | Invention |
| 431 | 0.19 | 2.56 | 0.00 | 2.75 | 200,000 | C1 | No | 70/30/5 | D5 | 30 | Invention |
| 432 | 0.19 | 2.56 | 0.00 | 2.75 | 200,000 | C1 | No | 70/30/10 | D5 | 10 | Invention |
| 433 | 0.19 | 2.56 | 0.00 | 2.75 | 200,000 | C1 | No | 70/30/45 | D5 | 10 | Invention |
| 434 | 0.19 | 2.56 | 0.00 | 2.75 | 200,000 | C1 | No | 70/30/51 | D5 | 10 | Invention |

(*1): Acrylic resin (A)/Cellulose ester resin (B)/Acrylic Microparticle (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 11

| Film (*2) No. | Acrylic resin (A) Mw | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|---|
| 500 | 280,000 | | | | | | | | 100/0/0 | D1 | 10 | Comparative |
| 501 | 280,000 | 0.19 | 2.56 | 0.00 | 2.75 | 200,000 | | | 97/3/0 | D1 | 10 | Comparative |
| 502 | 280,000 | 0.19 | 2.56 | 0.00 | 2.75 | 200,000 | | | 92/8/0 | D1 | 10 | Invention |
| 503 | 280,000 | 0.19 | 2.56 | 0.00 | 2.75 | 200,000 | | | 80/20/0 | D1 | 10 | Invention |
| 504 | 280,000 | 0.19 | 2.56 | 0.00 | 2.75 | 200,000 | | | 70/30/0 | D1 | 10 | Invention |
| 505 | 280,000 | 0.19 | 2.56 | 0.00 | 2.75 | 200,000 | | | 60/40/0 | D1 | 10 | Invention |
| 506 | 280,000 | 0.19 | 2.56 | 0.00 | 2.75 | 200,000 | | | 55/45/0 | D1 | 10 | Invention |
| 507 | 280,000 | 0.19 | 2.56 | 0.00 | 2.75 | 200,000 | | | 50/50/0 | D1 | 10 | Comparative |

TABLE 11-continued

| Film (*2) No. | Acrylic resin (A) Mw | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|---|
| 508 | 280,000 | 2.00 | 0.50 | 0.00 | 2.50 | 220,000 | | | 70/30/0 | D1 | 10 | Invention |
| 509 | 280,000 | 1.05 | 1.00 | 0.00 | 2.05 | 180,000 | | | 70/30/0 | D1 | 10 | Invention |
| 510 | 280,000 | 0.30 | 1.50 | 0.00 | 1.80 | 130,000 | | | 70/30/0 | D1 | 10 | Invention |
| 511 | 280,000 | 1.00 | 1.50 | 0.00 | 2.50 | 120,000 | | | 70/30/0 | D1 | 10 | Invention |
| 512 | 280,000 | 1.00 | 0.00 | 1.50 | 2.50 | 150,000 | | | 70/30/0 | D1 | 10 | Invention |
| 513 | 280,000 | 1.50 | 0.00 | 0.70 | 2.20 | 145,000 | | | 70/30/0 | D1 | 10 | Invention |
| 514 | 280,000 | 0.30 | 0.00 | 2.30 | 2.60 | 160,000 | | | 70/30/0 | D1 | 10 | Invention |
| 515 | 280,000 | 0.50 | 1.20 | 1.20 | 2.90 | 180,000 | | | 70/30/0 | D1 | 10 | Invention |
| 516 | 280,000 | 0.19 | 2.56 | 0.00 | 2.75 | 50,000 | | | 70/30/0 | D1 | 10 | Invention |
| 517 | 280,000 | 0.19 | 2.56 | 0.00 | 2.75 | 70,000 | | | 70/30/0 | D1 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 12

| Film (*2) No. | Acrylic resin (A) Mw | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|---|
| 518 | 280,000 | 0.19 | 2.56 | 0.00 | 2.75 | 250,000 | | | 70/30/0 | D1 | 10 | Invention |
| 519 | 280,000 | 0.19 | 2.56 | 0.00 | 2.75 | 270,000 | | | 70/30/0 | D1 | 10 | Invention |
| 520 | 280,000 | 1.00 | 0.00 | 1.50 | 2.50 | 40,000 | | | 70/30/0 | D1 | 10 | Invention |
| 521 | 280,000 | 0.19 | 2.56 | 0.00 | 2.75 | 200,000 | C1 | No | 70/30/0.02 | D1 | 10 | Invention |
| 522 | 280,000 | 0.19 | 2.56 | 0.00 | 2.75 | 200,000 | C1 | No | 70/30/0.05 | D1 | 10 | Invention |
| 523 | 280,000 | 0.19 | 2.56 | 0.00 | 2.75 | 200,000 | C1 | No | 70/30/0.1 | D1 | 10 | Invention |
| 524 | 280,000 | 0.19 | 2.56 | 0.00 | 2.75 | 200,000 | C1 | No | 70/30/5 | D1 | 0 | Comparative |
| 525 | 280,000 | 0.19 | 2.56 | 0.00 | 2.75 | 200,000 | C1 | No | 70/30/5 | D1 | 2 | Invention |
| 526 | 280,000 | 0.19 | 2.56 | 0.00 | 2.75 | 200,000 | C1 | No | 70/30/5 | D1 | 5 | Invention |
| 527 | 280,000 | 0.19 | 2.56 | 0.00 | 2.75 | 200,000 | C1 | No | 70/30/5 | D1 | 10 | Invention |
| 528 | 280,000 | 0.19 | 2.56 | 0.00 | 2.75 | 200,000 | C1 | No | 70/30/5 | D1 | 12 | Invention |
| 529 | 280,000 | 0.19 | 2.56 | 0.00 | 2.75 | 200,000 | C1 | No | 70/30/5 | D1 | 15 | Invention |
| 530 | 280,000 | 0.19 | 2.56 | 0.00 | 2.75 | 200,000 | C1 | No | 70/30/5 | D1 | 20 | Invention |
| 531 | 280,000 | 0.19 | 2.56 | 0.00 | 2.75 | 200,000 | C1 | No | 70/30/5 | D1 | 30 | Invention |
| 532 | 280,000 | 0.19 | 2.56 | 0.00 | 2.75 | 200,000 | C1 | No | 70/30/10 | D1 | 10 | Invention |
| 533 | 280,000 | 0.19 | 2.56 | 0.00 | 2.75 | 200,000 | C1 | No | 70/30/45 | D1 | 10 | Invention |
| 534 | 280,000 | 0.19 | 2.56 | 0.00 | 2.75 | 200,000 | C1 | No | 70/30/51 | D1 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 13

| Film (*2) No. | Acrylic resin (A) Mw | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|---|
| 600 | 140,000 | | | | | | | | 100/0/0 | D1 | 10 | Comparative |
| 601 | 140,000 | 0.19 | 2.56 | 0.00 | 2.75 | 200,000 | | | 97/3/0 | D1 | 10 | Comparative |
| 602 | 140,000 | 0.19 | 2.56 | 0.00 | 2.75 | 200,000 | | | 92/8/0 | D1 | 10 | Invention |
| 603 | 140,000 | 0.19 | 2.56 | 0.00 | 2.75 | 200,000 | | | 80/20/0 | D1 | 10 | Invention |
| 604 | 140,000 | 0.19 | 2.56 | 0.00 | 2.75 | 200,000 | | | 70/30/0 | D1 | 10 | Invention |
| 605 | 140,000 | 0.19 | 2.56 | 0.00 | 2.75 | 200,000 | | | 60/40/0 | D1 | 10 | Invention |
| 606 | 140,000 | 0.19 | 2.56 | 0.00 | 2.75 | 200,000 | | | 55/45/0 | D1 | 10 | Invention |
| 607 | 140,000 | 0.19 | 2.56 | 0.00 | 2.75 | 200,000 | | | 50/50/0 | D1 | 10 | Comparative |
| 608 | 140,000 | 2.00 | 0.50 | 0.00 | 2.50 | 220,000 | | | 70/30/0 | D1 | 10 | Invention |
| 609 | 140,000 | 1.05 | 1.00 | 0.00 | 2.05 | 180,000 | | | 70/30/0 | D1 | 10 | Invention |
| 610 | 140,000 | 0.30 | 1.50 | 0.00 | 1.80 | 130,000 | | | 70/30/0 | D1 | 10 | Invention |
| 611 | 140,000 | 1.00 | 1.50 | 0.00 | 2.50 | 120,000 | | | 70/30/0 | D1 | 10 | Invention |
| 612 | 140,000 | 1.00 | 0.00 | 1.50 | 2.50 | 150,000 | | | 70/30/0 | D1 | 10 | Invention |
| 613 | 140,000 | 1.50 | 0.00 | 0.70 | 2.20 | 145,000 | | | 70/30/0 | D1 | 10 | Invention |

TABLE 13-continued

| Film (*2) No. | Acrylic resin (A) Mw | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|---|
| 614 | 140,000 | 0.30 | 0.00 | 2.30 | 2.60 | 160,000 | | | 70/30/0 | D1 | 10 | Invention |
| 615 | 140,000 | 0.50 | 1.20 | 1.20 | 2.90 | 180,000 | | | 70/30/0 | D1 | 10 | Invention |
| 616 | 140,000 | 0.19 | 2.56 | 0.00 | 2.75 | 50,000 | | | 70/30/0 | D1 | 10 | Invention |
| 617 | 140,000 | 0.19 | 2.56 | 0.00 | 2.75 | 70,000 | | | 70/30/0 | D1 | 10 | Invention |

(*1): Acrylic resin (A)/Cellulose ester resin (B)/Acrylic Microparticles (C)
ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight

TABLE 14

| Film (*2) No. | Acrylic resin (A) Mw | Cellulose ester resin (B) ac | p | b | T | Mw | Acrylic Microparticles (C) Kind | State (*3) Miscibility | Content Ratio (*4) (*1) | Additive (D) | Additive Amount (*4) | Remarks |
|---|---|---|---|---|---|---|---|---|---|---|---|---|
| 618 | 140,000 | 0.19 | 2.56 | 0.00 | 2.75 | 250,000 | | | 70/30/0 | | 10 | Invention |
| 619 | 140,000 | 0.19 | 2.56 | 0.00 | 2.75 | 270,000 | | | 70/30/0 | | 10 | Invention |
| 620 | 140,000 | 1.00 | 0.00 | 1.50 | 2.75 | 40,000 | | | 70/30/0 | | 10 | Invention |
| 621 | 140,000 | 0.19 | 2.56 | 0.00 | 2.75 | 200,000 | C1 | No | 70/30/0.02 | | 10 | Invention |
| 622 | 140,000 | 0.19 | 2.56 | 0.00 | 2.75 | 200,000 | C1 | No | 70/30/0.05 | | 10 | Invention |
| 623 | 140,000 | 0.19 | 2.56 | 0.00 | 2.75 | 200,000 | C1 | No | 70/30/0.1 | | 10 | Invention |
| 624 | 140,000 | 0.19 | 2.56 | 0.00 | 2.75 | 200,000 | C1 | No | 70/30/5 | | 0 | Comparative |
| 625 | 140,000 | 0.19 | 2.56 | 0.00 | 2.75 | 200,000 | C1 | No | 70/30/5 | | 2 | Invention |
| 626 | 140,000 | 0.19 | 2.56 | 0.00 | 2.75 | 200,000 | C1 | No | 70/30/5 | | 5 | Invention |
| 627 | 140,000 | 0.19 | 2.56 | 0.00 | 2.75 | 200,000 | C1 | No | 70/30/5 | | 10 | Invention |
| 628 | 140,000 | 0.19 | 2.56 | 0.00 | 2.75 | 200,000 | C1 | No | 70/30/5 | | 12 | Invention |
| 629 | 140,000 | 0.19 | 2.56 | 0.00 | 2.75 | 200,000 | C1 | No | 70/30/5 | | 15 | Invention |
| 630 | 140,000 | 0.19 | 2.56 | 0.00 | 2.75 | 200,000 | C1 | No | 70/30/5 | | 20 | Invention |
| 631 | 140,000 | 0.19 | 2.56 | 0.00 | 2.75 | 200,000 | C1 | No | 70/30/5 | | 30 | Invention |
| 632 | 140,000 | 0.19 | 2.56 | 0.00 | 2.75 | 200,000 | C1 | No | 70/30/10 | | 10 | Invention |
| 633 | 140,000 | 0.19 | 2.56 | 0.00 | 2.75 | 200,000 | C1 | No | 70/30/45 | | 10 | Invention |
| 634 | 140,000 | 0.19 | 2.56 | 0.00 | 2.75 | 200,000 | C1 | No | 70/30/51 | | 10 | Invention |

(*1): Acrylic resin (A)/Cellulose ester resin (B)/Acrylic Microparticles (C)
Ac: Acetyl substitution degree, p: Propionyl substitution degree, b: Butyryl substitution degree, T: Total substitution degree,
(*2): Acrylic Resin Containing Films
(*3): State of resin and microparticles
(*4): Parts by weight The additives D1 to D5 are retardation control agents as shown below.

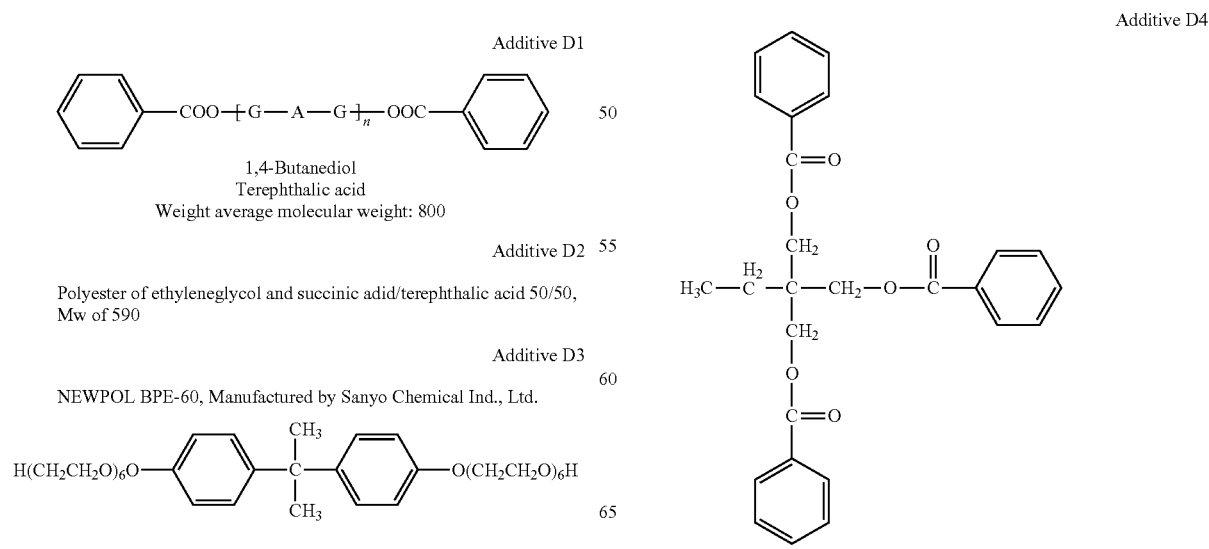

Additive D1

1,4-Butanediol
Terephthalic acid
Weight average molecular weight: 800

Additive D2

Polyester of ethyleneglycol and succinic adid/terephthalic acid 50/50, Mw of 590

Additive D3

NEWPOL BPE-60, Manufactured by Sanyo Chemical Ind., Ltd.

Additive D4

-continued

Additive D5

MONOPET SB

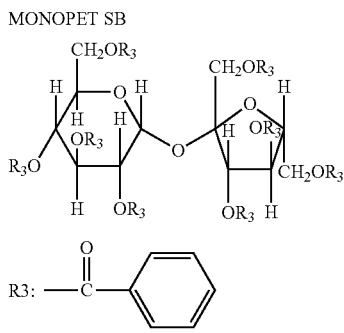

<<Evaluation>>

Evaluation was conducted for the obtained acrylic resin containing film samples.

(Haze)

With regard to the film samples prepared as described above, a film sample sheet was evaluated via a haze meter (Type NDH 2000, produced by Nippon Denshoku Industries Co., Ltd.) based on JIS K 7136.

(Tension Softening Point: Evaluation of Heat Resistance)

The following evaluation was carried out employing a TENSIRON tester (RTC-1225A, produced by ORIENTEC Co., Ltd.).

Acrylic resin containing film was cut to 120 mm (longitudinal)×10 mm (vertical). While pulling the resulting sheet under a tension of 10 N, temperature was raised at a rate of 30° C./minute, and temperature which resulted in 9N was determined thrice, followed by calculation of the average.

(Ductile Breaking)

Acrylic resin containing film was cut to 100 mm (longitudinal)×10 mm (vertical). The resulting sheet was subjected to one mountain fold and one valley fold in the longitudinal direction in the central portion. The above test was carried out thrice, and evaluation was made based on the following criteria. Incidentally, "fold", as described in the evaluation, means that the sheet is broken up into at least two portions.

A: no fold was noted during three tests
B: at least one fold was noted during three tests (Dimensional Change Due to Humidity Change)

Two positions on the prepared film were marked (with +) in the casting direction. The marked film was treated at 60° C. and 90% relative humidity for 1,000 hours. Prior to and after the treatment, the distance between the marks (+marks) was determined via an optical microscope, and evaluation was performed based on the following criteria.

Dimensional change ratio (in %)=[($a1-a2$)/$a1$]×100 wherein "a1" represents the distance prior to treatment, while "a2" represents the distance after treatment
A: less than 0.3%
B: at least 0.3% to less than 0.5%
C: at least 0.5%

(Cutting Property)

Each optical film was torn, via a light load tearing meter (produced by Toyo Seiki Seisaku-sho, Ltd.), and was evaluated based on the following criteria.

A: the torn plane was very smooth, and straight tearing resulted
B: the torn plane resulted in slight weld flash, and tearing resulted in a straight line
C: the torn plane resulted in significant weld flash, and tearing resulted in no straight line (Measurement of Retardation)

Prepared acrylic resin containing film was cut to 35 mm×35 mm sample, it was subjected to conditioning at 25 C and 55% RH for 2 hours. Retardation value at each wavelength of 450, 590, and 650 nm was calculated by extrapolation of retardation values measured at normal direction and inclined direction via automatic birefringence meter KOBRA-21ADH (produced by Oji Scientific Instruments Co., Ltd.).

(Measurement of Photoelastic Coefficient)

Film in-plane retardation Ro of the prepared acrylic resin containing film was measured while applying load, and the value was divided by film thickness d to obtain Δn=Ro/d. Δn was measured at varied load, and load-Δn curve was plotted. Gradient was set as the photoelastic coefficient.

The film in-plane retardation ho was measured at a wavelength of 589 nm via the retardation measurement apparatus KOBRA 31PR (produced by Oji Scientific Instruments Co., Ltd.).

The results of the evaluation are summarized in Tables 15 through 28.

TABLE 15

| Film (*2) | Haze (%) | Tension Softening Point (° C.) | Ductile Breaking | Film Deformation | Dimensional Change | Cutting Property | Retardation Ro | Rt | Wavelength Dispersion | Photo Elasticity | Remarks |
|---|---|---|---|---|---|---|---|---|---|---|---|
| 0 | 0.24 | 98 | C | C | A | B | 36 | 43 | 0.78 | -5.9 | Comparative |
| 1 | 0.22 | 101 | C | C | A | B | 41 | 47 | 0.80 | -5.9 | Comparative |
| 2 | 0.26 | 104 | A | B | A | A | 51 | 62 | 0.83 | -3.8 | Invention |
| 3 | 0.24 | 112 | A | B | A | A | 57 | 68 | 0.85 | -1.9 | Invention |
| 4 | 0.27 | 114 | A | A | A | A | 60 | 72 | 0.91 | 1.1 | Invention |
| 5 | 0.28 | 117 | A | A | A | A | 71 | 82 | 0.93 | 2.1 | Invention |
| 6 | 0.34 | 119 | A | A | B | A | 81 | 97 | 0.94 | 3.2 | Invention |
| 7 | 0.35 | 120 | A | A | C | A | 86 | 107 | 0.97 | 6.1 | Invention |
| 8 | 13.21 | 114 | A | C | A | C | 66 | 77 | 0.90 | 1.2 | Invention |
| 9 | 8.51 | 108 | A | C | A | C | 72 | 82 | 0.92 | 1.0 | Invention |
| 10 | 2.12 | 112 | A | C | A | B | 90 | 107 | 0.92 | 1.0 | Invention |
| 11 | 0.42 | 110 | A | A | A | A | 62 | 72 | 0.91 | 1.0 | Invention |
| 12 | 0.71 | 104 | A | A | A | A | 61 | 71 | 0.90 | 1.1 | Invention |
| 13 | 2.73 | 110 | A | C | A | B | 67 | 77 | 0.92 | 1.1 | Invention |
| 14 | 0.35 | 103 | A | A | A | A | 72 | 88 | 0.91 | 1.2 | Invention |
| 15 | 0.24 | 110 | A | A | A | A | 51 | 63 | 0.91 | 1.0 | Invention |

TABLE 15-continued

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 16 | 0.26 | 106 | C | B | A | C | 60 | 73 | 0.90 | 1.2 | Invention |
| 17 | 0.27 | 109 | A | B | A | B | 61 | 72 | 0.91 | 1.1 | Invention |

(*2): Acrylic Resin Containing Films

TABLE 16

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 18 | 0.48 | 120 | A | A | A | A | 60 | 72 | 0.91 | 1.0 | Invention |
| 19 | 1.53 | 120 | A | A | A | A | 61 | 71 | 0.91 | 1.1 | Invention |
| 20 | 0.36 | 108 | C | B | A | C | 76 | 86 | 0.92 | 1.0 | Invention |
| 21 | 0.30 | 117 | A | A | A | B | 62 | 72 | 0.90 | 1.1 | Invention |
| 22 | 0.30 | 117 | A | A | A | B | 61 | 72 | 0.90 | 1.0 | Invention |
| 23 | 0.31 | 116 | A | A | A | B | 61 | 72 | 0.90 | 1.0 | Invention |
| 24 | 0.29 | 116 | A | A | A | A | 2 | 4 | 0.85 | −1.0 | Comparative |
| 25 | 0.29 | 117 | A | A | A | A | 37 | 58 | 0.88 | 0.0 | Invention |
| 26 | 0.28 | 115 | A | A | A | A | 47 | 62 | 0.90 | 1.1 | Invention |
| 27 | 0.28 | 111 | A | A | A | A | 61 | 72 | 0.92 | 1.1 | Invention |
| 28 | 0.29 | 109 | A | A | A | A | 122 | 132 | 0.93 | 2.1 | Invention |
| 29 | 0.30 | 106 | A | A | A | A | 181 | 193 | 0.93 | 2.1 | Invention |
| 30 | 0.30 | 104 | A | A | A | A | 251 | 251 | 0.94 | 3.1 | Invention |
| 31 | 0.29 | 101 | A | A | A | A | 297 | 297 | 0.94 | 4.1 | Invention |
| 32 | 0.25 | 115 | A | A | A | A | 60 | 72 | 0.92 | 1.1 | Invention |
| 33 | 0.42 | 106 | A | B | A | A | 56 | 67 | 0.91 | 1.1 | Invention |
| 34 | 0.58 | 101 | A | C | B | A | 51 | 61 | 0.90 | 1.2 | Invention |

(*2): Acrylic Resin Containing Films

TABLE 17

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 100 | 0.26 | 101 | C | C | A | B | 41 | 43 | 0.79 | −5.9 | Comparative |
| 101 | 0.23 | 102 | C | C | A | B | 45 | 49 | 0.81 | −5.8 | Comparative |
| 102 | 0.26 | 106 | A | B | A | A | 55 | 64 | 0.82 | −3.7 | Invention |
| 103 | 0.27 | 113 | A | B | A | A | 60 | 68 | 0.85 | −1.9 | Invention |
| 104 | 0.29 | 115 | A | A | A | A | 66 | 73 | 0.91 | 1.3 | Invention |
| 105 | 0.31 | 117 | A | A | A | A | 75 | 83 | 0.93 | 2.3 | Invention |
| 106 | 0.36 | 120 | A | A | B | A | 84 | 99 | 0.95 | 3.1 | Invention |
| 107 | 0.37 | 121 | A | A | C | A | 89 | 109 | 0.96 | 6.2 | Comparative |
| 108 | 13.24 | 114 | A | C | A | C | 69 | 80 | 0.91 | 1.2 | Invention |
| 109 | 8.55 | 110 | A | C | A | C | 75 | 84 | 0.91 | 1.3 | Invention |
| 110 | 2.15 | 113 | A | C | A | B | 96 | 109 | 0.92 | 1.2 | Invention |
| 111 | 0.45 | 109 | A | A | A | A | 65 | 74 | 0.90 | 1.3 | Invention |
| 112 | 0.74 | 105 | A | A | A | A | 65 | 74 | 0.91 | 1.1 | Invention |
| 113 | 2.74 | 110 | A | C | A | B | 71 | 79 | 0.92 | 1.2 | Invention |
| 114 | 0.36 | 105 | A | A | A | A | 75 | 90 | 0.90 | 1.2 | Invention |
| 115 | 0.26 | 113 | A | A | A | A | 54 | 63 | 0.92 | 1.2 | Invention |
| 116 | 0.28 | 109 | C | B | A | C | 65 | 74 | 0.92 | 1.2 | Invention |
| 117 | 0.29 | 109 | A | B | A | B | 66 | 74 | 0.91 | 1.1 | Invention |

(*2): Acrylic Resin Containing Films

TABLE 18

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 118 | 0.50 | 121 | A | A | A | A | 64 | 73 | 0.90 | 1.2 | Invention |
| 119 | 1.54 | 121 | A | A | A | A | 64 | 75 | 0.92 | 1.2 | Invention |
| 120 | 0.38 | 109 | C | B | A | C | 80 | 90 | 0.91 | 1.3 | Invention |
| 121 | 0.31 | 119 | A | A | A | B | 66 | 74 | 0.91 | 1.2 | Invention |
| 122 | 0.32 | 118 | A | A | A | B | 64 | 73 | 0.91 | 1.3 | Invention |
| 123 | 0.32 | 118 | A | A | A | B | 65 | 74 | 0.91 | 1.1 | Invention |
| 124 | 0.31 | 116 | A | A | A | A | 6 | 5 | 0.86 | −0.8 | Comparative |
| 125 | 0.31 | 116 | A | A | A | A | 40 | 58 | 0.87 | 0.3 | Invention |
| 126 | 0.31 | 116 | A | A | A | A | 51 | 63 | 0.89 | 1.3 | Invention |
| 127 | 0.32 | 111 | A | A | A | A | 64 | 75 | 0.90 | 1.1 | Invention |
| 128 | 0.31 | 111 | A | A | A | A | 125 | 134 | 0.92 | 2.2 | Invention |
| 129 | 0.30 | 107 | A | A | A | A | 186 | 194 | 0.93 | 2.2 | Invention |
| 130 | 0.32 | 104 | A | A | A | A | 256 | 254 | 0.92 | 3.3 | Invention |
| 131 | 0.31 | 102 | A | A | A | A | 299 | 298 | 0.95 | 4.3 | Invention |
| 132 | 0.26 | 116 | A | A | A | A | 65 | 75 | 0.91 | 1.2 | Invention |
| 133 | 0.44 | 107 | A | B | A | A | 60 | 68 | 0.92 | 1.1 | Invention |
| 134 | 0.60 | 103 | A | C | B | A | 55 | 64 | 0.91 | 1.1 | Invention |

(*2): Acrylic Resin Containing Films

TABLE 19

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 200 | 0.27 | 100 | C | C | A | B | 40 | 44 | 0.79 | −5.6 | Comparative |
| 201 | 0.27 | 100 | C | C | A | B | 45 | 48 | 0.79 | −5.6 | Comparative |
| 202 | 0.30 | 106 | A | B | A | A | 54 | 62 | 0.83 | −3.7 | Invention |
| 203 | 0.28 | 110 | A | B | A | A | 60 | 68 | 0.85 | −1.7 | Invention |
| 204 | 0.31 | 113 | A | A | A | A | 65 | 74 | 0.90 | 1.3 | Invention |
| 205 | 0.34 | 116 | A | A | A | A | 76 | 83 | 0.93 | 2.4 | Invention |
| 206 | 0.37 | 120 | A | A | B | A | 84 | 98 | 0.94 | 3.3 | Invention |
| 207 | 0.40 | 120 | A | A | C | A | 90 | 107 | 0.95 | 6.3 | Comparative |
| 208 | 13.27 | 113 | A | C | A | C | 70 | 79 | 0.91 | 1.3 | Invention |
| 209 | 8.56 | 107 | A | C | A | C | 76 | 83 | 0.90 | 1.3 | Invention |
| 210 | 2.15 | 112 | A | C | A | B | 95 | 107 | 0.91 | 1.3 | Invention |
| 211 | 0.47 | 109 | A | A | A | A | 66 | 73 | 0.91 | 1.3 | Invention |
| 212 | 0.77 | 105 | A | A | A | A | 65 | 73 | 0.89 | 1.3 | Invention |
| 213 | 2.75 | 109 | A | C | A | B | 70 | 78 | 0.89 | 1.3 | Invention |
| 214 | 0.38 | 104 | A | A | A | A | 75 | 88 | 0.89 | 1.2 | Invention |
| 215 | 0.28 | 111 | A | A | A | A | 55 | 63 | 0.91 | 1.4 | Invention |
| 216 | 0.30 | 108 | C | B | A | C | 66 | 74 | 0.90 | 1.2 | Invention |
| 217 | 0.31 | 109 | A | B | A | B | 64 | 74 | 0.89 | 1.2 | Invention |

(*2): Acrylic Resin Containing Films

TABLE 20

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 218 | 0.53 | 120 | A | A | A | A | 65 | 72 | 0.90 | 1.3 | Invention |
| 219 | 1.55 | 122 | A | A | A | A | 65 | 72 | 0.90 | 1.3 | Invention |
| 220 | 0.42 | 107 | C | B | A | C | 80 | 88 | 0.90 | 1.3 | Invention |
| 221 | 0.32 | 117 | A | A | A | B | 64 | 73 | 0.89 | 1.3 | Invention |
| 222 | 0.34 | 118 | A | A | A | B | 65 | 74 | 0.91 | 1.3 | Invention |
| 223 | 0.34 | 117 | A | A | A | B | 64 | 74 | 0.89 | 1.4 | Invention |
| 224 | 0.33 | 117 | A | A | A | A | 6 | 5 | 0.83 | −0.7 | Comparative |
| 225 | 0.33 | 116 | A | A | A | A | 40 | 58 | 0.85 | 0.3 | Invention |
| 226 | 0.33 | 114 | A | A | A | A | 50 | 63 | 0.88 | 1.3 | Invention |
| 227 | 0.32 | 111 | A | A | A | A | 65 | 74 | 0.89 | 1.4 | Invention |
| 228 | 0.33 | 108 | A | A | A | A | 125 | 133 | 0.90 | 2.2 | Invention |
| 229 | 0.34 | 107 | A | A | A | A | 184 | 193 | 0.92 | 2.4 | Invention |
| 230 | 0.33 | 104 | A | A | A | A | 254 | 253 | 0.91 | 3.4 | Invention |
| 231 | 0.32 | 100 | A | A | A | A | 301 | 298 | 0.93 | 4.2 | Invention |

TABLE 20-continued

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 232 | 0.28 | 115 | A | A | A | A | 65 | 73 | 0.90 | 1.3 | Invention |
| 233 | 0.45 | 106 | A | B | A | A | 61 | 67 | 0.90 | 1.2 | Invention |
| 234 | 0.62 | 101 | A | C | B | A | 55 | 63 | 0.90 | 1.3 | Invention |

(*2): Acrylic Resin Containing Films

TABLE 21

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 300 | 0.23 | 100 | C | C | A | B | 37 | 42 | 0.78 | −5.5 | Comparative |
| 301 | 0.21 | 102 | C | C | A | B | 43 | 48 | 0.80 | −5.4 | Comparative |
| 302 | 0.24 | 107 | A | B | A | A | 51 | 63 | 0.84 | −3.5 | Invention |
| 303 | 0.24 | 112 | A | B | A | A | 57 | 66 | 0.85 | −1.5 | Invention |
| 304 | 0.24 | 114 | A | A | A | A | 62 | 71 | 0.90 | 1.6 | Invention |
| 305 | 0.27 | 118 | A | A | A | A | 72 | 82 | 0.94 | 2.5 | Invention |
| 306 | 0.33 | 119 | A | A | B | A | 82 | 98 | 0.94 | 3.4 | Invention |
| 307 | 0.33 | 122 | A | A | C | A | 87 | 106 | 0.98 | 6.5 | Comparative |
| 308 | 13.20 | 114 | A | C | A | C | 66 | 77 | 0.91 | 1.4 | Invention |
| 309 | 8.51 | 108 | A | C | A | C | 72 | 81 | 0.91 | 1.5 | Invention |
| 310 | 2.11 | 113 | A | C | A | B | 93 | 106 | 0.92 | 1.5 | Invention |
| 311 | 0.40 | 110 | A | A | A | A | 62 | 72 | 0.91 | 1.5 | Invention |
| 312 | 0.72 | 105 | A | A | A | A | 62 | 72 | 0.91 | 1.5 | Invention |
| 313 | 2.71 | 112 | A | C | A | B | 67 | 76 | 0.90 | 1.6 | Invention |
| 314 | 0.34 | 104 | A | A | A | A | 73 | 86 | 0.91 | 1.5 | Invention |
| 315 | 0.23 | 112 | A | A | A | A | 52 | 63 | 0.92 | 1.5 | Invention |
| 316 | 0.24 | 107 | C | B | A | C | 61 | 72 | 0.91 | 1.6 | Invention |
| 317 | 0.26 | 110 | A | B | A | B | 63 | 73 | 0.91 | 1.5 | Invention |

(*2): Acrylic Resin Containing Films

TABLE 22

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 318 | 0.48 | 119 | A | A | A | A | 63 | 71 | 0.91 | 1.5 | Invention |
| 319 | 1.51 | 121 | A | A | A | A | 62 | 73 | 0.91 | 1.4 | Invention |
| 320 | 0.37 | 108 | C | B | A | C | 78 | 88 | 0.91 | 1.6 | Invention |
| 321 | 0.28 | 119 | A | A | A | B | 61 | 72 | 0.91 | 1.5 | Invention |
| 322 | 0.29 | 119 | A | A | A | B | 61 | 72 | 0.90 | 1.6 | Invention |
| 323 | 0.30 | 119 | A | A | A | B | 62 | 72 | 0.92 | 1.5 | Invention |
| 324 | 0.28 | 117 | A | A | A | A | 3 | 4 | 0.85 | −0.6 | Comparative |
| 325 | 0.29 | 116 | A | A | A | A | 38 | 57 | 0.87 | 0.4 | Invention |
| 326 | 0.28 | 116 | A | A | A | A | 47 | 63 | 0.89 | 1.6 | Invention |
| 327 | 0.28 | 113 | A | A | A | A | 61 | 72 | 0.91 | 1.5 | Invention |
| 328 | 0.29 | 110 | A | A | A | A | 121 | 132 | 0.91 | 2.5 | Invention |
| 329 | 0.28 | 106 | A | A | A | A | 183 | 192 | 0.93 | 2.6 | Invention |
| 330 | 0.28 | 106 | A | A | A | A | 252 | 252 | 0.92 | 3.4 | Invention |
| 331 | 0.27 | 103 | A | A | A | A | 297 | 297 | 0.95 | 4.6 | Invention |
| 332 | 0.22 | 116 | A | A | A | A | 63 | 73 | 0.91 | 1.5 | Invention |
| 333 | 0.41 | 106 | A | B | A | A | 57 | 67 | 0.92 | 1.4 | Invention |
| 334 | 0.57 | 102 | A | C | B | A | 53 | 62 | 0.92 | 1.5 | Invention |

(*2): Acrylic Resin Containing Films

TABLE 23

| Film (*2) | Haze (%) | Tension Softening Point (° C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 400 | 0.22 | 101 | C | C | A | B | 40 | 41 | 0.77 | −5.7 | Comparative |
| 401 | 0.20 | 104 | C | C | A | B | 44 | 46 | 0.79 | −5.6 | Comparative |
| 402 | 0.23 | 108 | A | B | A | A | 53 | 62 | 0.82 | −3.5 | Invention |
| 403 | 0.23 | 113 | A | B | A | A | 60 | 67 | 0.85 | −1.7 | Invention |
| 404 | 0.24 | 115 | A | A | A | A | 64 | 72 | 0.90 | 1.4 | Invention |
| 405 | 0.27 | 119 | A | A | A | A | 75 | 82 | 0.92 | 2.3 | Invention |
| 406 | 0.33 | 120 | A | A | B | A | 84 | 97 | 0.93 | 3.3 | Invention |
| 407 | 0.32 | 122 | A | A | C | A | 90 | 107 | 0.97 | 6.5 | Comparative |
| 408 | 13.21 | 114 | A | C | A | C | 69 | 78 | 0.90 | 1.4 | Invention |
| 409 | 8.50 | 110 | A | C | A | C | 74 | 82 | 0.89 | 1.4 | Invention |
| 410 | 2.11 | 113 | A | C | A | B | 95 | 107 | 0.90 | 1.4 | Invention |
| 411 | 0.40 | 112 | A | A | A | A | 64 | 72 | 0.91 | 1.4 | Invention |
| 412 | 0.71 | 106 | A | A | A | A | 64 | 71 | 0.91 | 1.3 | Invention |
| 413 | 2.70 | 112 | A | C | A | B | 69 | 77 | 0.89 | 1.3 | Invention |
| 414 | 0.33 | 105 | A | A | A | A | 74 | 87 | 0.90 | 1.4 | Invention |
| 415 | 0.21 | 112 | A | A | A | A | 55 | 62 | 0.91 | 1.4 | Invention |
| 416 | 0.24 | 109 | C | B | A | C | 64 | 72 | 0.90 | 1.4 | Invention |
| 417 | 0.25 | 110 | A | B | A | B | 64 | 73 | 0.89 | 1.3 | Invention |

(*2): Acrylic Resin Containing Films

TABLE 24

| Film (*2) | Haze (%) | Tension Softening Point (° C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 418 | 0.48 | 121 | A | A | A | A | 65 | 72 | 0.90 | 1.4 | Invention |
| 419 | 1.50 | 123 | A | A | A | A | 64 | 71 | 0.90 | 1.4 | Invention |
| 420 | 0.34 | 109 | C | B | A | C | 80 | 88 | 0.90 | 1.4 | Invention |
| 421 | 0.27 | 120 | A | A | A | B | 63 | 71 | 0.90 | 1.5 | Invention |
| 422 | 0.28 | 118 | A | A | A | B | 63 | 72 | 0.91 | 1.5 | Invention |
| 423 | 0.28 | 120 | A | A | A | B | 64 | 73 | 0.89 | 1.4 | Invention |
| 424 | 0.27 | 119 | A | A | A | A | 4 | 5 | 0.84 | −0.6 | Comparative |
| 425 | 0.28 | 118 | A | A | A | A | 38 | 58 | 0.86 | 0.5 | Invention |
| 426 | 0.26 | 115 | A | A | A | A | 48 | 63 | 0.88 | 1.4 | Invention |
| 427 | 0.27 | 114 | A | A | A | A | 65 | 72 | 0.89 | 1.4 | Invention |
| 428 | 0.27 | 112 | A | A | A | A | 125 | 132 | 0.91 | 2.3 | Invention |
| 429 | 0.28 | 108 | A | A | A | A | 185 | 191 | 0.93 | 2.3 | Invention |
| 430 | 0.26 | 107 | A | A | A | A | 254 | 252 | 0.92 | 3.4 | Invention |
| 431 | 0.27 | 103 | A | A | A | A | 299 | 296 | 0.94 | 4.5 | Invention |
| 432 | 0.22 | 118 | A | A | A | A | 65 | 71 | 0.89 | 1.4 | Invention |
| 433 | 0.40 | 109 | A | B | A | A | 58 | 68 | 0.91 | 1.3 | Invention |
| 434 | 0.56 | 103 | A | C | B | A | 54 | 61 | 0.91 | 1.5 | Invention |

(*2): Acrylic Resin Containing Films

TABLE 25

| Film (*2) | Haze (%) | Tension Softening Point (° C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 500 | 0.25 | 101 | C | C | A | B | 37 | 43 | 0.79 | −5.9 | Comparative |
| 501 | 0.24 | 104 | C | C | A | B | 42 | 46 | 0.80 | −6.1 | Comparative |
| 502 | 0.26 | 108 | A | B | A | A | 51 | 61 | 0.81 | −3.7 | Invention |
| 503 | 0.26 | 115 | A | B | A | A | 57 | 68 | 0.85 | −1.5 | Invention |
| 504 | 0.29 | 118 | A | A | A | A | 59 | 72 | 0.89 | 1.0 | Invention |
| 505 | 0.31 | 120 | A | A | A | A | 71 | 81 | 0.91 | 2.0 | Invention |
| 506 | 0.35 | 122 | A | A | B | A | 82 | 98 | 0.92 | 3.6 | Invention |
| 507 | 0.34 | 122 | A | A | C | A | 87 | 107 | 0.96 | 6.4 | Comparative |
| 508 | 13.21 | 117 | A | C | A | C | 66 | 77 | 0.89 | 0.7 | Invention |
| 509 | 8.51 | 111 | A | C | A | C | 73 | 82 | 0.90 | 0.7 | Invention |
| 510 | 2.13 | 115 | A | C | A | B | 91 | 107 | 0.93 | 1.0 | Invention |
| 511 | 0.41 | 113 | A | A | A | A | 62 | 72 | 0.92 | 1.0 | Invention |
| 512 | 0.74 | 107 | A | A | A | A | 61 | 71 | 0.90 | 1.5 | Invention |
| 513 | 2.73 | 113 | A | C | A | B | 68 | 77 | 0.93 | 1.4 | Invention |

TABLE 25-continued

| Film (*2) | Haze (%) | Tension Softening Point (° C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 514 | 0.34 | 106 | A | A | A | A | 72 | 87 | 0.90 | 0.9 | Invention |
| 515 | 0.24 | 113 | A | A | A | A | 52 | 63 | 0.91 | 1.5 | Invention |
| 516 | 0.24 | 110 | B | B | A | B | 61 | 73 | 0.92 | 1.6 | Invention |
| 517 | 0.26 | 111 | A | B | A | B | 62 | 72 | 0.91 | 1.4 | Invention |

(*2): Acrylic Resin Containing Films

TABLE 26

| Film (*2) | Haze (%) | Tension Softening Point (° C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 518 | 0.50 | 123 | A | A | A | A | 60 | 71 | 0.93 | 1.2 | Invention |
| 519 | 1.53 | 123 | A | A | A | A | 61 | 72 | 0.92 | 1.1 | Invention |
| 520 | 0.34 | 111 | B | B | A | C | 77 | 86 | 0.94 | 0.7 | Invention |
| 521 | 0.31 | 120 | A | A | A | B | 61 | 72 | 0.89 | 0.6 | Invention |
| 522 | 0.31 | 121 | A | A | A | B | 61 | 72 | 0.92 | 1.5 | Invention |
| 523 | 0.29 | 119 | A | A | A | B | 61 | 71 | 0.89 | 1.4 | Invention |
| 524 | 0.29 | 119 | A | A | A | A | 3 | 4 | 0.83 | −1.2 | Comparative |
| 525 | 0.28 | 120 | A | A | A | A | 36 | 58 | 0.86 | 0.2 | Invention |
| 526 | 0.26 | 118 | A | A | A | A | 47 | 63 | 0.90 | 0.9 | Invention |
| 527 | 0.30 | 114 | A | A | A | A | 61 | 73 | 0.93 | 1.6 | Invention |
| 528 | 0.26 | 113 | A | A | A | A | 122 | 133 | 0.92 | 2.4 | Invention |
| 529 | 0.31 | 110 | A | A | A | A | 180 | 192 | 0.93 | 1.8 | Invention |
| 530 | 0.31 | 107 | A | A | A | A | 251 | 251 | 0.94 | 3.4 | Invention |
| 531 | 0.30 | 104 | A | A | A | A | 297 | 297 | 0.96 | 4.2 | Invention |
| 532 | 0.24 | 119 | A | A | A | A | 61 | 72 | 0.90 | 1.0 | Invention |
| 533 | 0.40 | 108 | A | B | A | A | 56 | 66 | 0.91 | 0.9 | Invention |
| 534 | 0.58 | 105 | A | C | B | A | 51 | 62 | 0.89 | 1.3 | Invention |

(*2): Acrylic Resin Containing Films

TABLE 27

| Film (*2) | Haze (%) | Tension Softening Point (° C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 600 | 0.25 | 99 | C | C | A | B | 36 | 42 | 0.79 | −6.2 | Comparative |
| 601 | 0.23 | 102 | C | C | A | B | 40 | 47 | 0.78 | −5.8 | Comparative |
| 602 | 0.28 | 105 | A | B | A | A | 50 | 61 | 0.83 | −3.6 | Invention |
| 603 | 0.25 | 112 | A | B | A | A | 57 | 68 | 0.85 | −2.1 | Invention |
| 604 | 0.29 | 115 | A | A | A | A | 59 | 71 | 0.89 | 0.9 | Invention |
| 605 | 0.27 | 118 | A | A | A | A | 72 | 82 | 0.92 | 2.5 | Invention |
| 606 | 0.34 | 120 | A | A | B | A | 81 | 97 | 0.95 | 3.2 | Invention |
| 607 | 0.34 | 121 | A | A | C | A | 87 | 106 | 0.97 | 6.1 | Comparative |
| 608 | 13.22 | 115 | A | C | A | C | 66 | 77 | 0.88 | 1.1 | Invention |
| 609 | 8.52 | 109 | A | C | A | B | 73 | 81 | 0.90 | 1.4 | Invention |
| 610 | 2.09 | 114 | A | C | A | B | 91 | 107 | 0.92 | 1.0 | Invention |
| 611 | 0.44 | 110 | A | A | A | A | 62 | 73 | 0.91 | 1.1 | Invention |
| 612 | 0.73 | 105 | A | A | A | A | 60 | 71 | 0.90 | 1.6 | Invention |
| 613 | 2.74 | 111 | A | C | A | B | 68 | 78 | 0.94 | 0.8 | Invention |
| 614 | 0.36 | 105 | A | A | A | A | 71 | 88 | 0.91 | 0.8 | Invention |
| 615 | 0.23 | 111 | A | A | A | A | 51 | 63 | 0.93 | 0.8 | Invention |
| 616 | 0.27 | 108 | B | B | A | C | 61 | 74 | 0.91 | 0.7 | Invention |
| 617 | 0.25 | 110 | A | B | A | B | 61 | 72 | 0.92 | 0.7 | Invention |

(*2): Acrylic Resin Containing Films

TABLE 28

| Film (*2) | Haze (%) | Tension Softening Point (°C.) | Ductile Breaking | Film Deformation | Dimensional Change | Cutting Property | Retardation Ro | Retardation Rt | Wavelength Dispersion | Photo Elasticity | Remarks |
|---|---|---|---|---|---|---|---|---|---|---|---|
| 618 | 0.48 | 121 | A | A | A | A | 61 | 71 | 0.91 | 1.5 | Invention |
| 619 | 1.51 | 121 | A | A | A | A | 61 | 72 | 0.91 | 1.5 | Invention |
| 620 | 0.36 | 109 | C | B | A | C | 76 | 86 | 0.91 | 1.5 | Invention |
| 621 | 0.28 | 118 | A | A | A | B | 63 | 73 | 0.92 | 0.7 | Invention |
| 622 | 0.28 | 118 | A | A | A | B | 61 | 72 | 0.92 | 1.3 | Invention |
| 623 | 0.32 | 117 | A | A | A | B | 62 | 72 | 0.89 | 1.2 | Invention |
| 624 | 0.29 | 117 | A | A | A | A | 2 | 4 | 0.85 | −1.5 | Comparative |
| 625 | 0.29 | 118 | A | A | A | A | 36 | 58 | 0.87 | 0.0 | Invention |
| 626 | 0.30 | 115 | A | A | A | A | 46 | 62 | 0.88 | 1.6 | Invention |
| 627 | 0.30 | 111 | A | A | A | A | 61 | 73 | 0.91 | 0.7 | Invention |
| 628 | 0.28 | 110 | A | A | A | A | 121 | 132 | 0.93 | 2.3 | Invention |
| 629 | 0.28 | 107 | A | A | A | A | 181 | 194 | 0.93 | 1.8 | Invention |
| 630 | 0.31 | 104 | A | A | A | A | 250 | 251 | 0.95 | 3.1 | Invention |
| 631 | 0.28 | 102 | A | A | A | A | 297 | 296 | 0.93 | 4.2 | Invention |
| 632 | 0.25 | 117 | A | A | A | A | 60 | 72 | 0.92 | 1.0 | Invention |
| 633 | 0.42 | 106 | A | B | A | A | 56 | 66 | 0.89 | 0.7 | Invention |
| 634 | 0.60 | 102 | A | C | B | A | 51 | 60 | 0.92 | 1.4 | Invention |

(*2): Acrylic Resin Containing Films (Performance Evaluation of Liquid Crystal Display Device)
<Manufacturing Polarizing Plate>

Polyvinyl alcohol film having thickness of 120 mm was stretched mono-axially at 110° C. with stretch magnification of 5 times. This was immersed in aqueous solution containing 0.075 g of iodine and 5 g of potassium iodide in 100 g of water for 60 seconds, and then was immersed in aqueous solution containing 6 g of potassium iodide and 7.5 g of boric acid in 100 g of water at 68° C. A polarizing element was obtained by water washing and drying.

Next, acrylic resin containing film samples according to this invention was subjected to surface treatment via a corona discharge processor HFS-202, produced by Kasuga Electric Works., Inc., with power of 12 W min/cm² on a surface to be adhered to the polarizing element, and the sample was adhered to the polarizing element by employing the urethane type adhesive having the following composition.
<Urethane Type Adhesive>

| | |
|---|---|
| Urethane resin aqueous emulsion HYDRAN AP-20 (Manufactured by DIC Corp.) | 100 parts by weight |
| Poly functional glycidylether CR-5L (Manufactured by DIC Corp.) | 5 parts by weight |

On side of Konica Minolta TAC KC4UY (cellulose ester film manufactured by Konica Minolta Opt. Corp.) was subjected to saponification process by immersing in 2 mol/L sodium hydroxide for 90 seconds, and dried, and it was adhered to the other side of the polarizing element by polyvinylalcohol adhesive having solid content of 2% by weight.

A polarizing plate was prepared by drying the adhered material in a drying apparatus at 80° C.
<Production of a Liquid Crystal Display>

A liquid crystal panel for view field angle measurement was produced as follows, and the characteristics as a liquid crystal display was evaluated.

The polarizing plates preliminarily adhered on both sides of a 40 type display KLV-40V 1000 manufactured by SONY Corp. were removed, and the polarizing plates prepared as mentioned above were adhered onto both sides of a glass surface of a liquid crystal cell respectively. At this time, the polarizing plates were adhered in such a direction that the plane of the cellulose ester film of the present invention became the liquid crystal cell side and the absorption axis was directed to the same direction as the preliminarily adhered polarizing plate, whereby the liquid crystal displays of the present invention were produced respectively.

These liquid crystal displays were evaluated in terms of uneven color tone and front contrast, and it was confirmed that the liquid crystal displays of the present invention had little uneven color tone and high front contrast.
(Evaluation of Uneven Color Tone)

The uneven color tone was measured by use of a measuring device (EZ-Contrast 160D manufactured by ELDIM) for each of the liquid crystal displays produced as mentioned above as follows. The maximum uneven color tone range (Δu'v') was compared in CIE 1976, UCS coordinate, the display was inclined 60° from normal direction and observed during rotating 360°.
(Evaluation of Front Contrast)

In the environment of 23° C. 55% RH, after the backlight of each of the liquid crystal displays was continuously lighted for one week, the measurement was performed. EZ-Contrast 160D manufactured by ELDIM was used for the measurement in such a way that the luminance from the normal line direction of the display screen was measured on a white display mode and a black display mode of the liquid crystal display, and the ratio between the luminance values on the white display mode and the black display mode was made as the front contrast.

Front contrast=(luminance on the white display mode measured from the normal line direction of the display device)/(luminance on the black display mode measured from the normal line direction of the display device)

The invention claimed is:

1. An acrylic resin containing film comprising mainly of an acrylic resin containing an acrylic resin and a cellulose ester resin in a weight ratio of 51:49 to 95:5, and a retardation control agent.

2. The acrylic resin containing film of claim 1, wherein:
a weight average molecular weight (Mw) of the acrylic resin is not less than 80,000;

a total substitution degree of acyl groups of the cellulose ester resin is 2.0 to 3.0, a substitution degree of acyl groups having 3 to 7 carbon atoms of the cellulose ester resin is 1.2 to 3.0; and a weight average molecular weight (Mw) of the cellulose ester resin is not less than 75,000.

3. The acrylic resin containing film of claim 2, wherein the weight average molecular weight (Mw) of the acrylic resin is not less than 110,000.

4. The acrylic resin containing film of claim 1, wherein an in-plane retardation value Ro(590) defined by the following Formula (I) is within a range of 30 to 300 nm, and a retardation value in a thickness direction Rt(590) defined by the following Formula (II) is within a range of 50 to 300 nm, $$Ro(590)=(nx-ny)\times d(\text{nm}) \quad \text{Formula (I)}$$

$$Rt(590)=\{(nx+ny)/2-nz\}\times d(\text{nm}) \quad \text{Formula (II)}$$

in the Formula (I), Ro(590) is an in-plane retardation value at a wavelength of 590 nm within the film, and in the Formula (II), Rt(590) is the retardation value in the thickness direction at a wavelength of 590 nm within the film, d is a thickness of the acrylic resin containing film (nm), nx is a maximum refractive index within the film at a wavelength of 590 nm, which is called a refractive index in a retardation direction, ny is a refractive index in a direction orthogonal to the retardation direction at a wavelength of 590 nm, and nz is a refractive index in the thickness direction at a wavelength of 590 nm.

5. The acrylic resin containing film of claim 1, wherein a wavelength dispersion (DSP) defined by the following Formula (III) is within a range of 0.82 to 0.95, $$DSP=Ro(480)/Ro(630) \quad \text{Formula (III)}$$

in the Formula (III), Ro(480) is an in-plane retardation value at a wavelength of 480 nm, and Ro(630) is an in-plane at a wavelength of 480 nm, and Ro(630) is an in-plane retardation value at a wavelength of 630 nm.

6. The acrylic resin containing film of claim 1, wherein a photoelastic coefficient of the acrylic resin containing film is $-5\times10^{-12}$ to $5\times10^{-12}$ Pa$^{-1}$.

7. The acrylic resin containing film of claim 1, which contains acrylic microparticles in an amount of 0.5 to 45% by weight based on the total amount of a resin of the acrylic resin containing film.

8. A polarizing plate comprising a polarizer and the acrylic resin containing film of claim 1 which is disposed on at least one side of the polarizer.

9. A liquid crystal display device comprising the polarizing plate of claim 8 at least at one side of a liquid crystal cell.

10. The acrylic resin containing film of claim 2, wherein an in-plane retardation value Ro(5901 defined by the following Formula (I) is within a range of 30 to 300 nm, and a retardation value in a thickness direction Rt(590) defined by the following Formula (II) is within a range of 50 to 300 nm, $$Ro(590)=(nx-ny)\times d(\text{nm}) \quad \text{Formula (I)}$$

$$Rt(590)=\{(nx+ny)/2-nz\}\times d(\text{nm}) \quad \text{Formula (II)}$$

in the Formula (I), Ro(590) is an in-plane retardation value at a wavelength of 590 nm within the film, and in the Formula (II), Rt(590) is the retardation value in the thickness direction at a wavelength of 590 nm within the film, d is a thickness of the acrylic resin containing film (nm), nx is a maximum refractive index within the film at a wavelength of 590 nm, which is called a refractive index in the retardation direction, ny is refractive index in a direction orthogonal to the retardation direction at a wavelength of 590 nm, and nz is a refractive index in the thickness direction at a wavelength of 590 nm.

11. The acrylic resin containing film of claim 3, wherein an in-plane retardation value Ro(590) defined by the following Formula (I) is within a range of 30 to 300 nm, and a retardation value in a thickness direction Rt(590) defined by the following Formula (II) is within a range of 50 to 300 nm, $$Ro(590)=(nx-ny)\times d(\text{nm}) \quad \text{Formula (I)}$$

$$Rt(590)=\{(nx+ny)/2-nz\}\times d(\text{nm}) \quad \text{Formula (II)}$$

in the Formula (I), Ro(590) is an in-plane retardation value at a wavelength of 590 nm within the film, and in the Formula (II), Rt(590) is the retardation value in the thickness direction at a wavelength of 590 nm within the film, d is a thickness of the acrylic resin containing film (nm), nx is a maximum refractive index within the film at 590 nm, which is called a refractive index in a retardation direction, ny is a refractive index in a direction orthogonal to the retardation direction at a wavelength of 590 nm, and nz is a refractive index in the thickness direction at a wavelength 590 nm.

12. The acrylic resin containing film of claim 2, wherein a wavelength dispersion (DSP) defined by the following Formula (III) is within a range of 0.82 to 0.95, $$DSP=Ro(480)/Ro(630) \quad \text{Formula (III)}$$

in the Formula (III), Ro(480) is an in-plane retardation value at a wavelength of 480 nm, and Ro(630) is an in-plane retardation value at a wavelength of 630 nm.

13. The acrylic resin containing film of claim 3, wherein a wavelength dispersion (DSP) defined by the following Formula (III) is within a range of 0.82 to 0.95, $$DSP=Ro(480)/Ro(630) \quad \text{Formula (III)}$$

in the Formula (III), Ro(480) is an in-plane retardation, value at a wavelength of 480 nm, and Ro(630) is an in-plane retardation value at a wavelength of 630 nm.

14. The acrylic resin containing film of claim 4, wherein a wavelength dispersion (DSP) defined by the following Formula (III) is within a range of 0.82 to 0.95, $$DSP=Ro(480)/Ro(630) \quad \text{Formula (III)}$$

in the Formula (III), Ro(480) is an in-plane retardation value at a wavelength of 480 nm, and Ro(630) is an in-plane retardation value at a wavelength of 630 nm.

15. The acrylic resin containing film of claim 10, wherein a wavelength dispersion (DSP) defined by the following Formula (III) is within a range of 0.82 to 0.95, $$DSP=Ro(480)/Ro(630) \quad \text{Formula (III)}$$

in the Formula (III), Ro(480) is an in-plane retardation value at a wavelength of 480 nm, and Ro(630) is an in-plane retardation value at a wavelength of 630 nm.

16. The acrylic resin containing film of claim 11, wherein a wavelength dispersion (DSP) defined by the following Formula (III) is within a range of 0.82 to 0.95, $$DSP=Ro(480)/Ro(630) \quad \text{Formula (III)}$$

in the Formula (III), Ro(480) is an in-plane retardation value at a wavelength of 480 nm, and Ro(630) is an in-plane retardation value at a wavelength of 630 nm.

17. The acrylic resin containing film of claim 2, wherein a photoelastic coefficient of the acrylic resin containing film is $-5\times10^{-12}$ to $5\times10^{-12}$ Pa$^{-1}$.

18. The acrylic resin containing film of claim 3, wherein a photoelastic coefficient of the acrylic resin containing film is $-5\times10^{-12}$ to $5\times10^{-12}$ Pa$^{-1}$.

19. The acrylic resin containing film of claim 4, wherein a photoelastic coefficient of the acrylic resin containing film is $-5\times10^{-12}$ to $5\times10^{-12}$ Pa$^{-1}$.

20. The acrylic resin containing film of claim 10, wherein a photoelastic coefficient of the acrylic resin containing film is $-5\times10^{-12}$ to $5\times10^{-12}\,Pa^{-1}$.

21. The acrylic resin containing film of claim 11, wherein a photoelastic coefficient of the acrylic resin containing film is $-5\times10^{-12}$ to $5\times10^{-12}\,Pa^{-1}$.

\* \* \* \* \*